United States Patent
Benzing et al.

(10) Patent No.: US 10,252,368 B2
(45) Date of Patent: Apr. 9, 2019

(54) MACHINE VISION ROBOTIC STUD WELDER

(71) Applicant: Structural Services, Inc., Bethlehem, PA (US)

(72) Inventors: James T. Benzing, Bethlehem, PA (US); William R. Haller, Bethlehem, PA (US); Jacob B. Patterson, Austin, TX (US)

(73) Assignee: Structural Services, Inc., Bethlehem, PA (US)

( * ) Notice: Subject to any disclaimer, the term of this patent is extended or adjusted under 35 U.S.C. 154(b) by 0 days.

(21) Appl. No.: 15/674,926

(22) Filed: Aug. 11, 2017

(65) Prior Publication Data

US 2017/0368632 A1    Dec. 28, 2017

Related U.S. Application Data

(63) Continuation of application No. 15/025,422, filed as application No. PCT/US2014/059206 on Oct. 4, 2014, now Pat. No. 9,764,411.

(60) Provisional application No. 61/886,874, filed on Oct. 4, 2013.

(51) Int. Cl.
| | |
|---|---|
| *B23K 9/00* | (2006.01) |
| *B23K 9/20* | (2006.01) |
| *B23K 26/08* | (2014.01) |
| *B23K 26/14* | (2014.01) |
| *B23K 26/34* | (2014.01) |
| *B23K 26/144* | (2014.01) |
| *B23K 9/095* | (2006.01) |
| *B23K 37/02* | (2006.01) |
| *B23K 103/04* | (2006.01) |

(52) U.S. Cl.
CPC .............. *B23K 9/20* (2013.01); *B23K 9/0953* (2013.01); *B23K 9/0956* (2013.01); *B23K 26/08* (2013.01); *B23K 26/144* (2015.10); *B23K 26/1476* (2013.01); *B23K 26/34* (2013.01); *B23K 37/0258* (2013.01); *B23K 37/0282* (2013.01); *B23K 2103/04* (2018.08)

(58) Field of Classification Search
CPC ................ B23K 9/0956; B23K 9/0953; B23K 37/0258; B23K 37/0282; B23K 26/144; B23K 26/08; B23K 26/1476; B23K 26/34; B23K 2103/04; B23K 26/14; B23K 9/20–9/208; B23K 20/12–20/1295
USPC ........ 228/112.1–114.5, 2.1–2.3; 219/97–100
See application file for complete search history.

(56) References Cited

U.S. PATENT DOCUMENTS 2,536,039 A * 1/1951 Craven ................. F22B 37/201
                                                        122/6 A
3,309,495 A * 3/1967 Shoup .................... B23K 9/206
                                                           219/98

(Continued)

FOREIGN PATENT DOCUMENTS

DE    102008033371 A1 *  1/2010  ............. B23K 9/201
EP        0253320 A1 *  1/1988  ............. B23K 9/206

(Continued)

*Primary Examiner* — Kiley S Stoner
(74) *Attorney, Agent, or Firm* — Design IP

(57) ABSTRACT

The present disclosure teaches systems and methods for robotic welding of studs onto the surface of I-beams. These systems and methods will find industrial applicability in, for example, the steel erection industry.

9 Claims, 32 Drawing Sheets

(56) References Cited

U.S. PATENT DOCUMENTS

| | | | | | |
|---|---|---|---|---|---|
| 3,339,799 | A | * | 9/1967 | Spisak | B23K 9/206 219/98 |
| 3,371,184 | A | * | 2/1968 | Napoli | B23K 9/206 219/103 |
| 3,380,143 | A | * | 4/1968 | Veldgen | B23K 9/206 221/105 |
| 3,487,190 | A | * | 12/1969 | Glorioso | B23K 11/0053 219/103 |
| 3,526,743 | A | * | 9/1970 | Spisak | B23K 9/206 219/98 |
| 3,584,727 | A | * | 6/1971 | Froehlking | B23K 9/206 198/400 |
| 3,789,490 | A | * | 2/1974 | Kohart | B23K 9/206 219/98 |
| 3,792,223 | A | * | 2/1974 | Spisak | B23K 9/206 219/98 |
| 3,900,131 | A | * | 8/1975 | Ehrlich | B23K 9/206 221/169 |
| 4,420,674 | A | * | 12/1983 | Jordan | B23K 9/206 219/125.1 |
| 4,629,857 | A | * | 12/1986 | Gauger | B23K 9/206 219/98 |
| 5,067,632 | A | * | 11/1991 | Aubry | B23K 9/206 221/266 |
| 5,068,511 | A | * | 11/1991 | Meyer, Sr. | B23K 9/202 219/98 |
| 5,384,445 | A | * | 1/1995 | Nakagami | B23K 9/20 219/98 |
| 5,403,988 | A | * | 4/1995 | Kawada | B23K 11/0053 219/98 |
| 5,557,841 | A | * | 9/1996 | Aoyama | B23K 9/206 221/212 |
| 5,695,045 | A | * | 12/1997 | Mergell | B23K 9/20 198/747 |
| 5,696,688 | A | * | 12/1997 | Leif | B23K 9/201 16/407 |
| 5,798,494 | A | * | 8/1998 | Aoyama | B23K 9/206 219/98 |
| 8,015,686 | B2 | * | 9/2011 | Hain | B21J 15/32 219/98 |
| 2003/0039532 | A1 | * | 2/2003 | Aoyama | B23K 9/206 414/27 |
| 2003/0127432 | A1 | * | 7/2003 | Aoyama | B23K 9/206 219/93 |
| 2005/0178816 | A1 | * | 8/2005 | Stevenson | B21J 15/027 228/112.1 |
| 2006/0032837 | A1 | * | 2/2006 | Schlafhauser | B23K 9/206 219/98 |
| 2007/0067975 | A1 | * | 3/2007 | Gerhardt | B23K 9/20 29/407.1 |
| 2010/0059486 | A1 | * | 3/2010 | Aoyama | B23K 9/206 219/79 |
| 2010/0314359 | A1 | * | 12/2010 | Shinjo | B23K 9/206 219/80 |
| 2012/0139193 | A1 | * | 6/2012 | Schug | B23K 9/206 279/43.1 |
| 2013/0037199 | A1 | * | 2/2013 | Broehl | B23K 9/201 156/64 |
| 2014/0091067 | A1 | * | 4/2014 | Jaehee | B23K 9/201 219/98 |
| 2015/0183046 | A1 | * | 7/2015 | Kim | B23K 11/0053 219/99 |
| 2015/0321281 | A1 | * | 11/2015 | Hobson | B23K 9/206 219/98 |
| 2016/0332215 | A1 | * | 11/2016 | Blacket | B21D 39/03 |
| 2017/0361391 | A1 | * | 12/2017 | Schneider | B23K 9/202 |
| 2018/0009056 | A1 | * | 1/2018 | Schneider | B23K 9/201 |

FOREIGN PATENT DOCUMENTS

| | | | | |
|---|---|---|---|---|
| EP | 246140 | A1 | * | 11/2010 |
| GB | 1266626 | A | * | 3/1972 ............ B23K 9/206 |
| JP | 54149346 | A | * | 11/1979 |
| JP | 58053378 | A | * | 3/1983 ............... B23K 9/20 |
| JP | 60054279 | A | * | 3/1985 ............. B23K 9/202 |
| JP | 60054280 | A | * | 3/1985 ............. B23K 9/201 |
| JP | 62227579 | A | * | 10/1987 |
| WO | WO 00/64628 | A2 | * | 11/2000 |

* cited by examiner

MACHINE VISION ROBOTIC STUD WELDER

FIELD OF THE INVENTION

This present invention relates generally to arc-welding equipment for welding studs at predefined welding sites, and in particular to robotically-controlled stud welders which use machine vision to identify and locate a welding site on a surface of a beam or girder and which further automatically weld studs at these sites, and related methods therefor.

BACKGROUND OF THE INVENTION

In steel erection projects, for example road construction and bridgebuilding, steel studs are typically manually placed onto the surfaces of steel beams into ceramic ferrules, and then are welded in place onto the beam. Conventional, manual techniques for feeding and aligning both studs and ferrules into collets are well known in the art and are disclosed, for example, in U.S. Pat. No. 5,130,510. This is a slow and arduous process that requires the worker to repeatedly bend over in order to first place the stud within a pre-positioned ferrule over a ground welding site on the beam, and then to weld the stud into place on the beam. The slow speed of this process increases construction time and costs, and leads to frequent worker injuries.

There is a need for improved welding systems that overcome these and other known drawbacks in the prior art.

BRIEF SUMMARY OF THE INVENTION

Additional aspects of the invention include:

Aspect 1: An apparatus for automatically welding studs on a surface of a beam at pre-marked welding sites located on the surface of the beam, the beam having a longitudinal axis, the apparatus comprising: a carriage that is operably configured to be movable parallel to the longitudinal axis of the beam; at least one imager connected to the carriage, the imager being operably configured to capture a plurality of images of the surface of the beam as the carriage is being moved; at least one welding assembly attached to the carriage, the at least one welding assembly being in data communication with the computer and being movable relative to the location of the carriage; and a computer in data communication with the at least one imager and the at least one welding assembly, the computer being operably configured to identify at least one pre-marked welding site that is located on the surface of the beam in one or more of the plurality of images and to determine the location of the at least one pre-marked welding site relative to the location of the carriage and relative to the location of the at least one welding assembly; wherein the computer is operably configured to command the at least one welding assembly to automatically place and weld a stud to the surface of the beam at the at least one pre-marked welding site.

Aspect 2: The apparatus of Aspect 1, wherein a position of the at least one imager is adjustable relative to the location of the carriage.

Aspect 3: The apparatus of Aspect 1, wherein a position of the at least one imager is fixed relative to the location of the carriage.

Aspect 4: The apparatus of any of Aspects 1-3, wherein a centerline of a field of view of the at least one imager is not oriented orthogonal to the surface of the beam.

Aspect 5: The apparatus of any of Aspects 1-4, further comprising a movable plate having a cutout compartment through which the at least one imager captures the plurality of images of the surface of the beam.

Aspect 6: The apparatus of Aspect 5, wherein the at least one welding assembly accesses the surface of the beam through the cutout compartment.

Aspect 7: The apparatus of any of Aspects 1-6, further comprising a stud feeding assembly that is operably configured to repeatedly feed studs to the at least one welding assembly, the stud feeding assembly comprising at least one stud tube that is oriented at an oblique angle with respect to the surface of the beam, the at least one stud tube being sized to hold a plurality of studs therein.

Aspect 8: The apparatus of Aspect 7, the stud feeding assembly further comprising a plate having a stud slot located therein, the plate being located adjacent to a bottom end of the at least one stud tube, the plate being adjustable between first and second positions, wherein in the first position the stud slot is located adjacent to the bottom end of the at least one stud tube and aligned with the at least one stud tube and wherein in the second position the stud slot is not aligned with the at least one stud tube.

Aspect 9: The apparatus of Aspect 8, wherein the at least one stud tube comprises a plurality of stud tubes, each of the stud tubes being oriented at an oblique angle with respect to the surface of the beam and being arranged parallel to each other.

Aspect 10: The apparatus of Aspect 9, wherein the plurality of stud tubes are arranged in a circumferential relationship such that a respective bottom end of each of the plurality of stud tubes can be rotated into alignment with the stud slot located in the plate when the plate is in its first position.

Aspect 11: The apparatus of any of Aspects 1-10, further comprising a stud feeding assembly that is operably configured to repeatedly feed studs to the at least one welding assembly, the stud feeding assembly comprising at least one stud tube that is oriented at a non-orthogonal angle with respect to the surface of the beam, the at least one stud tube being sized to hold a plurality of studs therein.

Aspect 12: The apparatus of any of Aspects 1-11, wherein the welding assembly is separately movable along three linear axes.

Aspect 13: A method for automatically welding studs on a surface of a beam at pre-marked welding sites located on the surface of the beam, the beam having a longitudinal axis, the method comprising: instructing a carriage to move parallel to the longitudinal axis of the beam, the carriage having at least one imager attached thereto, the imager being operably configured to automatically capture a plurality of images of the surface of the beam as the carriage is moving; instructing the at least one imager to capture the plurality of images of the surface of the beam and communicate image data regarding the plurality of images to a computer, the computer being in data communication with the at least one imager and at least one welding assembly that is attached to the carriage, the computer being operably configured to identify at least one pre-marked welding site that is located on the surface of the beam in one or more of the plurality of images and to determine the location of the at least one pre-marked welding site relative to the location of the carriage and relative to the location of the at least one welding assembly; and instructing the at least one welding assembly to place and weld a stud to the surface of the beam at the at least one pre-marked welding site.

Aspect 14: The method of Aspect 13, further comprising providing at least one light source to the surface of the beam as the at least one imager is capturing the plurality of images.

Aspect 15: The method of Aspect 14, wherein the step of providing at least one light source to the surface of the beam as the at least one imager is capturing the plurality of images further comprises providing the at least one light source at an angle that is non-orthogonal to the surface of the beam.

Aspect 16: The method of Aspect 14, wherein the step of providing at least one light source to the surface of the beam as the at least one imager is capturing the plurality of images further comprises providing at least two light sources to the surface of the beam, wherein each of the light sources of the at least two light sources is provided at an angle that is non-orthogonal to the surface of the beam.

Aspect 17: A stud feeding assembly for automatically feeding welding studs to a weld area, the stud feeding assembly comprising: a top plate; a bottom plate opposing the top plate, the bottom plate having a cutout therein; and a plurality of stud tubes located between the top plate and the bottom plate, each of the stud tubes having a top opening and a bottom opening and being sized to hold a plurality of welding studs therein; wherein the respective bottom end of each of the plurality of stud tubes can be individually moved into alignment with the cutout located in the bottom plate such that a welding stud located in the respective stud tube can pass through the cutout, whereas welding studs located in the other one or more stud tubes of the plurality of stud tubes cannot simultaneously pass through the bottom plate.

Aspect 18: The stud feeding assembly of Aspect 17, wherein the plurality of stud tubes comprises at least three stud tubes located in a circumferential arrangement around a centerline of the plurality of stud tubes, wherein the centerline passes through the longitudinal center of the plurality of stud tubes.

Aspect 19: The stud feeding assembly of any of Aspects 17-18, wherein the plurality of stud tubes is manually adjustable such that the respective bottom end of each of the plurality of stud tubes is individually movable into alignment with the cutout.

Aspect 20: The stud feeding assembly of any of Aspects 17-19, wherein the plurality of stud tubes is electronically adjustable such that the respective bottom end of each of the plurality of stud tubes is individually movable into alignment with the cutout.

Aspect 21: The apparatus of any of Aspects 17-20, wherein the plurality of stud tubes are longitudinally oriented at a non-orthogonal angle with respect to a planar surface of the weld area.

Aspect 22: The apparatus of Aspect 21, further comprising a rotatable plate having a stud slot therein that is sized to accommodate the placement of a stud therein, the rotatable plate being movable between first and second positions; wherein in the first position the stud slot is located adjacent to the respective bottom end of at least one stud tube of the plurality of stud tubes and aligned with the at least one stud tube and; wherein in the second position the stud slot is not aligned with the at least one stud tube.

Aspect 23: The apparatus of Aspect 22, wherein in the second position the stud slot is oriented at an orthogonal angle with respect to the planar surface of the weld area.

Aspect 24: The apparatus of Aspect 22, wherein the rotatable plate is movable between the first and second positions via extension and retraction of an extension and retraction device that is attached to the rotatable plate.

Aspect 25: The apparatus of Aspect 24, wherein the extension and retraction device is extended and retracted automatically via a hydraulic valve.

Aspect 26: An apparatus for welding a stud onto the surface of a beam, the surface being planar and lying in a first plane, the surface having a longitudinal axis, the apparatus comprising: a carriage that is operably configured to be movable parallel to the longitudinal axis of the beam, the carriage having a frame that lies in a second plane as it is moved parallel to the longitudinal axis; a stud placement and welding assembly that is connected to the carriage in an orthogonal relationship to the second plane when the stud placement and welding assembly is in a home position; and a leveling assembly attached to the stud placement and welding assembly, wherein when the second plane is not parallel to the first plane, the leveling assembly reorients the stud placement and welding assembly away from the home position so that the stud placement and welding assembly is placed in an orthogonal relationship to the first plane.

Aspect 27: The apparatus of Aspect 26, wherein the leveling assembly comprises a motor and a linear actuator, the linear actuator having an extendable and retractable rod that is attached to the stud placement and welding assembly, wherein when the second plane is not parallel to the first plane, the motor drives the linear actuator to extend or retract the rod in order to bring the stud placement and welding assembly into an orthogonal relationship to the first plane.

Aspect 28: A method for aligning a stud in an orthogonal relationship to a planar top surface of a beam, the stud having a cylindrical shaft, the method comprising: charging an electromagnet assembly so that it has magnetic properties, the electromagnet assembly comprising an electromagnet and a half-tubular portion that mates with the cylindrical shaft of the stud; moving the electromagnet assembly into contact with the cylindrical shaft of the stud so that the stud is picked up by the electromagnet assembly in an orientation in which the cylindrical shaft of the stud is aligned with the half-tubular portion; and moving the electromagnet assembly and attached stud so that a bottom end of the cylindrical shaft of the stud is placed in contact with the planar top surface in an orthogonal relationship to the planar top surface.

Aspect 29: An apparatus comprising: a support arm; a ferrule holding arm attached to the support arm that holds a ferrule in place on top of a pre-ground welding site located on a surface of a beam, the ferrule holding arm having a solenoid and an extendable plunger attached thereto; wherein the solenoid is operably connected to the plunger to cause the plunger to come into contact with and fracture the ferrule when a signal is sent to the solenoid to extend the plunger.

BRIEF DESCRIPTION OF THE DRAWINGS

The invention is best understood from the following detailed description when read in connection with the accompanying figures. It is emphasized that according to common practice the various features of the invention shown in the figures may not be to scale. On the contrary, for purposes of clarity, the dimensions of the various features of the invention shown in the figures may be arbitrarily expanded or reduced. The machine vision robotic welding system, and related methods therefor, are further described with reference to the accompanying drawings, in which.

DETAILED DESCRIPTION OF THE PREFERRED EMBODIMENTS

Figure 1:
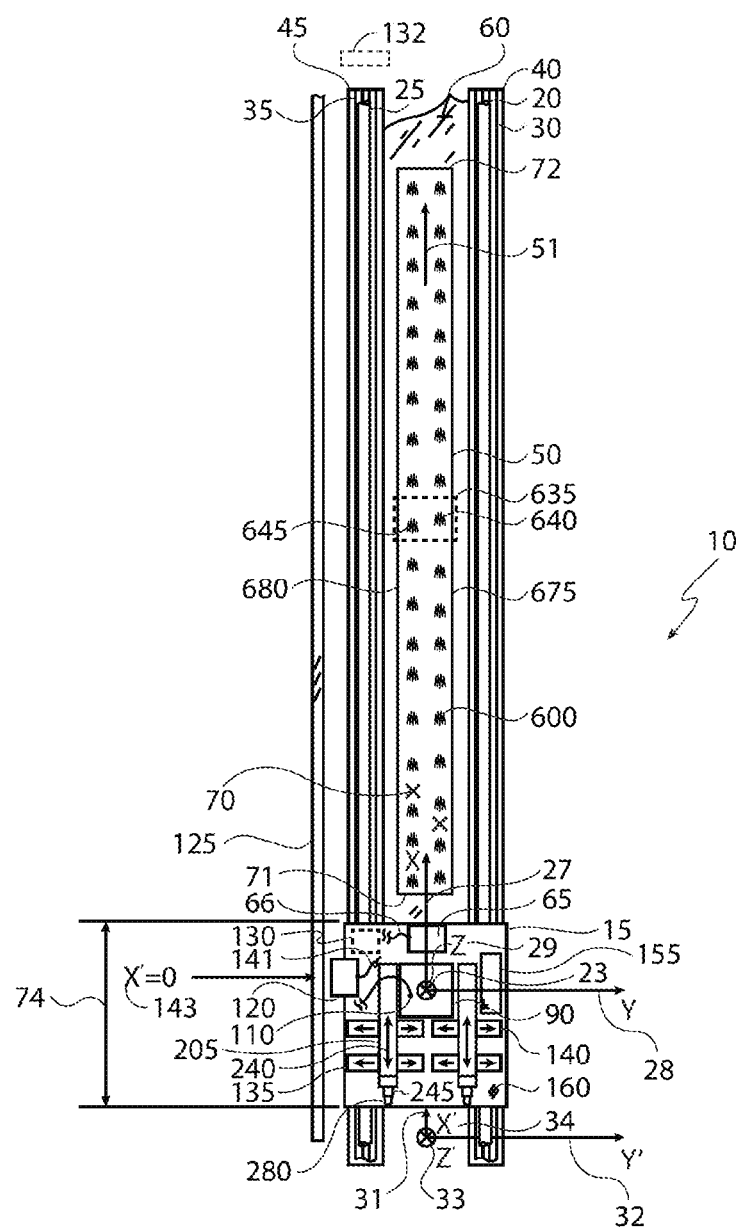
FIG. 1 is a diagrammatic top view of a first embodiment of a robotic welding system according to the present invention, having a rail-guided welding carriage that is movable along the longitudinal axis of a conventional I-beam.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It is understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

Referring to the drawing, in which like reference numbers refer to like elements throughout the various figures that comprise the drawing, FIG. 1 shows the preferred invention 10 which comprises a welding carriage 15 centrally suspended between, and on top of, right carriage track rail 20 and left carriage track rail 25 and over beam 50. Rails 20 and 25 are parallel to each other and may be round or square stainless steel support rails commonly used in mechanical engineering for supporting moving carriages and other machinery. Rails 20 and 25 are affixed to and fully supported by right rail support 30 and left rail support 35 respectively. Examples of steel rails may include those offered by Thomson Industries Inc. of Wood Dale, Ill., which is a subsidiary company of the Danaher Corporation.

Figure 2:
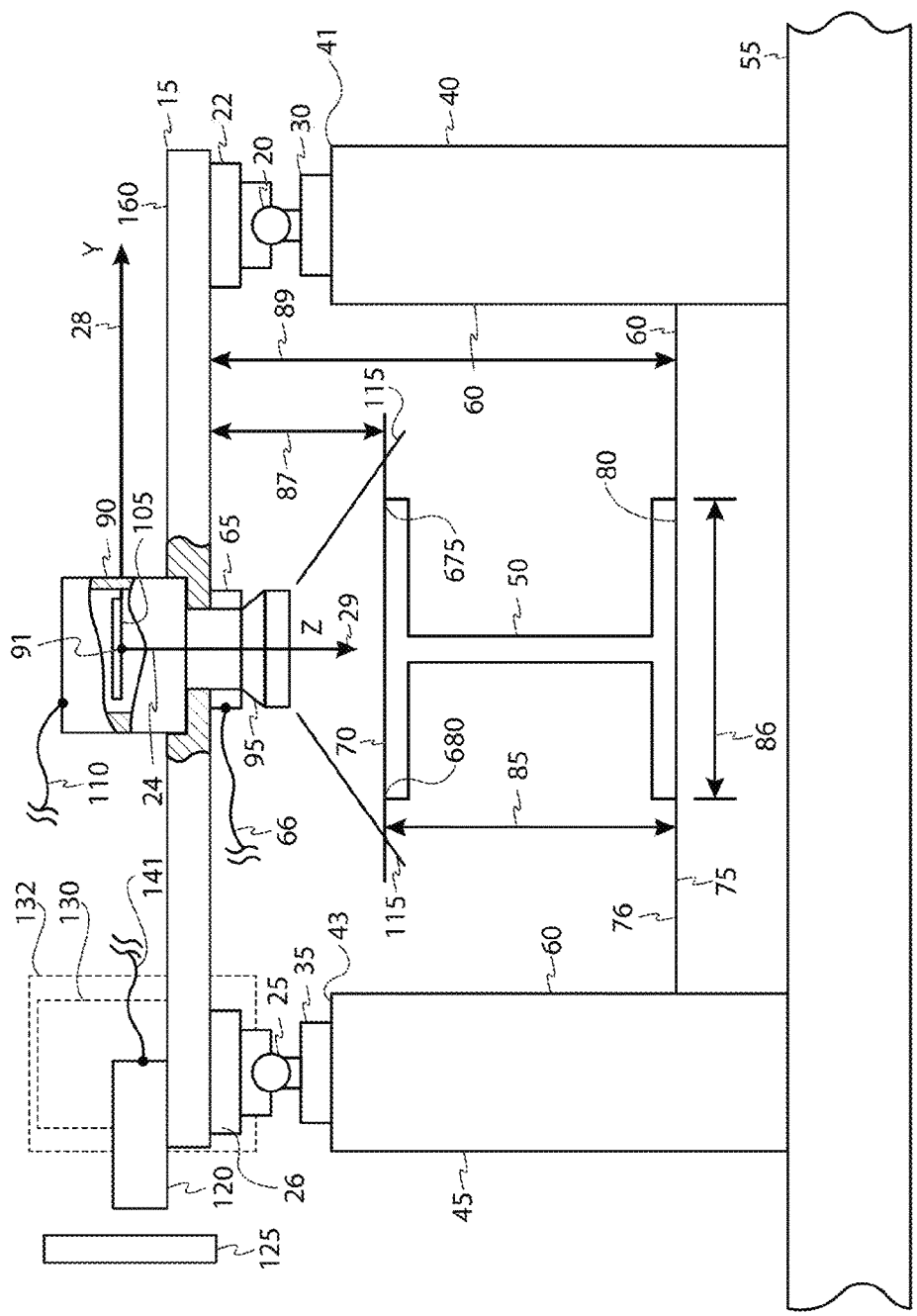
FIG. 2 is a diagrammatic rear view of the rail-guided welding carriage of the robotic welding system according to the present invention, illustrating additional components of the welding carriage and in particular the placement of an imager with respect to the I-beam.

Referring additionally to FIG. 2 of the drawing, rail supports 30 and 35 are further individually mounted to right support structure 40 and left support structure 45 respectively which transfer carriage 15 load to ground 55. Support structures 40 and 45 have coplanar flat top surfaces 41 and 43 respectively.

Floor support 75 spans between support structures 40 and 45 and provides a smooth and level surface for supporting a conventional I-beam 50. Top surface 76 of support floor 75 is parallel with carriage 15 top surface 160.

The inside surfaces of support structures 40 and 45 and top surface 76 of support floor 75 form a rectangular shaped compartment 60 in which I-beam 50 is longitudinally and centrally positioned. Rails 20 and 25 along with their rail supports 30 and 35 respectively, and support structures 40 and 45 respectively, extend beyond beginning edge 71 and ending edge 72 of beam 50.

Beam 50 further has top surface 70, bottom surface 80 and longitudinal axis 51. Longitudinal axis 51 is parallel to rails 20 and 25. Bottom surface 80 rests on top surface 76 of support floor 75. Right top edge 675 and left top edge 680 of beam 50 is also shown in FIGS. 1 and 2. Beam 50 further has welding sites 600 irregularly spaced on top surface 70 (more fully described with reference to FIG. 10).

Figure 3:
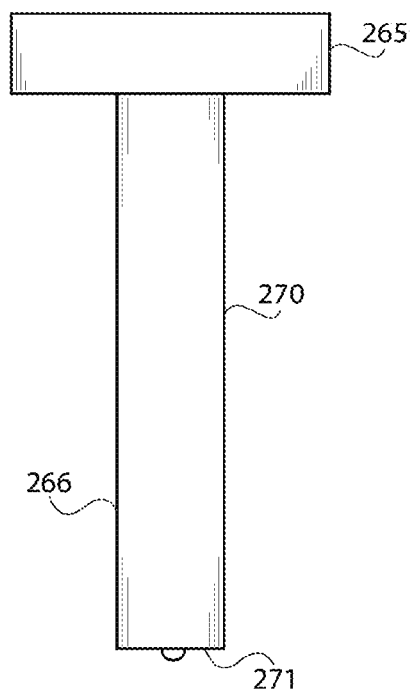
FIG. 3 is a side view of a conventional welding stud having a head, shank, and welding bottom surface.

Referring additionally to FIG. 3 of the drawing, a conventional steel welding stud 270 is shown and comprises a head portion 265, stud shank 266 and bottom welding surface 271. The diameter of head 265 exceeds that of shank 266 diameter, and stud 270 can vary in shank 266 diameter and length. Preferably welding studs 270 are vertically welded onto surface 70 at each welding site 600. The magnetic properties of steel stud 270 will be used to vertically align stud 270 onto each welding site 600.

Carriage 15 is attached to right and left pillow block bearings 22 and 26 respectively by conventional means (not shown), and both pillow block bearings 22 and 26 extend the entire longitudinal length 74 of carriage 15. Pillow block bearings 22 and 26 conventionally engage rails 20 and 25 respectively to allow carriage 15 to move freely in the longitudinal axis 51 direction of beam 50 along rails 20 and 25, and therefore may traverse the entire longitudinal length of beam 50.

Carriage 15 further has a front mounted and downwardly pointing non-contacting conventional distance measuring sensor 65. Sensor 65 is located equidistant from rails 20 and 25. An example of a distance measuring sensor may include a laser configured to measure distance from the measurement sensor to a target. Power and bi-directional signal flow to sensor 65 is provided via buss 66. An example of such a system is manufactured by Banner Engineering of Minneapolis, Minn.

Sensor 65 measures the vertical distance 89 from carriage 15 to the top surface 76 of floor 75, and therefore to bottom surface 80 of beam 50, (with sensor 65 positioned over floor surface 76), or measures the vertical distance 87 from carriage 15 to top surface 70 of beam 50 (with sensor 65 positioned over beam 50).

The vertical distance 87 from carriage 15 to top surface 70 is an important parameter needed for accurately positioning stud 270 vertically so that the bottom welding surface 271 just makes contact with the desired welding site, irrespective of stud length.

Beam 50 further has vertical height 85 and width 86 which varies depending upon the particular beam size. Beam width 86 (width 86 is preferably measured in inches) is an important parameter and will be used to calculate the object distance to image pixel distance ratio for imager 90. This ratio is further used to determine the welding site locations and is further discussed in reference to FIG. 13 of the drawing.

Carriage 15 further has a downwardly focused imager 90 having adjustable lens 95 (having optical axis 24) and an adjustable aperture (not shown). Imager 90 is a conventional CCD or active CMOS imager having either a square or rectangular pixel array 105 having center 91. Imager 90 is mounted on carriage top surface 160 and behind sensor 65 as shown in FIG. 1.

The raw image captured by imager 90 is further calibrated using conventional camera calibration software algorithms which correct for radial and tangential distortion of lens 95. To correct for lens distortion, the raw image captured by imager 90 is input into a camera calibration software algorithm which substantially corrects the raw image for the effects of lens distortion, thus producing a more realistic image of surface 70. Camera lens calibration algorithms are well known in the machine vision art and may include for example, MATLAB compatible camera calibration programs, or OpenCV (Open Source Computer Vision), camera calibration algorithms. MATLAB is offered by the Mathworks of Natick, Mass.

Pixel array 105 is aligned with lens 95 so that optical axis 24 intersects the center 91 of pixel array 105, and the center 91 of array 105 is positioned to be equidistant from rails 20 and 25.

Lens 95 and aperture 100 define field of view 115 of imager 90 and focuses an image of top surface 70 of beam 50 onto pixel array 105. Image data signals, control and timing signals, along with electrical power, communicate with imager 90 via buss 110.

A right-handed carriage 15 referenced Cartesian coordinate system 23 (movable with carriage 15) comprising X-axis 27, Y-axis 28 and Z-axis 29 is also depicted in FIG. 1. Note that the positive Z-axis 29 points downward from carriage 15 into compartment 60 as shown in FIG. 2. The reference center of X-Y-Z coordinate system (i.e., X=0, Y=0, Z=0) is positioned along the optical axis 24 of imager 90 and at the center 91 of pixel array 105, having the Z-axis 29 co-aligned with optical axis 24, and X-axis 27 parallel with rails 20 and 25 and co-aligned with longitudinal axis 51.

Another right-handed fixed (i.e., non-movable) Cartesian coordinate system 34 comprising X' 31 axis, Y' 32 axis and Z' 33 axis is also shown in FIG. 1 having its origin located equidistant between rails 20 and 25, coincident with X'=0 position marker 143 and is coplanar with top surfaces 41 and 43 of supports 40 and 45 respectively. Coordinate X'-axis 31 is directed along the X-axis 27, and the Y' axis 32 is parallel with Y axis 28. For clarity, coordinate system 34 in FIG. 1 is shown displaced along the X' axis 31 from its actual defined origin.

Mounted on top surface 160 and on the right side of carriage 15 is computer 155 (not shown in FIG. 2), and is further discussed with reference to FIGS. 6-9.

Additionally affixed to the left side of carriage 15 is a conventional linear position encoder having linear position sensor 120 which cooperates with linear scale 125 to determine X'-axis 31 position of carriage 15. Linear scale 125 is affixed to support 45 by conventional means (not shown) and sensor 120 is fixed to, and moves with, carriage 15. The home position of carriage 15 is defined as the X'=0 143 position marker.

Thus the X' 31 positions of carriage 15, as well any components and parts thereof attached to carriage 15 (including, for example, sensor 65, center 91 of pixel array 105, all four boundary edges of carriage 15, etc.) are known with respect to the home position of carriage 15 taking into consideration any X-axis 27 distance offset corrections from sensor 120. Similarly, the Y' 32 and Z' 33 positions of any components or parts thereof attached to carriage 15 are known with respect to coordinate system 34 taking into consideration the Y-axis and Z-axis offsets.

Additionally, knowing the X' 31 positions of carriage 15 and of the attached components, and knowing the X' 31 position of beginning edge 71 of beam 50, the X' positions of carriage 15 and any carriage 15 affixed components or parts thereof are easily determined with respect to the X' 31 position of the beginning edge 71 of beam 50.

Similarly, knowing the X' 31 position of ending edge 72 of beam 50, the X' positions of carriage 15 and any carriage 15 affixed components or parts thereof are easily determined with respect to the X' 31 position of the ending edge 72 of beam 50.

Examples of a linear position encoders may include optical or magnetic linear encoders. Another linear encoder may include a conventional draw wire sensor, or may further include a conventional laser ranging system 130 (commonly referred to as a LIDAR system) which cooperates with reflective target 132 to determine the X' 31 axis position of carriage 15 (system 130 and reflective target 132 are shown in dashed lines in FIGS. 1 and 2). In all of these examples, the X'-axis 31 position of carriage 15 is determined. Buss 141 provides position data and control signals, along with power for linear sensor 120.

Figure 6:
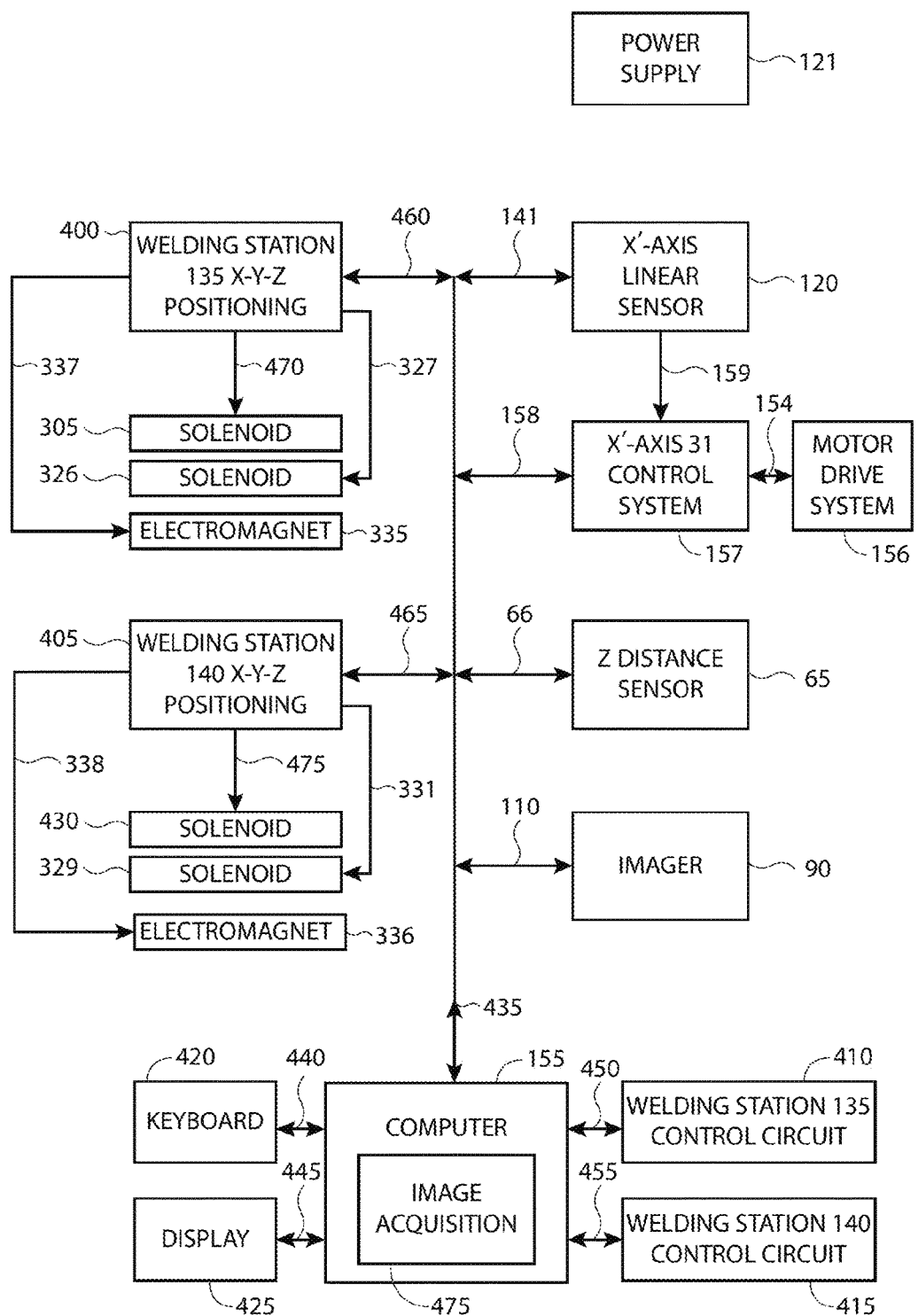
FIG. 6 is a schematic block diagram illustrating components of an embodiment of the robotic welding system according to the present invention.

Further connected to carriage 15 is a conventional motor drive system (not shown) which propels carriage 15 in either direction of X'-axis 31, and which may also stop carriage 15, in a controlled manner under the control of X' axis control system 157 (more fully discussed in reference to FIG. 6 of the drawing).

The motor drive system 156 may include a conventional belt drive system having carriage 15 fixed to a drive belt, the belt being driven by a stationary motor, or the drive system may include a conventional cooperating ball and screw drive combination for moving carriage 15 along X'-axis 31. In either case, it is understood that carriage 15 is able to move along rails 20 and 25 along the longitudinal axis 51 of beam 50 in the X'-axis 31 direction and be controllably positioned at a desired X'-axis position.

Carriage 15 may also be self-propelled having an attached computer controlled motor with a pinion gear connected to the motor shaft and which further engages a conventional gear rack which is mounted to either support structure 40 or 45. A manufacturer of cooperating motor pinions and gear racks include Boston Gear of Charlotte, N.C.

Mounted onto top surface 160 of carriage 15 are identical left and right 3-axis computer controlled welding stations 135 and 140 respectively, as shown in FIG. 1 of the drawing. Welding stations 135 and 140 have been omitted from FIG. 2 for clarity.

Figure 4:
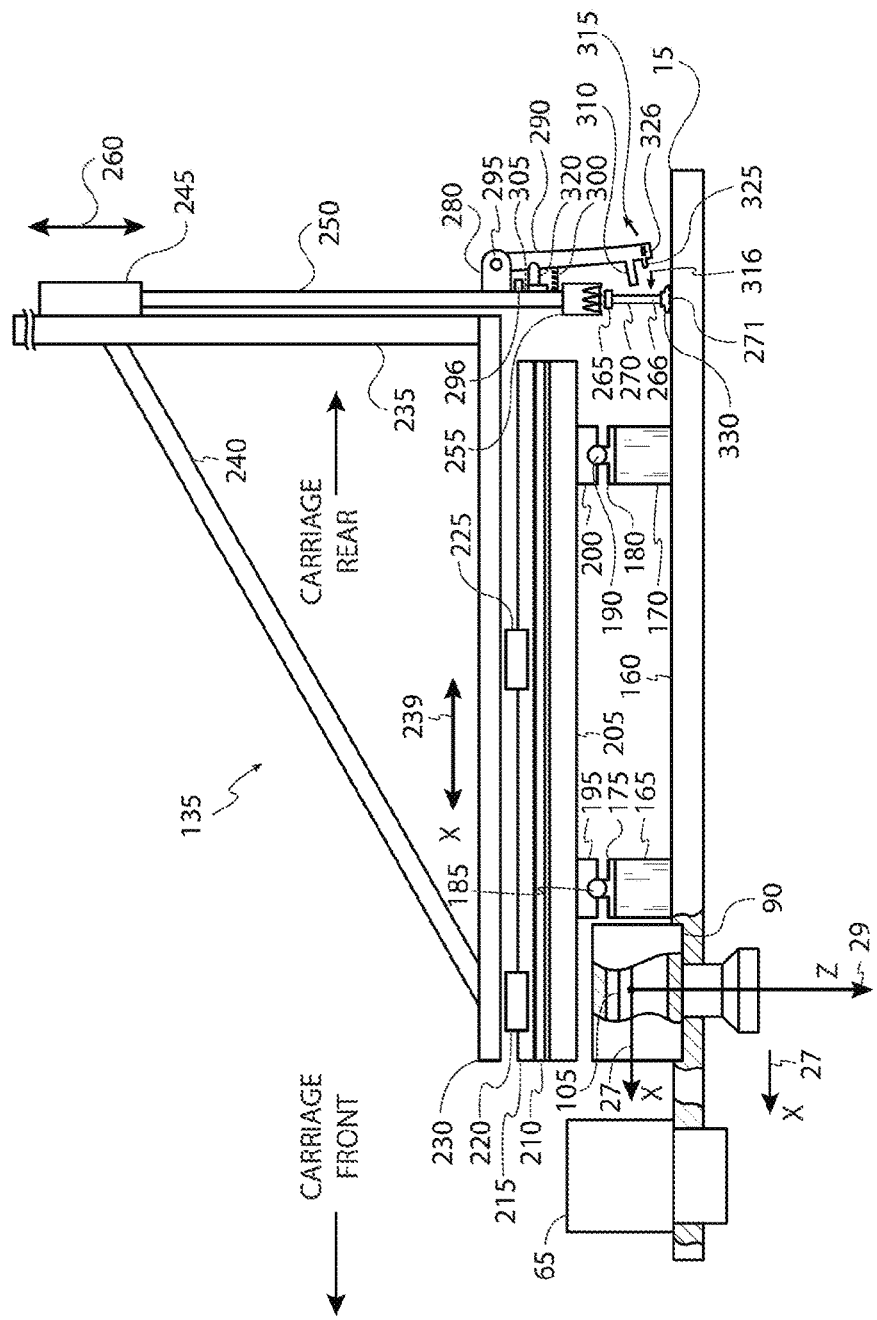
FIG. 4 is a side view of one of two welding stations which is mounted onto the top surface of the welding carriage of the robotic welding system, further illustrating a welding stud loading mechanism thereof.

Referring now additionally to FIG. 4 of the drawing, left welding station 135 is mounted onto top surface 160 of carriage 15 with welding station supports 165 and 170. Support 165 and 170 elevate welding station 135 above and over sensor 65, imager 90, sensor 120 and computer 155. Welding station 140 is similarity identically mounted onto top surface 160 (the welding station supports are not shown).

Affixed to supports 165 and 170 are rail supports 175 and 180 respectively. Rail supports 175 and 180 provide support for rails 185 and 190 respectively. Rails 185 and 190 are aligned parallel to Y-axis 28. Mounted onto rails 185 and 190 are pillow blocks 195 and 200 respectively. Pillow blocks 195 and 200 are further attached to lower base 205. Thus lower base 205 can move freely in the Y-axis 28 direction on top of carriage 15. Similarly, welding station 140 has a movable lower base (not shown) which can move freely in the Y-axis 28 direction.

Mounted to base 205 are a pair of parallel rail supports (only rail support 210 shown) which support a pair of parallel rails (only rail 215 shown) respectively. Rails 215 and 216 are aligned parallel to X-axis 27. Pillow blocks 220 and 225 are movably attached to rail 215, and two additional pillow blocks (not shown) are movably attached to the other rail.

Attached to pillow blocks 220, 225, 221, and 226 is upper base 230. The double rail configuration of parallel rails 215 and 216 in combination with their respective attached pillow blocks provide a non-rotatable and stable horizontal platform for upper base 230. Thus upper base 230 can move freely in the X-axis 27 direction (noted as arrow 239 in FIG. 4) referenced to carriage 15. Similarly, welding station 140 has upper base 231 (not shown) which moves freely in the X-axis 27 direction.

Further attached to upper base 230 is vertical support member 235 which is supported by truss support 240. One end of truss support 240 is attached to the upper end of vertical support 235 and the other end of truss support 240 attaches near the end of upper base 230 closest to the front of carriage 15.

Movably attached to vertical support 235 is movable support block 245. Block 245 is supported by dual rail, dual rail supports and respective pillow blocks (all not shown) onto vertical support 235 in a similar fashion to upper base 230, and which allows block 245 to freely move in vertical direction 260 which is parallel with Z-axis 29. Similarly, welding station 140 has movable support block 246 (not shown) which moves freely in a vertical direction parallel to the Z-axis 29 direction.

Attached to block 245 is welding collet support rod 250. On the distal end of support rod 250 is affixed stud collet 255 for engaging the head portion 265 of stud 270. Stud 270 has been previously axially aligned with collet 255 and, if a ceramic ferrule is required to be placed over the welding site 600 along with stud 270, shank 266 has been inserted into and is axially aligned with ceramic ferrule 330. Welding station 140 has similar stud collet 256 for engaging the head portion of its respective stud.

Ceramic ferrule 330 shapes the molten metal produced during the welding process to form a fillet which tends to strengthen the weld, concentrates the arc heat to an area immediately surrounding the base of the stud, substantially shields the arc from the welding operator and tends to protect the molten metal pool from atmospheric contaminants. Ferrules are extensively used during the stud welding process.

Welding station 135 further has conventional computer controlled servo positioning system 400 (shown in FIG. 6) comprising motors, drive systems and positional feedback sensors, electronic circuits etc. which in combination accurately moves and positions lower base 205, upper base 230 and block 245 along their movement axes relative to coordinate system 23.

Welding station 140 has a similar conventional computer controlled servo positioning system 405 (not shown) comprising motors, drive systems and positional feedback sensors, electronic circuits etc. which in combination accurately moves and positions its respective lower base 206, upper base 231 and block 246 along their movement X-Y-Z axes relative to coordinate system 23.

Thus welding stations 135 and 140 can independently move and position collets 255 and 256 respectively referenced to coordinate system 23 under the control of position systems 400 and 405 respectively. Additionally, welding stations 135 and 140 can independently move and positions collets 255 and 256 referenced to coordinate system 34 taking into consideration any positional offsets.

Conventional techniques for feeding and aligning both studs and ferrules into collets are well known in the art and are disclosed, for example, in U.S. Pat. No. 5,130,510, which is hereby incorporated by reference in its entirety.

Outwardly attached to support rod 250 is bracket 280. Bracket 280 supports non-electrically conducting arm 290 via pin 295. Arm 290 is constructed from electrically insulating material so that electrical welding current flows only through rod 250 and collet 255 to stud 270. Arm 290 is further rotatable about pin 295 in counter clockwise direction 315 and clockwise direction 316. An adjustable stop 296 limits arm 290 rotation in the 316 direction.

Compression spring 300 is affixed to support rod 250 above collet 255 and engages arm 290. Spring 300 biases arm 290 in direction 316. Further attached to support rod 250 above compression spring 300 location but below bracket 280 position is solenoid 305 having plunger 320. The extended portion of plunger 320 is movably affixed to arm 290. Plunger 320 also limits arm 290 rotation in the 315 direction. Arm 290 has further an extended stud alignment arm 310 and an extended ferrule holding arm 325.

When solenoid 305 is electrically energized via cable 470, plunger 320 is pulled towards the interior of solenoid 305 which subsequently forces arm 290 in direction 316 against the biasing force of spring 300 eventually being stopped by adjustable stop 296.

Figure 5:
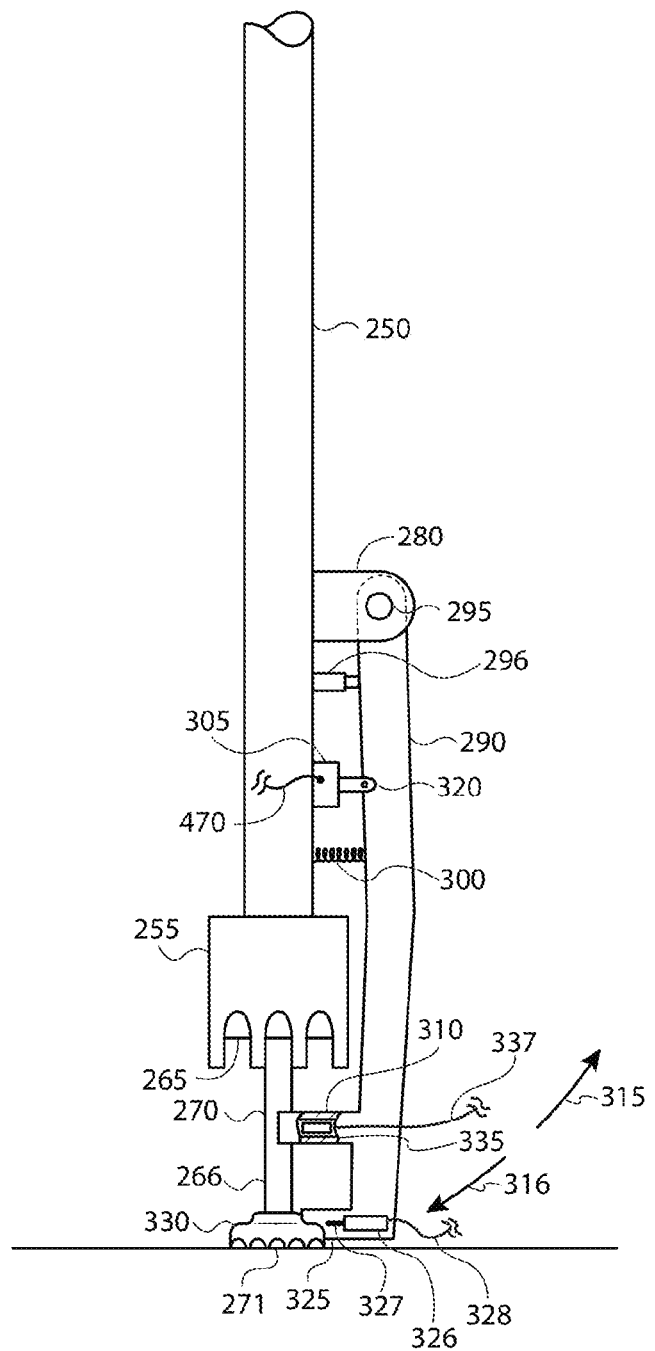
FIG. 5 is an expanded side view of the stud loading mechanism thereof, showing a stud collet, stud alignment arm, and ferrule holding arm.

Referring additionally to FIG. 5 of the drawing, rod 250 has been moved in the downward positive Z direction by positioning system 400 thereby forcibly engaging collet 255 with head 265 of stud 270.

Arm 290 is shown in contact with adjustable stop 296 having solenoid 305 energized pulling in plunger 320 and therefore having stud alignment arm 310 engaging shank 266 of stud 270 and ferrule holding arm 325 pressed against ferrule 330. Interior to arm 310 is electro-magnet magnet 335 which, when energized via cable 337, forcibly creates an attractive magnetic field which pulls and aligns shank 266 of stud 270 into a co-axially aligned position with collet 255 (and ferrule 330 if previously loaded along with stud 270).

Pressing of holding arm 325 against ferrule 330 maintains frictional contact between the outer surface of shank 266 of stud 270 and the inner surface of ferrule 330, thus holding ferrule 330 to stud 270. Stud 270 and ferrule 330 combination can now be moved by positioning system 400 and positioned to a desired X-Y-Z (or to a desired X'-Y'Z' taking into consideration positional offsets). If ferrule 330 is not present, holding arm 325 is positioned away from shank 266 and does not engage stud 270.

Additionally attached to holding arm 325 is solenoid 326 having pointed plunger 327. Plunger 327 is laterally directed at ferrule 330. When solenoid 326 is energized via cable 328, plunger 327 is forcibly extended out of solenoid 326 having its pointed end forcibly engaging and subsequently splitting ferrule 330. Welding station 140 has a similar solenoid 329 corresponding to solenoid 326, respective cable 331 and pointed plunger 333 (all not shown). Solenoid 326 can be energized by positioning system 400 to forcibly fracture ferrule 330 for later removal from surface 70. In a similar fashion, solenoid 329 can perform the same function.

Welding station 140 has identical solenoid 430 having cable 475 and electromagnet 336 having cable 338 which corresponds to solenoid 305 having cable 470 and electromagnet 335 having cable 337 respectively of welding station 135.

Stud alignment and engaging system as disclosed in reference to FIGS. 4 and 5 comprises rod 250, bracket 280, arm 290, collet 255, pin 295, adjustable stop 296, compression spring 300, solenoid 305, stud alignment arm 310, electromagnet 335, ferrule holding arm 325, ferrule fracturing solenoid 326 and associated cables and other parts for the various solenoids and electromagnet. Welding station 140 has an identical welding station 135 stud alignment and engaging system.

Thus during the welding process arm 290 aligns and supports stud 270 (which may include ferrule 330) in a vertical position and after the welding process can further fracture ferrule 330 for subsequent removal from welding sites 600. It is again noted that welding station 140 is in every respect identical to welding station 135.

In other welding stud construction applications, it may prove more convenient to have a welding station and its respective position system mounted on a conventional self-powered dual continuous-track tractor drive system similar to those used on bulldozers and other earth moving equipment and be positioned over a previously field installed I-beam.

For example, this type of welding system would be beneficial for welding studs to previously installed I-beams which may include for example, bridge girders which have been erected without having any welded stud. In this type of system, the welding system is propelled by the tractor and longitudinally positioned over a section of the top surface of the beam, studs are then subsequently welded to the welding sites using an image of the girder surface, and after the welding process is completed, the tractor is then moved to the next welding section along the beam. This "step and repeat" welding process continues until all studs have been welded onto the top surface of the beam. This type of system is more fully described later in the document and in particular with reference to FIGS. 14 and 15.

An electrical block diagram of the preferred embodiment of the invention is shown in FIG. 6 of the drawing and comprises components computer 155, imager 90, Z-distance sensor 65, X-axis linear sensor 120, X'-axis 31 positional control system 157, motor drive system 156, positional control systems 400 and 405, welding control circuits 410 and 415, keyboard 420, display 425, solenoids 305, 326, 430, 329, electromagnets 335 and 336, and power supply 121. Positioning control systems 400 and 405 control the X-Y-Z movements of welding stations 135 and 140 respectively. Welding control circuits 410 and 415 control the welding processes for welding stations 135 and 140 respectively.

All components except for solenoids 305, 326, 430, 329, control circuits 410 and 415, keyboard 420, display 425, electromagnets 335 and 336, drive system 156 and power supply 121 are in bi-directional communication with each other via bi-directional buss 435.

X'-axis 31 carriage 15 control system 157 receives positioning commands from computer 155 via bi-directional buses 158 and 435, and also receives carriage X' positional information via line 159 from sensor 120. In response to positioning commands from computer 155, control system 157 controls drive system 156 and moves carriage 15 to a desired X' position referenced to X'=0 position marker 143 (carriage 15 home position). Movement commands from X' axis control system 157 are sent to drive system 156 via bi-directional communication bus 154.

Positional control systems 400 and 405 communicate with buss 435, and hence with computer 155, via bi-directional buses 460 and 465 respectively. Positioning system 400 may therefore receive positioning commands from computer 155 to position either a stud loaded collet 255 (with or without an attached ferrule) at a desired X'-Y'-Z' coordinate defined welding site for welding stud 270 onto beam surface 70, by controlling the X-position of upper base 230, the Y-position of lower base 205 and Z-position of block 245 of stud 270.

To correctly position stud 270 over a welding site to begin the welding process, system 400 may receive the desired X-Y-Z positions from computer 155. Additionally, positioning system 400 may also send the current X-Y-Z stud (and also collet) position information to computer 155. Thus positioning system 400 can position the welding collet (with or without a stud or stud-ferrule combination) within its allowed range of motion.

Positioning system 405 is identical to system 400 and performs similar functions for welding station 140.

Positioning system 400 also controls the activation of solenoid 305 via cable 470, solenoid 326 via cable 327 and electromagnet 335 via cable 337.

Positioning system 405 likewise controls the activation of solenoid 430 via cable 475, solenoid 329 via cable 331 and electromagnet 336 via cable 338.

Control circuits 410 and 415 control the welding process for their respective stations 135 and 140 respectively. For example, the amount of welding current and arc welding time of the welding process are controlled by circuits 410 and 415 for each welding station 135 and 140 respectively. Welding currents and arc welding times are well known parameters in the art for particular sizes of studs and types of materials. For example, a stud having ¾ inch shank 266 may require in excess of 1,000 amperes of welding current, while smaller shank 266 diameter studs usually require smaller welding currents.

Control circuits 410 and 415 communicate with computer 155 via bi-directional buses 450 and 455 respectively. Welding parameters for a particular stud size for each system 400 and 405 is entered by the operator via keyboard 420 and entered into computer 155, and this information is then passed to the respective control circuits 410 and 415 by computer 155. Additionally, control circuits 410 and 415 send a signal back to computer 155 upon completion of a welding cycle.

Keyboard 420 and display 425 are conventional computer peripherals commonly provided and used with computer systems. Keyboard 420 allows an operator to input data or other information to computer 155 via bi-directional bus 440, and display 425 visually displays messages and other information to the operator from computer 155 via bi-directional bus 445. For example, the operator may enter the beam 50 data such as beam dimensions (i.e., width, length and height) or a beam identifier which can be used to point to a look-up table which contains beam 50 data. Data entered via keyboard 420 may be stored in data memory 520 of computer 155 (further discussed with reference to FIGS. 7-9).

Imager 90 communicates with computer 155 through image acquisition system 475. Image acquisition system 475 is commonly referred to as an image capture card which includes a memory buffer for storing acquired raw image data from imager 90, and also is able to transfer raw image data from its buffer to computer memory 520 (further discussed in reference to FIG. 7). System 475 handles the flow of data via buses 435 and 110 to and from imager 90 to computer 155 which may include image data signals, control and trigger signals.

Sensor 65 communicates with computer 155 via buses 66 and 435. Sensor 65 may directly send information continuously to computer 155 without the need for computer 155 to directly request sensor 65 data or computer 155 may request sensor 65 data in which case sensor 65 responds by sending the Z direction data.

Sensor 120 communicates with computer 155 via buses 141 and 435. Sensor 120 may directly send information continuously to computer 155 without the need for computer 155 to directly request sensor 120 data, or computer 155 may request sensor 120 data in which case sensor 120 responds by sending the X'-axis direction distance data.

Electrical power is supplied to all electrically operated system components by conventional power supply 121.

Figure 7:
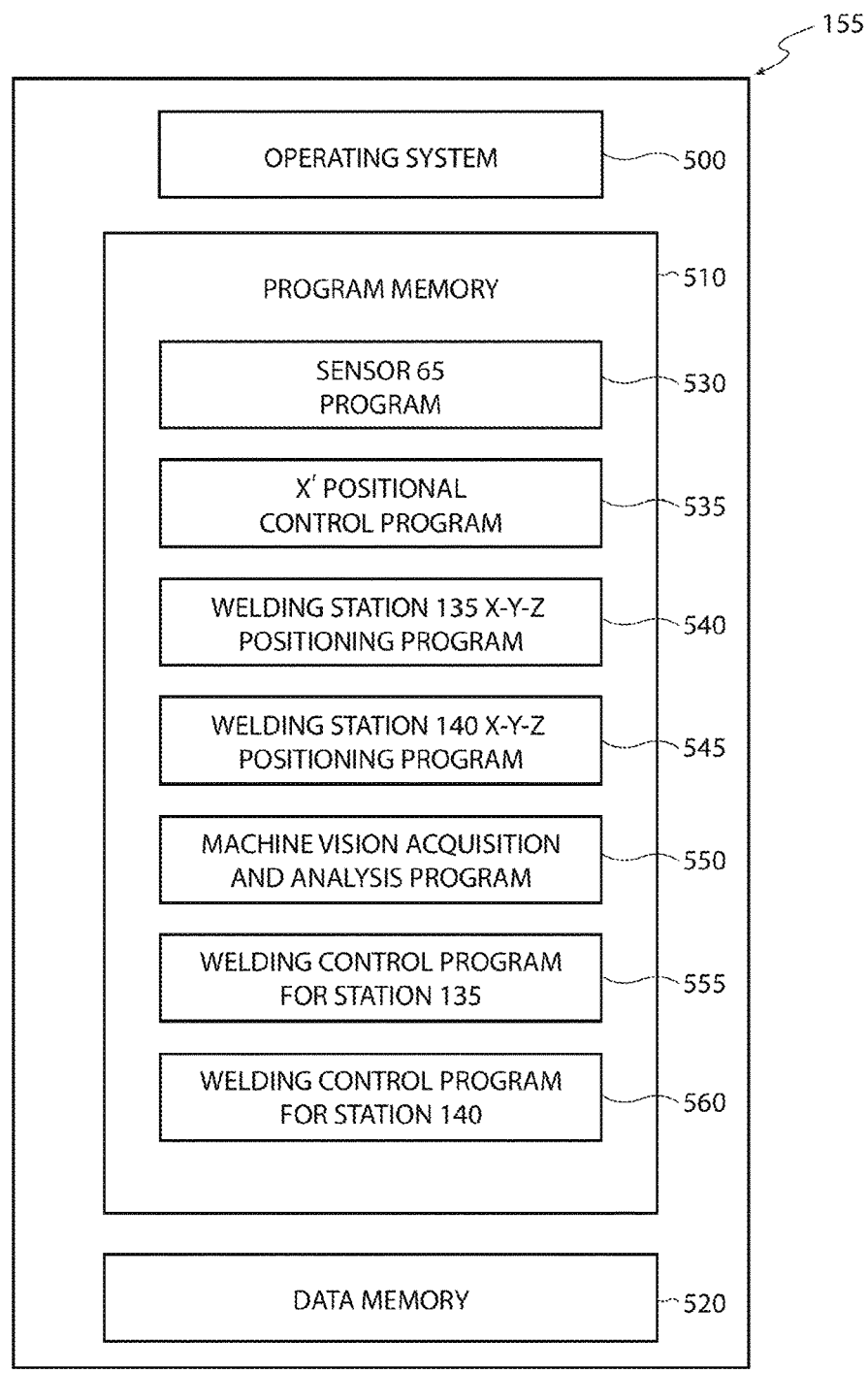
FIG. 7 is a schematic block diagram illustrating components of a computer of the preferred embodiment of the robotic welding system shown in FIG. 6.

Referring additionally to FIG. 7 of the drawing, computer 155 further comprises operating system program 500, program memory 510 and data memory 520.

Operating system program 500 is a conventional real time operating system (RTOS) or may be a Windows based operating system supplied by Microsoft Corporation, or other commonly available operating systems such as LINUX.

Program memory 510 further comprises sensor 65 data acquisition program 530, X' positional control program 535, X-Y-Z positioning program 540 for station 135, X-Y-Z positioning program 545 for station 140, machine vision acquisition and analysis program 550, welding control program 555 for station 135, and welding control program 560 for station 140.

Sensor 65 data acquisition program 530 communicates with sensor 65 and can either request immediate Z distance data in which case sensor 65 responds to this request and sends Z distance data back to computer 155, or sensor 65 can be programmed by program 530 to continuously send Z distance data back to computer 155. This is important to determine the beginning 71 and ending 72 edges respectively of beam 50. Beam edges 675 and 680 may also be determined by image analysis.

Program 530 also stores received Z distance data into computer 155 data memory 520 (discussed in reference to FIG. 8 of the drawing), and may further perform arithmetic operations (such as adding and subtracting Z data) on the stored Z distance data.

Thus computer 155 can input Z distance data from sensor 65 and determine distance 89 from carriage 15 to surface 76 (and therefore beam 50 bottom surface 80) if sensor 65 is positioned over surface 76, or from carriage 15 to beam top surface 70 if sensor 65 is positioned over beam 50 either continuously or via a computer 155 request, and can then subsequently subtract these Z distance data to calculate beam height 85. Beam height is stored in data memory 520.

Control program 535 communicates with sensor 120 and can either request immediate X'-axis positional data in which case sensor 120 responds to this request and sends X'-axis positional data back to computer 155, or sensor 120 can be programmed by program 535 to continuously send X'-axis positional data back to computer 155.

Control program 535 may also send a desired X'-axis position data for carriage 15 to X' axis control system 157 from computer 155. In response to the received X' position data, control system 157 along with drive system 156 then moves carriage 15 in a controlled fashion to the desired X' position. Both current and desired X' location data is stored in data memory 520 by program 535.

Positioning program 540 sends control and positioning signals to positioning system 400 to spatially position welding collet 255 (which may or may not have a loaded stud, or stud-ferrule combination) at a carriage 15 referenced X-Y-Z coordinate position which corresponds to a fixed X'-Y'-Z' coordinate position. Program 540 computes the required X-Y-Z position taking into consideration previously determined positional offsets for welding station 135.

In a similar fashion, positioning program 545 sends control and positioning signals to positioning system 405 to spatially position welding collet 256 (which may or may not have a loaded stud, or stud-ferrule, combination) at a carriage 15 referenced X-Y-Z coordinate to a fixed X'-Y'-Z' coordinate position. Program 545 computes the required X-Y-Z position taking into consideration previously determined positional offsets for welding station 140.

Programs 540 and 545 have permanently stored positional X-Y-Z offset values, and use these offset values along with the respective stud length and distance from carriage 15 to beam surface 70 to compute the desired X-Y-Z collet 255 and 256 positions. For example, during the stud loading process, the Z coordinate value is computed taking into consideration the stud length when moving the collet into position to load a stud. Another example includes computing the Z value for placing the stud on top of the welding site taking into consideration both the stud length and distance 87 from carriage 15 to welding site 600 on surface 70. Other X-Y-Z axis positional offsets are similarly considered. Thus programs 540 and 545 will be able to correctly position the collet or collet-stud combination at an offset adjusted X-Y-Z coordinate value which corresponds to an X'-Y'-Z' coordinate value.

Programs 540 and 545 may also receive the current X-Y-Z coordinates of 255 and 256 collets from stations 135 and 140 through positioning systems 400 and 405 respectively, and therefore can compute the corresponding X'-Y'-Z' collet and stud coordinates. Thus the X-Y-'Z' coordinates of the stud 270 surface 271 can be computed knowing the stud length (and taking into account positional offsets). Positional data is stored into data memory 520. Additionally, the current collet and stud position is important to know for controlling collet position for loading a stud into the collet or to begin the welding process.

Programs 540 and 545 can also operate independently of one another and therefore can independently position studs or collets at desired 33 or 34 coordinate system locations. Thus given a particular X'-Y'-Z' welding site coordinate, programs 540 and 545 compute the necessary X-Y-Z coordinate values for positioning collets 255 and 256 (and their associated stud or stud-ferrule combination) using positional offset adjustments.

Machine vision acquisition and analysis program 550 controls image acquisition system 475, and therefore the acquisition of images from imager 90. Control signals are sent to imager 90 through system 475 by program 550 which may include, but are not limited to, image trigger signal (i.e., when to acquire a raw image) and an electronic shutter signal (i.e., how long should the image be acquired).

Program 550 may also directly access raw image data directly from the image buffer of system 475 or from data memory 520. Program 550 also includes a camera calibration algorithm which corrects the raw image data input from imager 90 via system 475, or accessed directly from data memory 520, for lens distortion and other non-ideal camera parameters. Program 550 then stores the calibrated image data to data memory 520. When an image is triggered, program 550 also inputs the acquired image X'-axis position directly from sensor 120 or by accessing data memory 520. Program 550 then stores the calibrated image data along with the image X' position in data memory 520.

Program 550 also analyzes the stored calibrated image data and includes an algorithm for identifying each welding site within the image using conventional image segmentation algorithms. Such algorithms include image thresholding wherein welding sites are identified using the difference in grayscale values between the bright reflective welding site and the dull non-reflecting beam surface.

Program 550 further identifies the center of each welding site (which may include the center of a manually placed ferrule 330), calculates the convention (u-v) pixel coordinates of the center of each non-repeated identified welding site, calculates the X'-Y' positions of the center of each non-repeated welding site, identifies the line images of top edges 675 and 680 of beam 50, stores the u-coordinates data into data memory 520, determines the respective u coordinates for the line images of beam edges 675 and 680, determines the number of pixels between the line images of beam edges 675 and 680 using the line image u coordinates, calculates the image pixel distance to object distance ratio from the beam edges 675 and 680 using beam width 86 input data, and may also identify the images of the beginning 71 and ending 72 edges respectively and determine their respective image v coordinates in addition to other image analysis and processing functions.

Data including the (u,v) pixel coordinates of the center of every identified welding site and the X-Y and X'Y' coordinates for each welding site, along with the calculated pixel to object distance ratio is stored in data memory 520, in addition to other data.

Program 550 also computes, using the camera calibration algorithm, the camera calibration parameters which are used to correct the raw image for lens distortion and stores these parameters in data memory 520.

Welding control programs 555 and 560 program control circuits 410 and 415 respectively with the desired welding parameters for controlling the welding process for station 135 and its respective stud, and station 140 and its respective stud.

The welding parameters may include stud length and diameter, welding current, time and stud plunging distance, and may be different for circuit 410 and 415 depending upon the respective welding station stud size and other parameters. Welding parameters are input to computer 155 by the operator via keyboard 420 in response to queries displayed on display 425 by computer 155, and are subsequently sent by programs 555 and 560 to welding control circuits 410 and 415 respectively.

Programs 555 and 560 also receive a 'Welding Complete' signal sent from control circuits 410 and 415 respectively. Thus computer 155 will know when the welding cycle has been completed for welding station 135 and/or welding station 140.

It is noted that stations 135 and 140 may also accommodate different sized studs and thus welding station 135 may weld studs of one particular size and welding station 140 may weld studs of a different size onto beam surface 70.

All programs may read data from and write data to memory data 520.

Figure 8:
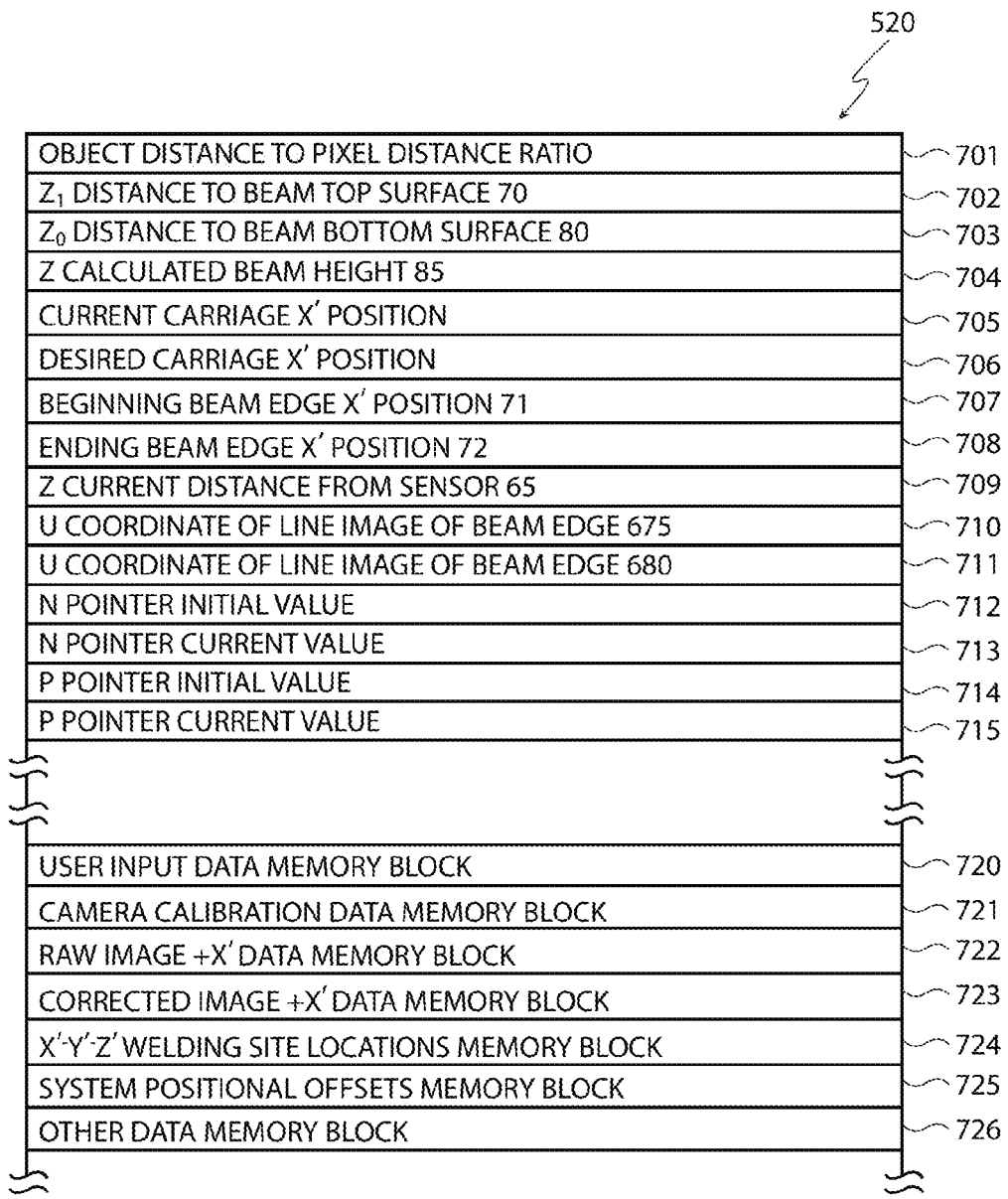
FIG. 8 is a block diagram of the data memory of the computer thereof.

Referring to FIG. 8 of the drawing, data memory 520 comprises individual memory locations 701 through 715. Individual blocks of memory comprising sets of contiguous memory include memory blocks 720 through 726. An individual memory location is a single location which stores one variable value, whereas a memory block contains many contiguous memory locations and can store many variable values. A memory block usually contains related information, such as user input data, image data or positional data. All programs contained in program memory 510 have access to data memory 520 and its contents.

Memory location 701 stores the object distance to pixel distance calculated ratio. This ratio will be used to calculate object distance locations of welding sites 600 from pixel distances. Memory locations 702 and 703 store the Z distance data from sensor 65 from carriage 15 to beam top surface 70 (noted as Z0) and from carriage 15 to bottom surface 80 (noted as Z1) respectively. Memory location 704 stores the calculated beam height 85.

Memory locations 705 and 706 store the current carriage 15 X' position and the desired carriage X' position respectively. The current carriage 15 X' value is obtained from sensor 120 which cooperates with linear scale 125.

Memory location 707 stores the X' position of beginning edge 71 of beam 50. This value is used in the offset calculations to determine the correct welding sites 600 X'-Y'-Z' coordinates for welding stations 135 and 140.

Memory location 708 stores the X' position of ending edge 72 of beam 50. The X' position value of ending edge 72 is used to determine if the welding process for all welding sites has been completed.

Memory location 709 stores the current Z distance value obtained from sensor 65.

Memory locations 710 and 711 store the u-coordinate value of the line images of beam edges 675 and 680 respectively. These values are obtained from program 550.

Memory locations 712 and 713 store the initial and current N memory pointer values, and memory locations 714 and 715 store the initial and current P memory pointer values. Pointers N and P are used to point to memory addresses of specific memory locations which contain the X'-Y'-Z' coordinate data of each welding site, noted as $X_w'$-$Y_w'$-$Z_w'$, in memory block 724 (discussed below). The N pointer and P pointer initial values are set to the starting address of memory block 724.

Memory block 720 stores user input data which is input via keyboard 420 by the operator in response to queries sent by computer 155 to display 425. These queries may ask the operator to input the length, width and height of beam 50. Additionally the operator may enter a beam identification number. This number may be used to point to a conventional look-up table which contains all of the necessary beam parameter data which has already been stored in permanent computer memory.

Memory block 720 further stores individual stud data (i.e., stud length and diameter) for stations 135 and 140. As previously stated, the preferred invention can weld two different sized studs onto beam surface 70. The stud length is an important parameter used along with other offset values to vertically position collets 255 and 256 for properly loading and seating the studs within the respective collets, and also to properly position the studs vertically with respect to top surface 70 of beam 50 just before and during the welding process.

Additionally, memory block 720 stores the welding parameters for welding control circuits 410 and 415 and includes the welding current amperage, and welding time plunging force and distance, and other parameters.

Memory block 721 stores the camera intrinsic and extrinsic calibration parameters which are used by program 550 to correct the raw image data for lens distortion and other non-ideal imager 90 characteristics. The corrected image is used to calculate the X'-Y' coordinates of the welding sites 600.

Memory block 722 stores the raw image data of surface 70 from imager 90 along with the X' position of where the image was acquired.

Memory block 723 stores the corrected image data (after applying the camera calibration program to the raw image data) along with the X' position of where the image was acquired. Each image is stored in a conventional array format used for storing images. For example, for a 640 by 480 rectangular pixel array 105 having an eight bit grayscale resolution, the memory allocated for each raw and corrected image would be 307,200 bytes of data.

Memory block 724 stores the X'-Y'-Z' welding site coordinates.

Memory block 725 stores the positional offsets for welding stations 135 and 140 respectively. The positional offsets include the distance from the X-Y-Z coordinate system origin to sensor 120, the offsets from the X-Y-Z coordinate system origin to the home positions of welding stations 135 and 140, the offsets from the X-Y-Z coordinate system origin to top surface 160 of carriage 15, and other offsets.

Memory block 726 stores other data as may be required by the preferred embodiment.

Figure 9:
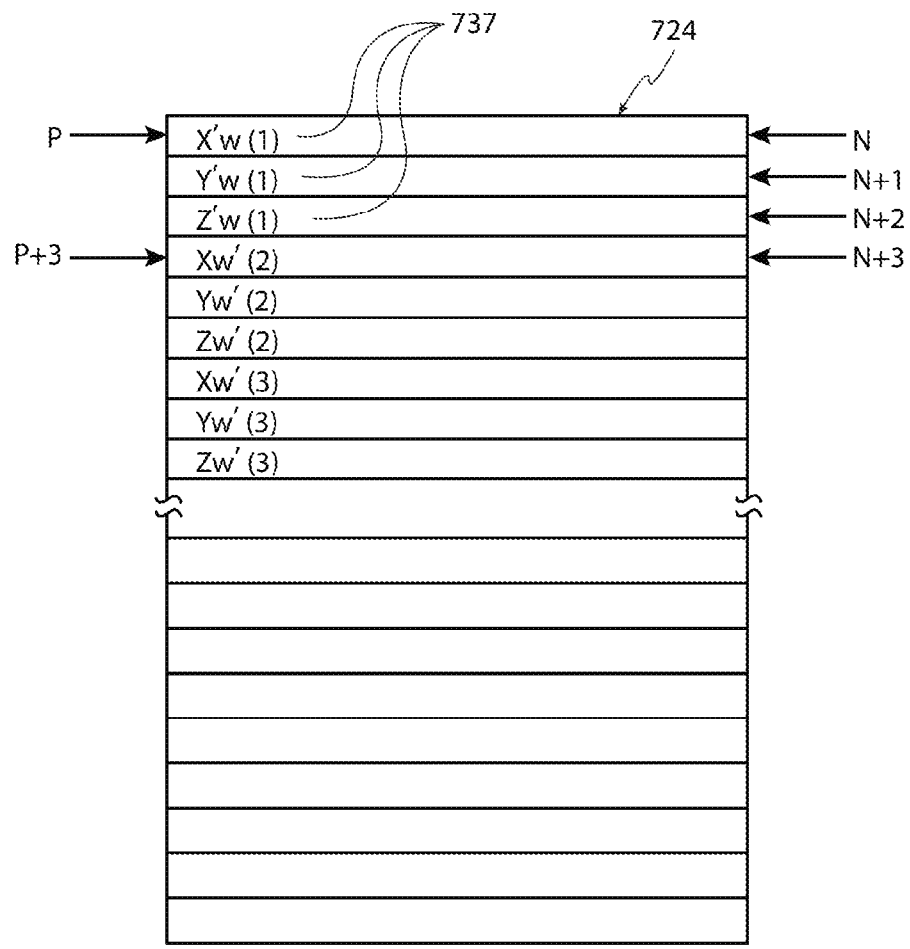
FIG. 9 is a block diagram of the welding site coordinate table of the data memory of the preferred embodiment of the robotic welding system shown in FIG. 8.

Referring additionally to FIG. 9, pointers N and P are initially set equal to the beginning address locations for the beginning of the $X_w'$-$Y_w'$-$Z_w'$ memory block 724, herein referred to as the welding site coordinate table, for each distinct welding site. Each set of $X_w'$-$Y_w'$-$Z_w'$ coordinates are referred to as a coordinate group 737 as shown in FIG. 9. Incrementing N by 3 will point to the next welding site $X_w'$-$Y_w'$-$Z_w'$ coordinate group when the previous N pointer value is pointing to the beginning of the previous $X_w'$-$Y_w'$-$Z_w'$ coordinate group (i.e., specifically to the previous group $X_w'$ coordinate). Pointer P can also be incremented in a similar fashion. Note that each welding site coordinate is identified as $(X_w'(1)$-$Y_w'(1)$-$Z_w'(1))$, the second welding site coordinate as $(X_w'(2)$-$Y_w'(2)$-$Z_w'(2))$, etc.

Individual coordinates of a particular coordinate group, for example, $X_w'(2)$, can be written to or read by computer 155 by incrementing pointer N and P by the appropriate values, and pointers N and P are incremented according to program flow more fully described in reference to FIGS. 13A-E.

Figure 10:
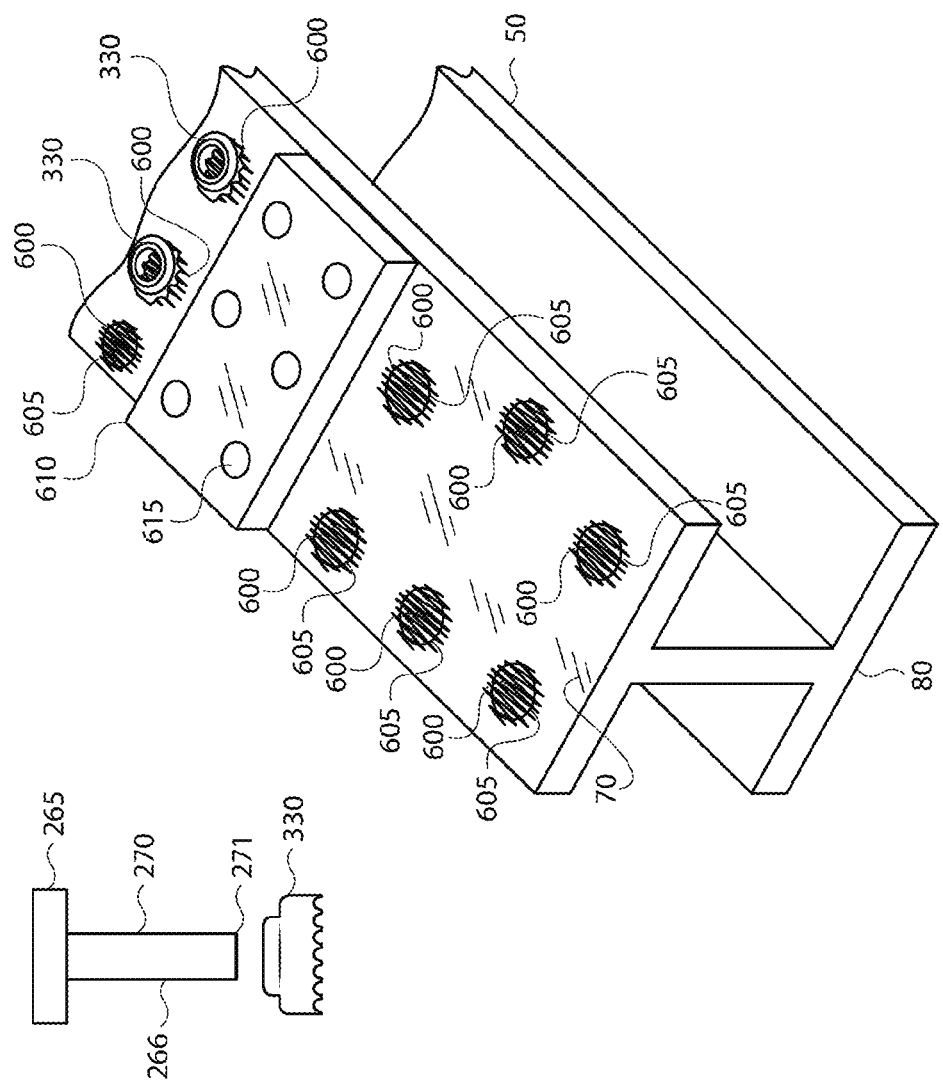
FIG. 10 is a perspective top view of the I-beam illustrating welding sites that have been defined on the surface of the I-beam, and showing welding sites both with and without ferrules located thereon.

Specifically referring now additionally to FIG. 10 and as previously noted in reference to FIG. 1 of the drawing, beam 50 is shown having a number of welding sites 600. Welding sites 600 typically consist of manually ground areas which are randomly spaced and located on beam surface 70. Welding sites 600 are coarsely ground areas which remove oxides, paint and other undesirable coatings which may interfere with the welding process. Workers are usually employed to manually grind welding sites 600 with conventional grinders.

The ground welding sites have a metal bright finish and reflect light up towards imager 90 unlike the un-ground and possibly dull, beam surface 70. The ground areas generally exceed a minimum circular area 605 which exceeds the area of welding surface 271 of stud 270. Other welding sites may also include ferrule 330 which has been manually placed in contact with and on top of welding sites 600.

Beam 50 may also include one or more structural support plates 610 which may be affixed to beam 50 with rivets 615 or welded to beam 50. Studs are usually not welded to support plates.

Figure 11:
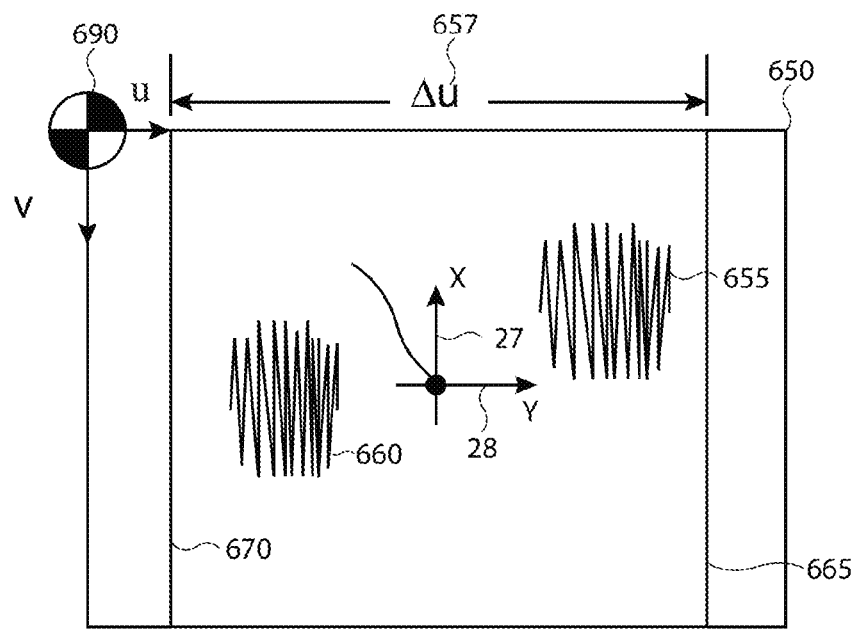
FIG. 11 is an imager plan view of the top surface of the I-beam, illustrating the image of two conventional ground welding sites and the edges of the I-beam.

Referring specifically to FIG. 11 (and also to FIG. 1) of the drawing, an image 650 of area 635 which includes beam surface 70 is shown, and includes images 655 and 660 of welding sites 640 and 645 respectively, and images 665 and 670 of beam 50 edges 675 and 680 respectively. Image 650 has further defined conventional image u-v pixel coordinate system 690. Coordinate system 690 is used to define the coordinates of each pixel in image 650. Pixel distance $\Delta u$ 657 is defined as the distance in pixels along the u axis between line images 665 and 670 of beam edges 675 and 680 respectively. Pixel difference $\Delta u$ 657 is an important parameter which will be used to calibrate image pixel distance to object distance. Also overlaid onto image 650 are the X-axis 27 and Y-axis 28 of coordinate system 23, having the origin defined at the surface and center 91 of pixel array 105.

Figure 12:
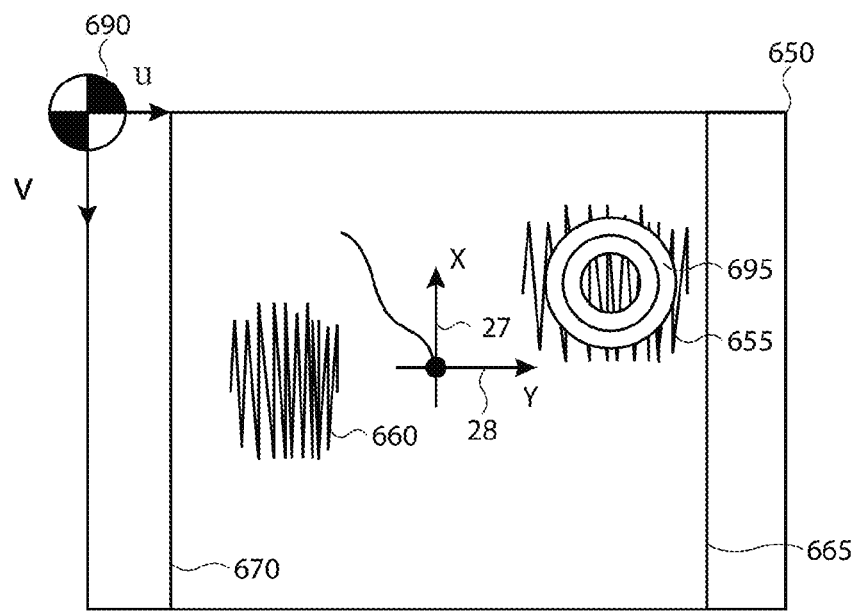
FIG. 12 is an imager plan view of the top surface of the I-beam, illustrating the image of two welding sites, one site having a ferrule placed on top of the welding site, and the edges of the I-beam.

Referring additionally to FIG. 12 of the drawing, an image 650 of area 635 is shown but now having ferrule 330 placed on top of welding site 640. Image 650 now includes a top down image 695 of ferrule 330 placed over the welding site image 655. Ferrule 330 may sometimes be manually placed over the welding sites, for example, during the stud welding process used on bridge girders.

In operation and referring additionally to FIGS. 13A-E of the drawing, the operator in step 1000 first inputs a 'System Start' command using keyboard 420 which then subsequently sends a signal via bus 440 to computer 155. Program flow then proceeds to step 1010.

In step 1010, computer 155 in response to the 'System Start' command sets all variables in data memory 520 to 0 including all memory block data (all memory block data is initialized to 0).

A memory block of contiguous memory locations is then allocated for storing the $X_w'$-$Y_w'$-$Z_w'$ welding site locations in tabular form (welding site coordinate table) as previously shown in FIG. 9, or conventional dynamic memory allocation techniques may be used to allocate memory. Pointers N and P are initially set to point to the first memory location $X_w'(1)$-$Y_w'(1)$-$Z_w'(1)$ of the welding site coordinate table (memory block 724). Program flow then proceeds to step 1015.

In step 1015, computer 155 then sends a query message via bus 445 to display 425 for the operator to enter in the beam data including beam length, width and height, and may also request the operator to enter a beam 50 identification number. The operator enters this data via keyboard 420 which is sent to computer via bus 440 and computer 155 subsequently stores this data in memory block 720 of data memory 520. Program flow continues to step 1020.

In step 1020, computer 155 again sends a query message via bus 445 to display 425 for the operator to acknowledge if ferrules are to be loaded with their respective studs for stations 135 and 140 during the welding process. Ferrules may be loaded for station 135 only, for station 140 only, or for both stations 135 and 140. The operator responds via keyboard 420 and this data is sent to computer 155 via bus 440, and subsequently stored in memory block 720. Program flow then continues to step 1025.

In step 1025, computer 155 again sends a query message via bus 445 to display 425 for the operator to enter the respective stud sizes which are to be used with welding stations 135 and 140. The operator responds via keyboard 420 and this data is sent to computer 155 via bus 440, and subsequently stored in memory block 720. Stud size is further sent by computer 155 to welding stations positioning systems 400 and 405 via buss 435, and buses 460 and 465 respectively.

Stud size data (and in particular stud length) is used by systems 400 and 405 to determine the proper amount of travel distance in the Z direction required by positioning systems 400 and 405 to fully engage collets 255 and 256 with their respective studs, and further to determine the appropriate amount of travel distance in the Z direction required for just setting their respective welding surface 271 onto the top surface 70 of beam 50 over their respective welding sites 600 at the beginning of the welding process. Program flow then continues to step 1030.

In step 1030, computer 155 again sends a query message via bus 445 to display 425 for the operator to enter the respective welding parameters for welding stations 135 and 140. The operator responds via keyboard 420 and this data is sent to computer 155 via bus 440, and subsequently stored again in memory block 720 along with the respective stud data.

In response to receiving the welding parameter data, computer 155 transmits the welding parameter data to both welding stations control circuits 410 and 415 via buses 450 and 455 respectively, thereby programming control circuits 410 and 415 with the desired welding parameter data stations such as the amount of welding current, time, stud plunging distance, etc. for their respective welding stations. Program flow continues to step 1035.

Continuing now to step 1035, computer 155 now inputs the current carriage 15 X' position from sensor 120 via buses 141 and 435 and stores this value in memory location 705, and sends this value via bus 445 to display 425 for viewing by the operator. Program flow then continues to step 1040.

In step 1040, computer 155 compares the current carriage 15 X' position with the X'=0 (home position) position marker 143. If the current carriage 15 X' position is not equal to X'=0, program flow continues to step 1045. If the current carriage X' position=0, program flow continues to step 1050.

In step 1045, computer 155 sends a 'Move Carriage Home' command via buses 435 and 158 to X' axis control system 157 which causes drive system 156 to move carriage 15 in an X' direction to force the difference between the current X' position and the X'=0 position to equal zero. Control system 157 inputs the current X' position from linear sensor 120 via line 159. For example, if the current position X' position of carriage 15 in step 1035 is +30.00 inches, control system 157 will move carriage 15 in the negative X' direction continually inputting the current X' position from linear sensor 120 until carriage 15 reaches its X'=0 home position. When the current carriage 15 X' position is equal to X'=0 position, program flow continues to step 1050.

In step 1050, control system 157 then commands drive system 156 to stop carriage 15. Carriage 15 is now stopped at the X'=0 position marker home position and a 'Carriage Stopped' signal is sent to computer 155. Program flow continues to step 1055.

In step 1055, computer 155 then inputs Z distance data from sensor 65 via buses 66 and 435. Note that the home position of carriage 15 locates sensor 65 before the beginning edge 71 of beam 50 as shown in FIG. 1 of the drawing so that sensor 65 inputs the distance from carriage 15 to surface 76, and therefore to bottom surface 80 of beam 50. This data is stored in memory location 703 as Z0. Program flow continues to step 1060.

Continuing now to step 1060, computer 155 sends a 'Home Welding Station' command to positioning systems 400 and 405 via buss 435 and buses 460 and 465, respectively. In response to the 'Home Welding Station' command, positioning system 400 moves support rod 250 of welding station 135 vertically upwardly to its most upright position and then positions collet 255 to a X-Y coordinate position which axially aligns collet 255 to the loading position for stud 270 as shown in FIG. 3. At this position collet 255 will be axially aligned with, but not engaged with, stud 270 (or stud 270 and ferrule 330 combination).

In a similar fashion and in response to the 'Home Welding Station' command, positioning system 405 moves its corresponding are vertically upwardly to its most upright position and then positions welding collet 256 over the position where its stud, or stud-ferrule combination will be placed, and at this position collet 256 will be axially aligned with, but not engaged with its stud (or stud and ferrule combination).

It is assumed that the stud or stud-ferrule combination has been previously positioned for both welding stations 135 and 140 by conventional means—which may include those described in U.S. Pat. No. 5,130,510—and further that the positions of the stud or stud-ferrule combination for welding stations 135 and 140 are known. Unless ferrule 330 has been previously manually placed onto beam surface 70, stud 270 has been inserted into ferrule 330 during the stud loading process as shown in FIG. 4 of the drawing. The home positions top view for both welding stations 135 and 140 are shown in FIG. 1.

Positioning system 400 then moves support block 245 in the negative Z-direction until collet 255 engages head 265 of stud 270, fully seating head 265 of stud 270 within collet 255. The Z-direction distance is computed using the length of stud 277 previously stored in memory block 720 and system distance offsets stored in memory block 725.

Positioning system 400 then energizes solenoid 305 via cable 470 thereby pulling plunger 320 into solenoid 305. The force exerted on arm 290 by solenoid 305 through plunger 320 rotates arm 290 around pin 295 in direction 316, simultaneously compressing spring 300.

Arm 290 continues to rotate around pin 295 in direction 316 until arm 290 engages adjustable stop 296. With arm 290 resting against adjustable stop 296, arm 310 engages the lower portion of the shank of stud 270. Positioning system 400 then energizes electromagnet 335 via cable 337 magnetically locking stud 270 to arm 310 and coaxially aligning stud 270 vertically with collet 255.

If ferrule 330 has been previously loaded along with stud 270 as shown in FIG. 4, arm 325 would then further engage ferrule 330 holding collet 255 against the lower shank portion of stud 270. If ferrule 330 has been previously manually placed onto beam surface 70, arm 325 does not engage stud 270.

Stud 270 (along with ferrule 330 if required) is now vertically aligned and ready to be moved by positioning system 400 over a welding site. With stud 270 engaged and aligned with collet 255, positioning system 400 sends a 'Stud Loaded' signal to computer 155 via buses 460 and 435. A similar 'Stud Loaded" signal is sent by positioning system 405 to computer 155 via buses 465 and 435. These positions are defined as the home positions for welding stations 135 and 140 (and include their respective studs or stud-ferrule combinations engaged in their respective collets).

Upon computer 155 receiving both 'Stud Loaded' signals from both positioning systems 400 and 405, program flow continues to step 1065.

In step 1065, computer 155 then sends a 'Move Carriage In +X' Direction' to control system 157 via buses 435 and 158. In response to this command, control system 157, along with drive system 156, begins to move carriage 15 along longitudinal axis 51 of beam 50 in the +X' axis direction. Program flow continues to step 1070.

In step 1070, computer 155 inputs the current Z value from sensor 65 via buses 66 and 435 and stores this value in memory location 709. Program flow then proceeds to step 1075.

In step 1075, computer 155 continuously compares the current Z distance value stored in memory location 709 from sensor 65 to the previously stored value Z0 in memory location 703. As carriage 15 begins moving along Z-axis 29, computer 155 continually inputs Z distance information. If the current value is not less than Z0 (indicating sensor 65 is still reading the distance from the carriage to the bottom surface 80 of beam 50), program flows back to step 1070 having computer 155 inputting the current sensor 65 Z distance value as carriage 15 is still moving in the positive X'-axis direction.

If the current sensor 65 Z distance value changes and is less than Z0 (indicating sensor 65 is now over beam 50), program flow proceeds to step 1080. Note that a Z distance change indicates that the beginning edge 71 of beam 50 has been detected.

In step 1080, computer 155 stores the latest Z value as Z1 (indicating that sensor 65 position is now over the beginning edge 71 of beam 50) in memory location 702. The Z1 data represents the distance from sensor 65 to beam surface 70. Computer 155 may also compute beam height 85 using the Z0 and Z1 distance readings as a check against the beam height data previously entered by the operator or previously stored in a look-up table containing beam data. Program flow then proceeds to step 1085.

In step 1085, computer 155 inputs X' positional data from sensor 120 via buses 141 and 435 and stores the X' position value for beginning edge 71 position in memory location 707. Alternately, imager 90 may begin to image beam surface 70 at the start of carriage 15 movement and, along with machine vision acquisition and analysis program 550, may determine beginning edge 71 of beam 50 using conventional digital image processing algorithms. In either case the X'-axis position of beginning edge 71 of beam 50 is known (referenced to the X'=0 position marker) and stored into data memory location 707. Program flow then proceeds to step 1090.

In step 1090, computer 155 inputs the current Z distance from sensor 65 and checks if this value is greater than Z1 indicating that the Z sensor has passed ending edge 72 of beam 50. Alternately, imager 90 can determine the ending edge 72 of beam 50 using conventional digital image processing algorithms. In either case the X'-axis position of ending edge 72 of beam 50 is known and stored into data memory location 708. If sensor 65 (or imager 90) has not detected beam ending edge 72, computer 155 proceeds to 1100; otherwise, computer 155 proceeds to step 1200.

In step 1100, computer 155 checks if the current X' carriage position is equal to a welding site coordinate Xw' pointed to by pointer P (noted as Xw' (P) in FIG. 9). The welding site coordinate Xw' is determined and offset corrected from the image of the beam surface 70. If a welding site Xw' coordinate value equals the current X' coordinate value, computer 155 then proceeds to step 1105 where carriage 15 is stopped via systems 156 and 157. If a welding site coordinate value Xw' does not equal the current X' coordinate value, computer 155 then proceeds to step 1110. Initially, welding site coordinate Xw' has been set to 0 during step 1010 and will not equal the current X' carriage position coordinate. Computer 155 will then initially proceed directly to step 1110. It is understood that the welding sites X-Y-Z coordinates are transformed to the X'-Y'-Z' coordinate system using offset adjustments and known coordinate transformation methods.

In step 1110, computer 155 acquires images of surface 70 from imager 90 using image and machine vision acquisition and analysis program 550 and image acquisition system 475. System 475 periodically sends trigger signals to imager 90 via buses 435 and 110, and in response to the trigger signal, imager 90 captures the respective raw image and sends the image data to system 475 using buses 110 and 435 to image acquisition system 475. Additionally, at the instant when the image was completely captured computer 155 further obtains the X' positional data from sensor 120 via buses 141 and 435. Computer 155 then stores the acquired raw image data along the X' position of carriage 15 into memory block 722 of data memory 520. Machine vision program 550 then uses the previously determined camera calibration parameters stored in memory block 721 and the camera (imager) calibration algorithm to correct the raw image for lens distortion and other imager 90 factors and stores the corrected image data along with the X' position to memory block 723. Program flow proceeds to step 1115.

In step 1115, computer 155 determines, using the stored corrected image of surface 70 and machine vision acquisition and analysis program 550 if a welding site is identified in the previously corrected image which is stored in memory block 723.

Program 550 identifies a welding site in the stored image by first filtering the entire image using grayscale thresholding. Ground welding sites 600 have a higher light reflectivity (electromagnetic energy reflectivity) and therefore a higher grayscale value than the surrounding dull beam surface 70. Next program 550 determines pixel connectivity to define the welding sites 600 and then further determines if the area of the identified imaged welding site equals or exceeds a minimum area value based upon the previously input stud diameter. For example, for a 0.75 inch diameter stud, a minimum welding site area may have a diameter of 1 inch (which approximately equals an area of 0.78 square inches) may be considered acceptable. If a welding site has been identified, program flow then proceeds to step 1120, otherwise program flow proceeds back to step 1090.

In step 1120, computer 155 determines the "center of mass" for each identified welding site. The "center of mass" term is well known in the art of digital image processing and refers to the process of first determining connected components (images of welding sites) in step 1115 and then computes for each welding site the (u,v) value for the 'center of mass' (i.e., the first moment) using conventional algorithms which have been developed to perform this particular task.

Since most of the previously ground welding sites will have a somewhat defined shaped (generally circular or rectangular shaped), the center of mass coordinates for each welding site is used to define the welding site position for stud 270. Program flow then proceeds to step 1122.

In step 1122, computer 155 using the stored corrected image of surface 70 and machine vision acquisition and analysis program 550, identifies the line images 665 and 670 for beam edges 675 and 680 respectively. Computer 155 then determines Δu 657 pixel value, and knowing the width of beam 50 which has been stored in memory block 720, calculates the object distance to pixel distance ratio. For example, if the beam width is 10 inches and Δu is calculated to be 500 pixels, then the object to pixel distance ratio is 0.020 inches per pixel. Each pixel now has an equivalent object distance value. This ratio is used to calculate the center of mass (u,v) coordinates and the X'-Y' coordinates of welding sites 600 (using the system offsets), and this ratio is stored in memory location 701. Computer 155 then proceeds to step 1125.

In step 1125, computer 155 determines the X'-Y'-Z' coordinates for each welding site using the system coordinate offsets and the previous calculated object to pixel distance ratio. As carriage 15 moves along in the X' direction, imager 90 could possibly capture a sequence of images displaced in the X' direction which could contain the exact same welding sites. These duplicate welding sites are eliminated from the X'-Y'-Z' welding site coordinate table and only one set of coordinates per welding site 600 is calculated. A table of these unique welding sites $X_w'$-$Y_w'$-$Z_w'$ coordinates is further formed. Computer 155 then proceeds to step 1130.

In step 1130, computer 155 orders and then stores the unique welding site 600 X'-Y'-Z' welding site coordinates determined in step 1125 beginning first with the $X_w'$ coordinate value (which will always be positive) and then the $Y_w'$ coordinate value which could be negative (if the welding site is to the left of the Y' axis origin), positive (if the welding site is to the right of the Y' axis origin) or equal to 0 if the welding site lies on the Y' axis origin, and finally the Z' coordinate value. The $X_w'$-$Y_w'$-$Z_w'$ coordinates are stored in contiguous memory locations contained within memory block 724 and pointed to by pointer N as shown in FIG. 9. For each $X_w'$-$Y_w'$-$Z_w'$ coordinate group stored in memory, pointer N is incremented to point to the next available free memory location to store the next unique $X_w'$-$Y_w'$-$Z_w'$ coordinate group. Computer 155 then proceeds back to the beginning of step 1090.

Referring back to FIG. 13C, and specifically step 1100, if the X' (offset adjusted to account for the X offsets of the welding stations 135 and 140) position of carriage 15 equals the X' coordinate value of a welding site 600, computer 155 proceeds to step 1105.

In step 1105, computer 155 sends a 'Stop Carriage' command to control system 157 which, through drive system 156, stops the movement of carriage 15. At this point carriage 15 is at a stopped position along the X' axis where welding stations 135 and 140 can place the stud or stud-ferrule combination respectively at the correct (offset corrected) welding sites. Program flow continues to step 1140.

In step 1140, computer 155 then determines the corresponding $Y_w'$ coordinate of the $X_w'$-$Y_w'$ coordinate pair pointed to by pointer P in memory block 724 and determines if the corresponding value of $Y_w'$ is negative or if the value of $Y_w'$ is zero or positive. If $Y_w'$ is negative, computer 155 proceeds to step 1145. If $Y_w'$ is positive or equals zero, computer 155 proceeds to step 1165.

In step 1145, computer 155 commands station 135 (via positioning system 400) to first raise collet 255 at the farthest point above top surface 160 of carriage 15, and then commands station 135 to move base 205 in the −X direction a distance (offset adjusted) required to place stud 270 at the calculated $X_w'$ welding coordinate. Computer 155 then commands station 135 (via positioning system 400) to move stud 270 in the Y direction a distance (offset adjusted) required to place stud 270 or stud 270-ferrule 330 combination at the calculated $Y_w'$ welding coordinate. Computer 155 then commands station 135 (via positioning system 400) to move the stud (or stud-ferrule combination) in the Z direction a vertically downward distance (offset adjusted to account for the stud length and the distance from carriage 15 to beam surface 70, etc.) so that the bottom welding surface 271 of stud 270 comes into contact with the welding site defined by the $X_w'$-$Y_w'$-$Z_w'$ coordinate group. Computer 155 then proceeds to step 1150.

In step 1150, computer 155 sends a 'Start Welding' signal via bus 450 to welding control circuit 410. Control circuit 410 begins the welding process using the previous programmed welding parameters stored in memory block 720. Program flow continues to step 1155.

In step 1155, welding control circuit 410 continually checks to determine if the welding cycle has been completed. If the welding cycle in not completed, program flow proceeds to step 1150 and continues with the stud welding process. Further, a 'Welding Cycle Completed' signal is sent from control circuit 410 back to computer 155 via bus 450. When the welding cycle is completed, program flow continues to step 1156.

In step 1156, computer 155, in response to receiving the 'Welding Cycle Completed' signal from welding control circuit 410, signals positioning system 400 to momentarily energize solenoid 326 which thrusts pointed plunger 327 into the side of ferrule 330, fracturing the body of ferrule 330. Also, since the stud has been welded to surface 70, system 400 de-energizes solenoid 329 which releases arm 290 from holding onto shank 266 and de-energizes solenoid 305 which allows arm 290 to move in direction 315 under the biasing force of compression spring 300 away from stud 270. Support rod 250 may now be moved vertically, disengaging collet 255 from stud head 265. Computer 155 additionally knows the X-Y-Z position of collet 255. Program flow then proceeds to step 1160.

In step 1160, computer sends a 'Home Welding Station' command to positioning system 400. In response to the 'Home Welding Station' command, position system moves lower base 205, upper base 230 and block 245 of welding station 135 into its home position previously defined and loads a stud or stud-ferrule combination into collet 255. Program then proceeds to step 1185.

Figure 13A:
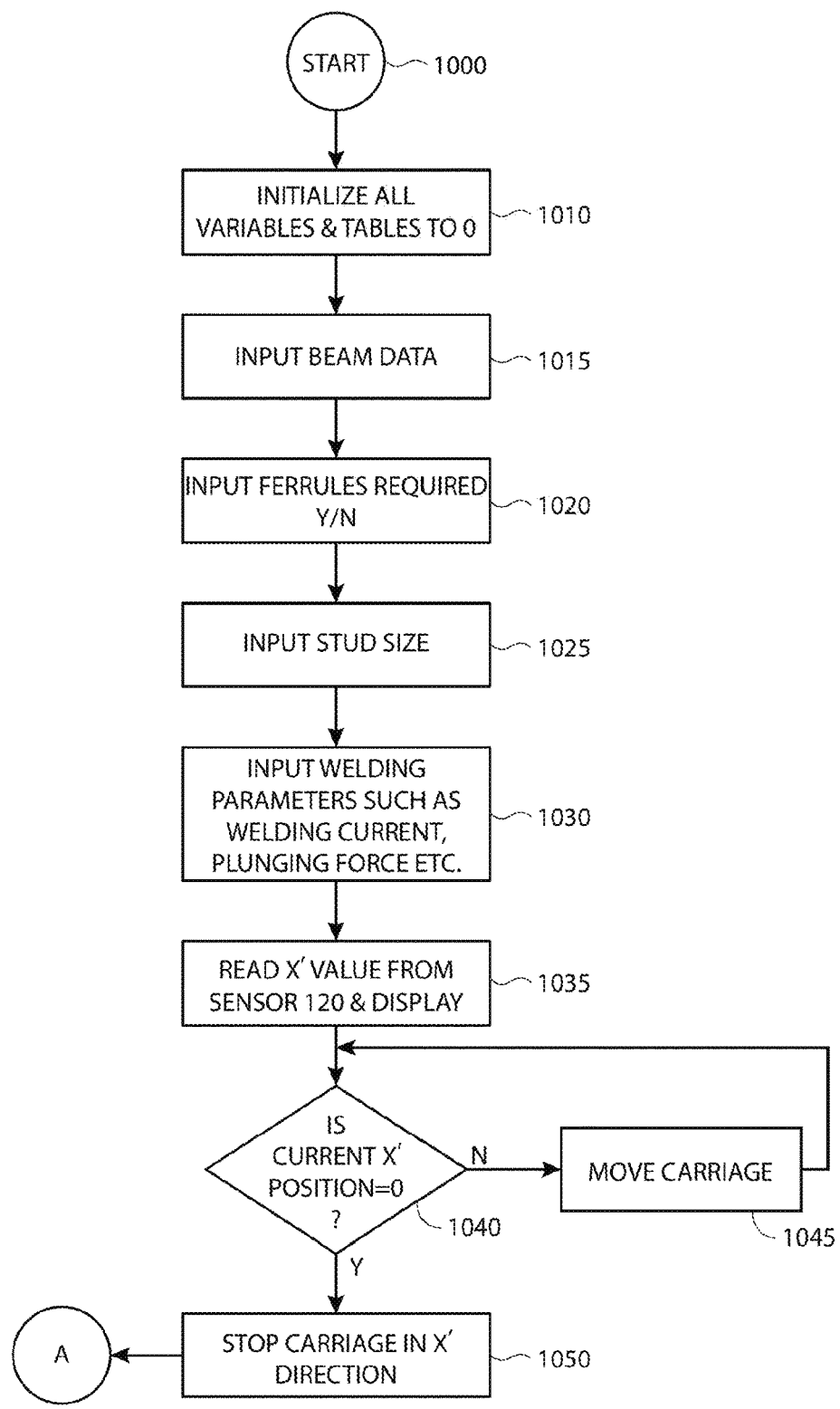
FIGS. 13A-13E, in combination, is an operational flow chart of a preferred embodiment of the robotic welding system according to the present invention.
Figure 13B:
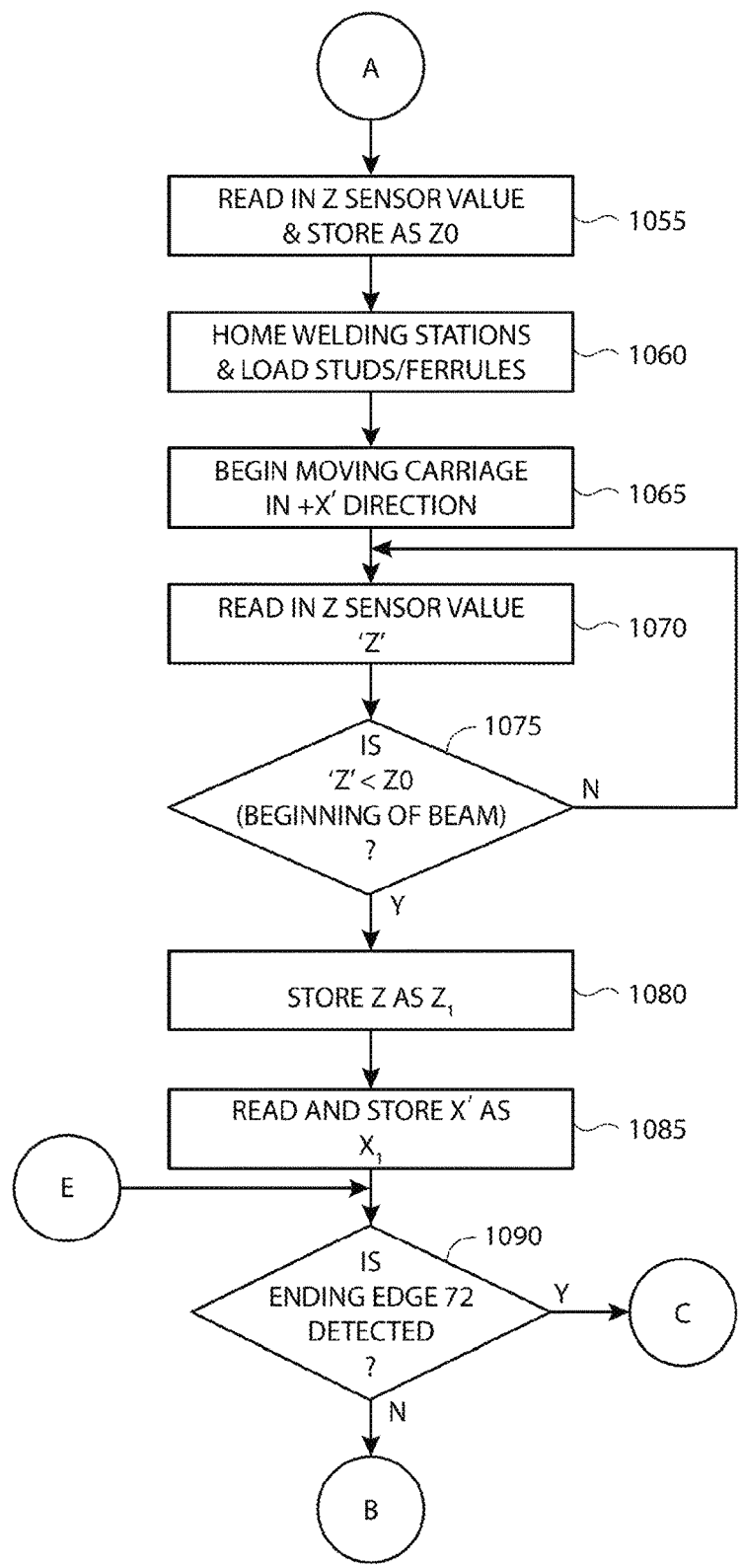
Figure 13C:
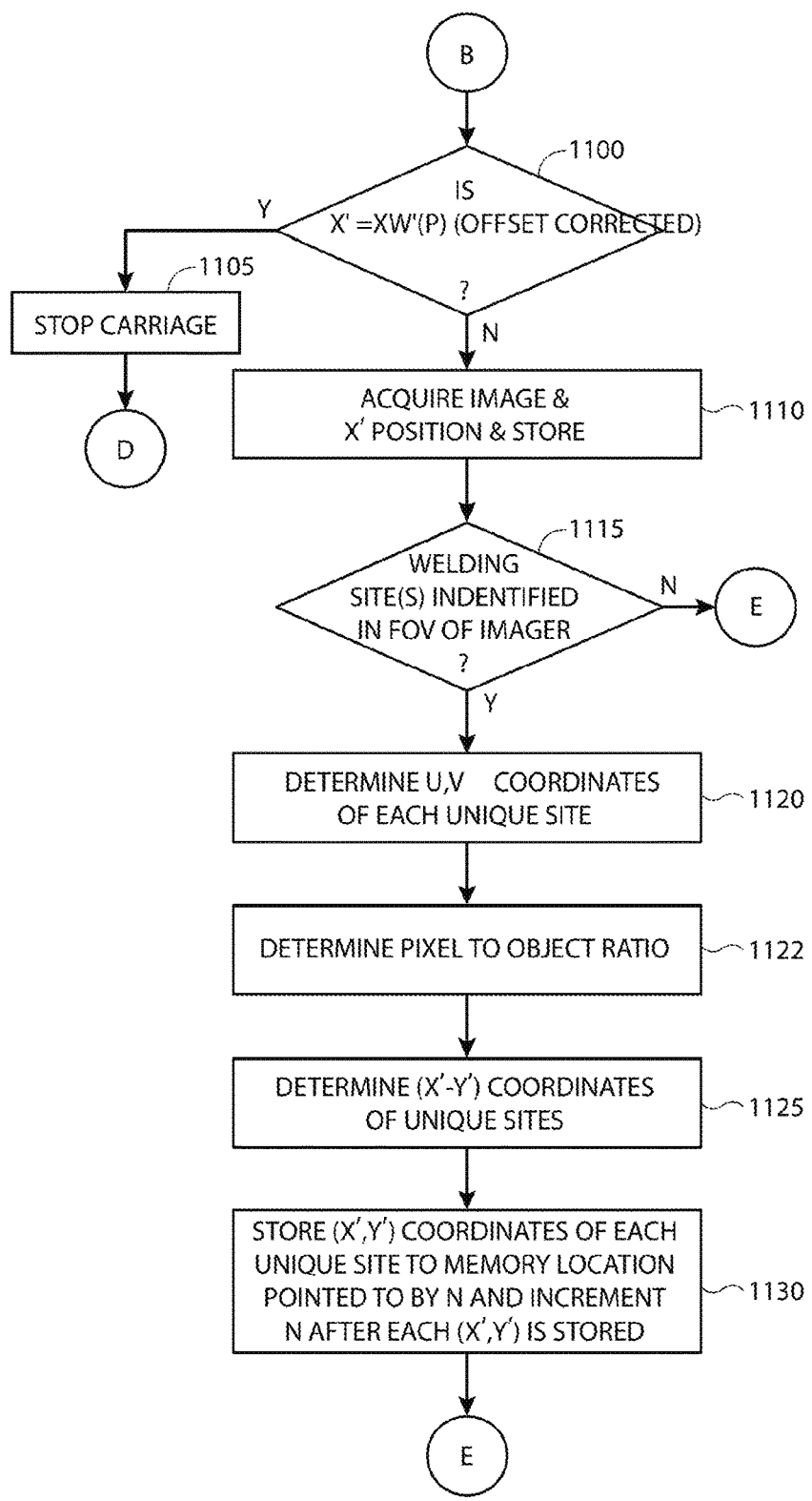
Figure 13D:
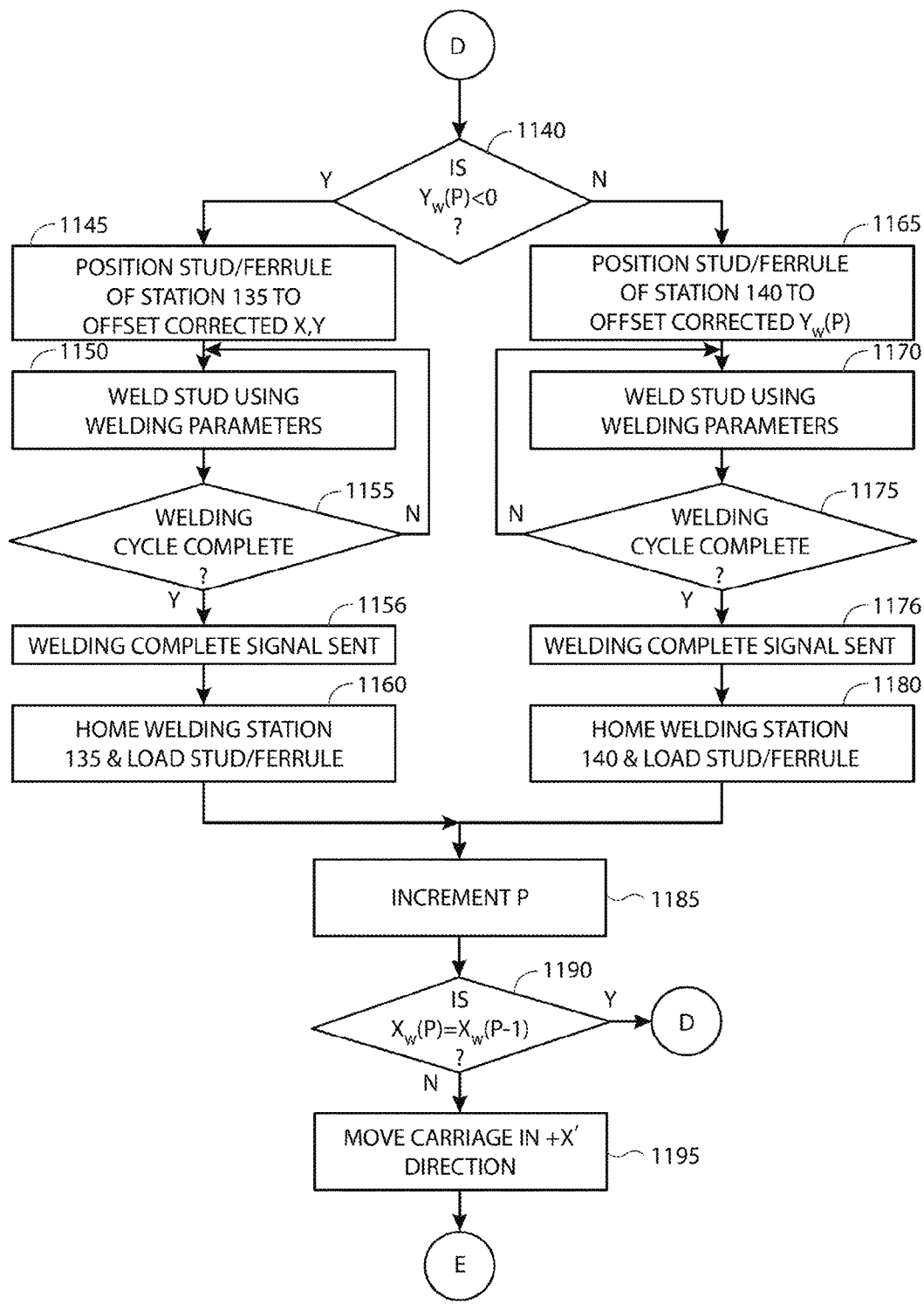
Figure 13E:
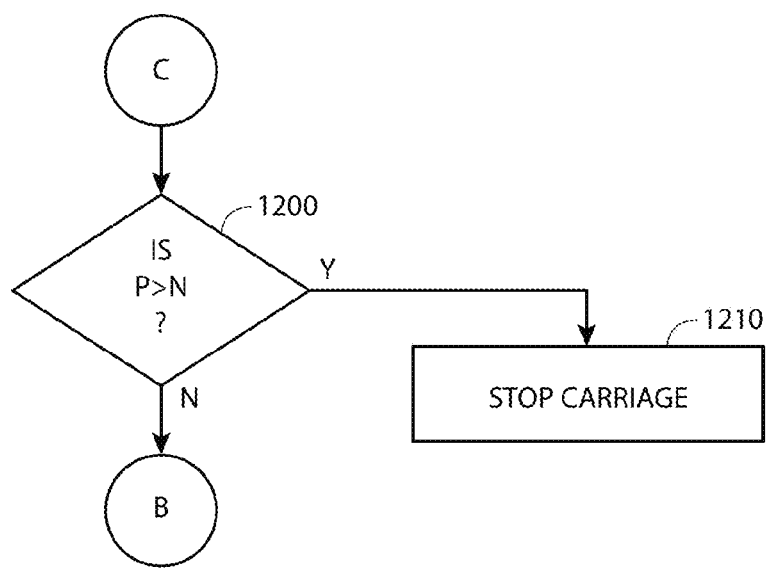

Referring back to step 1140 of FIG. 13D, if $Y_w'$ is positive or equals zero, computer 155 proceeds to step 1165.

In step 1165, computer commands the welding station 140 (via positioning system 405) to first raise collet 256 at the farthest point above top surface 160 of carriage 15, and then commands the welding station 140 to move base 206 in the –X direction a distance (offset adjusted) required to place the previously loaded stud or stud-ferrule combination at the calculated $X_w'$ welding coordinate. Computer 155 then commands the welding station 140 (via positioning system 405) to further move the stud in the Y direction a distance (offset adjusted) required to place the stud or stud-ferrule combination at the calculated $Y_w'$ welding coordinate. Computer 155 then commands the welding station 140 (via positioning system 405) to move the stud or stud-ferrule combination in the Z direction a vertically downward distance (offset adjusted to account for the stud length and the distance from carriage 15 to beam surface 70, etc.) so that the bottom surface of its respective stud comes into contact with the welding site defined by the $X_w'$-$Y_w'$-$Z_w'$ coordinates. Computer 155 then proceeds to step 1170.

In step 1170, computer 155 sends a 'Start Welding' signal via bus 450 to welding control circuit 415. Control circuit 415 begins the welding process using the previous programmed welding parameters stored in memory block 715. Program flow continues to step 1175.

In step 1175, welding control circuit 415 continually checks to determine if the welding cycle has been completed. If the welding cycle in not completed, program flow proceeds to step 1170 and continues with the welding process. Further, a 'Welding Cycle Completed' signal is sent from control circuit 415 back to computer 155 via bus 455. When the welding cycle is completed, program flow continues to step 1176.

In step 1176, computer 155, in response to receiving the 'Welding Cycle Completed' signal from welding control circuit 415, signals positioning system 405 to momentarily energize solenoid 329 which thrusts its pointed plunger into the side of its ferrule, fracturing the body of the ferrule. Also, since the stud has been welded to surface 70, system 405 de-energizes solenoid 430 which releases its respective arm from holding onto the shank of its respective stud and de-energizes solenoid 430 which allows its respective arm to move away from its respective stud. Its respective arm may now be moved vertically disengaging collet 256 from its respective stud head. Computer 155 additionally knows the X-Y-Z position of collet 256. Program flow then proceeds to step 1180.

In step 1180, computer sends a 'Home Welding Station' command to positioning system 405. In response to the 'Home Welding Station' command, positioning system 405 moves welding station 140 into its home position previously defined, and loads a stud or stud-ferrule combination into collet 256. Program then proceeds to step 1185.

In step 1185, pointer P is incremented to point to the beginning of the next welding site $X_w'$-$Y_w'$-$Z_w'$ group coordinate value. Program flow continues to step 1190.

In step 1190, the current $X_w'$ coordinate value (now referred to as $X_w'(P)$) is compared against the previous $X_w'$ coordinate value (now referred to as $X_w'(P-1)$). If the current $X_w'(P)$ coordinate value equals the $X_w'(P-1)$ coordinate value, program flow proceeds back to step 1140. When this occurs, it means that there are additional welding sites which have the same $X_w'$ coordinate value and the only difference is in the $Y_w'$ coordinate values. If the current $X_w'(P)$ coordinate value does not equal the $X_w'(P-1)$ coordinate value, program flow proceeds to step 1195.

In step 1195, computer 155 commands system 157 to begin to move carriage 15 in the positive X' direction. Program flow then proceeds back to step 1090.

Referring back to step 1090, if beam ending edge 72 is detected by sensor 65 and imaged by imager 90 (taking into consideration the positional offset between sensor 65 and imager 90), all unique remaining welding sites 600 have now been imaged and their respective X'-Y'-Z' coordinates determined using machine vision program 550. Program flow proceeds to step 1200.

In step 1200, all unique welding sites 600 have been saved into memory block 724 and pointer N now points to the next available and free memory location in block 724. However, N is no longer going to be incremented, because there are no more unique welding site coordinates. Pointer P is incremented after each stud welding process. If P is not greater than N, program flow proceeds back to step 1100 and there are more sites to be welded. If P is greater than N, program flow continues to step 1210.

In step 1210, computer 155 commands system 157 to stop carriage 15. All welding sites 600 now have a welded stud in place.

Figure 14:
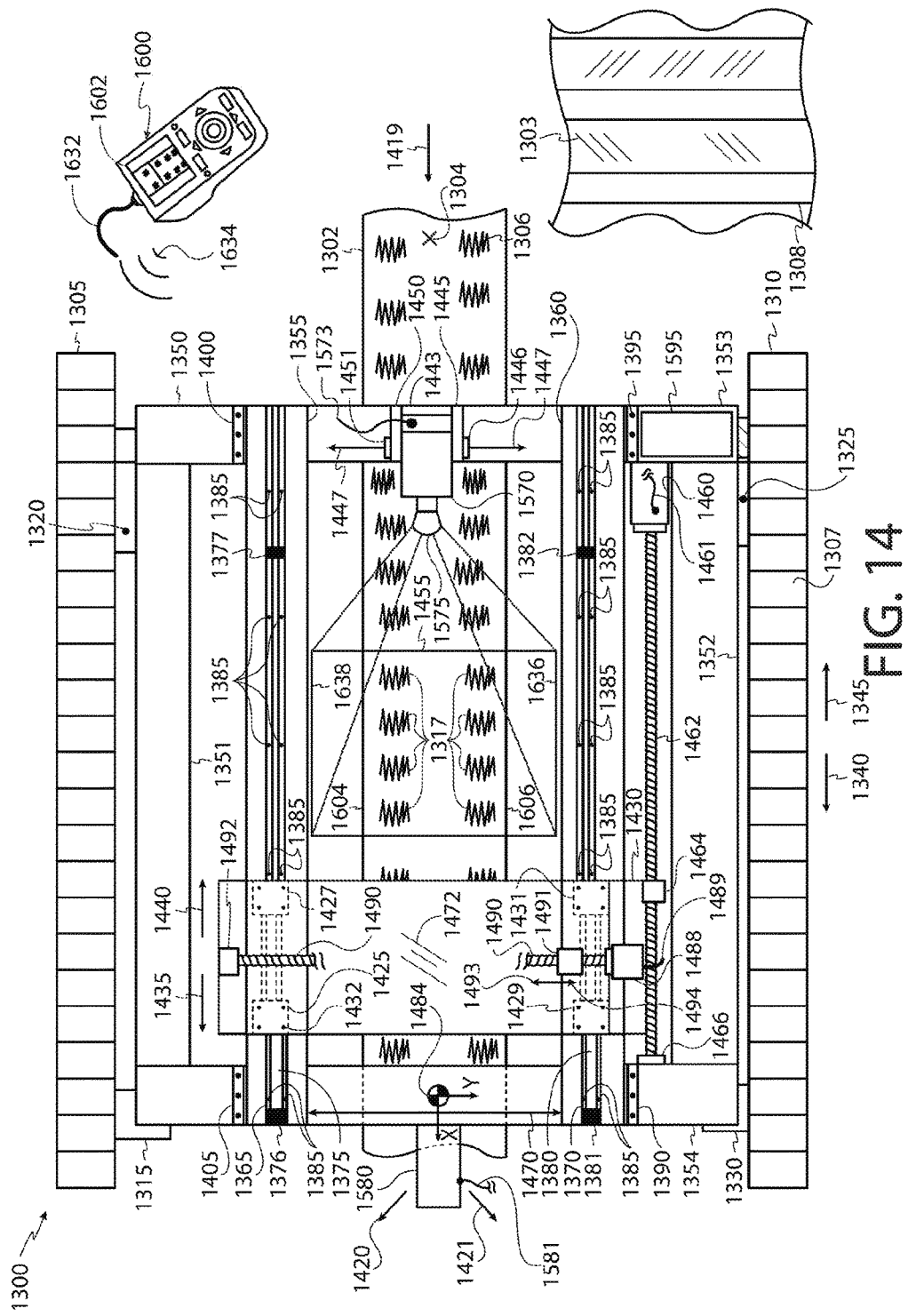
FIG. 14 is a top view of a second embodiment of a robotic welding system according to the present invention positioned longitudinally over an I-beam having a plurality of defined welding sites.
Figure 15:
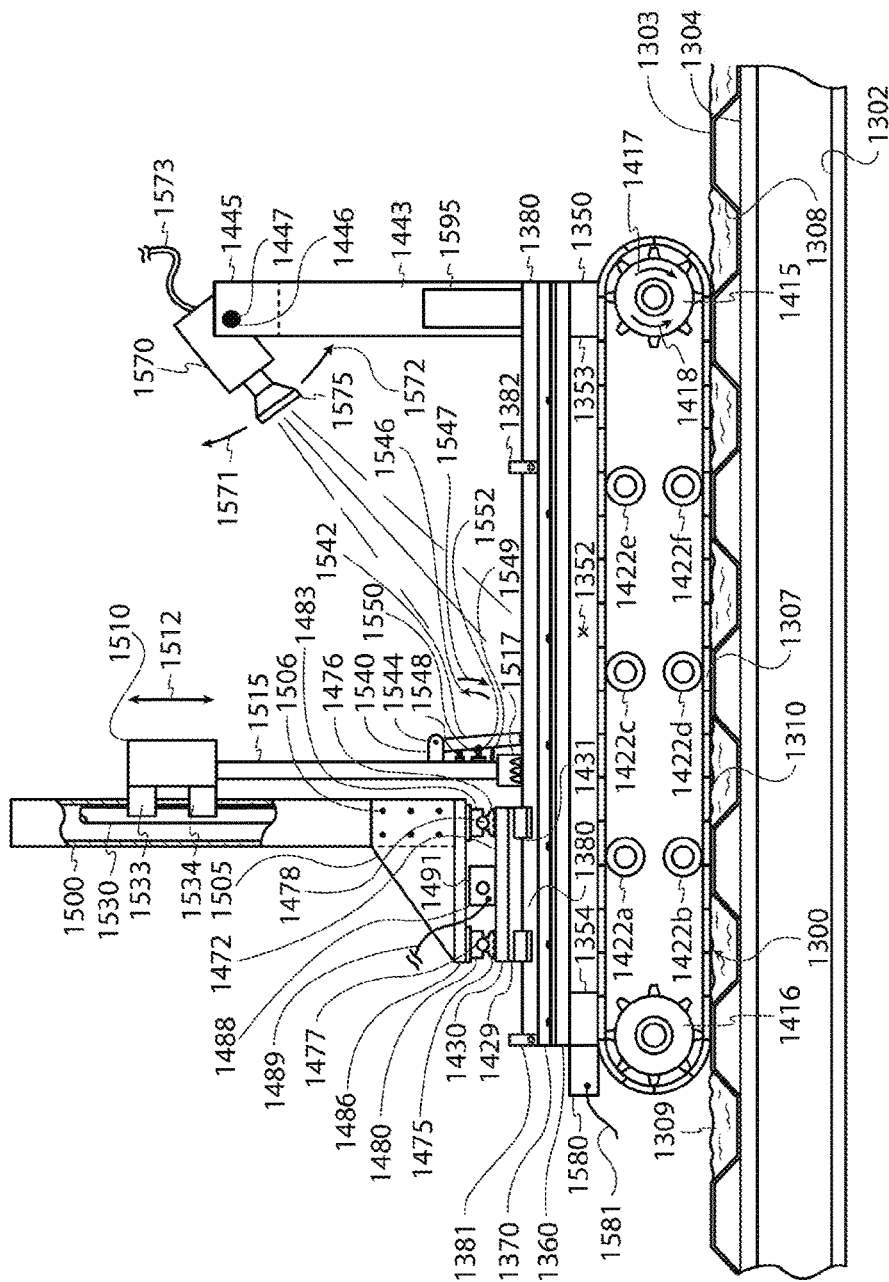
FIG. 15 is a side view thereof, with the robotic welding system located on a corrugated surface, and specifically illustrating the robotic welding and machine vision systems.

Referring now to FIGS. 14 and 15, a second embodiment of a robotic welding system 1300 is shown resting on surface 1303 of corrugated steel support structure 1308, positioned above and longitudinally aligned over I-beam 1302. In this embodiment, the welding system 1300 is tractor-propelled. Corrugated structure 1308 has been previously attached to top surface 1304 of beam 1302. Top surface 1304 has further ground welding sites 1306 where conventional studs may be welded by welding system 1300.

Welding system 1300 has rectangular frame 1350 which includes front and rear transverse frame members 1354 and 1353 respectively, and longitudinal right and left frame members 1351 and 1352 respectively. A conventional X-Y-Z right hand coordinate system 1484 is defined and located on the top surface and in the middle of front frame member 1354.

Welding system 1300 is propelled by conventional right and left tracks 1305 and 1310 respectively. Tracks 1305 and 1310 are identical and comprise individual track shoes (pads) 1307. Tracks 1305 and 1310 may be powered by conventional right and left hydrostatic drives 1320 and 1325 respectively and located towards the rear of welding system 1300. Hydrostatic drives 1320 and 1325 are identical and are further connected to right and left rear sprocket drive wheels 1410 (not shown in FIG. 15) and 1415, and are able to independently and controllably rotate their respective drive wheels 1410 and 1415 in a clockwise 1417 and counter-clockwise 1418 direction (the clockwise and counter-clockwise directions are defined when viewing the drive wheels from the exposed side). Other types of electromechanical drives may be used in place of hydrostatic drives 1320 and 1325 to produce torque and include for example, conventional servo, brushless and stepper electrical motors. In alternate embodiments, hydraulic motors may also be used in place of the hydrostatic drives 1320 and 1325.

Tracks 1305 and 1310 are adapted to engage sprocket drive wheels 1410 and 1415 respectively. Support wheels 1423a-1423f (noted as wheels 1423 for track 1305 and not shown) and 1422a-1422f (noted as wheels 1422 for track 1310) are each attached to frame 1350 and engage and provide rotating support for tracks 1305 and 1310 respectively. Additionally, the use of tracks 1305 and 1310 enables the welding system 1300 to smoothly traverse corrugated structure 1308 without significant vertical movement (a wheeled vehicle would tend to "bounce" along the uneven surface 1303 having its tires subsequently going into and out of the corrugated depressions).

Front right and front left sprocket wheels 1412 (not shown) and 1416 respectively further engage their respective tracks 1305 and 1310, are not powered, freely rotate, and are attached to rectangular frame 1350 via conventional axle assemblies 1315 and 1330, respectively.

It is therefore understood that the welding system 1300 may be smoothly propelled along surface 1303 in forward 1340 or reverse 1345 directions along longitudinal direction 1419 of beam 1302 by controlling drives 1320 and 1325, and further that welding system 1300 may be smoothly propelled along a rightward 1420 or leftward 1421 curved paths by controllably and independently adjusting the rotational speed of each drive 1320 and 1325. For example, powering drive wheel 1410 at a higher angular velocity than drive wheel 1415 causes welding system 1300 to turn in leftward direction 1421. The actual operational control of conventional drives 1320 and 1325 is further discussed with reference to FIG. 16.

Frame 1350 top surface further comprises longitudinal right 1355 and left 1360 rail support members. The rearward ends of support members 1355 and 1360 are attached to the top surface of rearward frame member 1353 via conventional right angle brackets 1400 and 1395 respectively. The forward ends of support members 1355 and 1360 are attached to the top surface of forward frame member 1354 via conventional right angle brackets 1405 and 1390 respectively.

Alternately, right 1355 and left 1360 rail support members may be welded to frame members 1353 and 1354. Support members 1355 and 1360 are aligned parallel to one another and to frame members 1351 and 1352 and are displaced laterally from one another by an inside lateral distance which substantially exceeds the width of beam 1302 so as not to obstruct a downward view of beam top surface 1304.

Affixed to the top surfaces of right 1355 and left 1360 rail support members are right rail support 1365 and left rail support 1370 respectively. Conventional machine screws 1385 are used to affix rail supports 1365 and 1370 to their respective rail support members 1355 an 1360. Rail supports 1365 and 1370 are similar in construction to previously mentioned rail supports 30 and 35 in FIG. 1. Mounted onto each rail support 1365 and 1370 are parallel and coplanar round rails 1375 and 1380 respectively.

Right pillow blocks 1425 and 1427 are mounted onto rail 1375 and left pillow blocks 1429 and 1431 are mounted onto rail 1380. A first support plate 1430 is mounted onto the top of pillow blocks 1425, 1427, 1429 and 1431 using conventional machine screws 1432 (there are four machine screws 1432 shown per pillow block).

Further attached to rail 1375 are fixed forward stop 1375a and fixed rearward stop 1375b, and further attached to rail 1380 are fixed forward stop 1380a and fixed rearward stop 1380b. Stops 1376 and 1381 limit the longitudinal position of first support plate 1430 along rails 1375 and 1380 in the forward 1435 direction, and stops 1377 and 1382 limit the longitudinal position of first support plate 1430 along rails 1375 and 1380 in the rearward 1440 direction.

Mounted on top and affixed to surface 1472 of first support plate 1430 is lateral and forward positioned shaft support 1475 and lateral and rearward positioned shaft support 1476 (both are not shown in FIG. 14 for clarity), both of which extend the entire lateral length of first support plate 1470. Both shaft supports 1475 and 1476 are parallel and co-planar to one another.

Mounted on top of shaft supports 1475 and 1476 are round rails 1477 and 1478 respectively. Two pillow blocks 1480 and 1481 (not shown) engage rail 1477 and two pillow blocks 1482 (not shown) and 1483 engage rail 1478. Rails 1477 and 1478 are parallel to each other and both are orthogonal to rails 1375 and 1380. A second support plate 1486 is mounted on top of pillow blocks 1480, 1481, 1482 and 1483.

Note that second support plate 1486, pillow blocks 1480, 1481, 1482 and 1483, rail and rail supports 1477, 1478, 1475 and 1476 are not shown in FIG. 14 for clarity.

The double rail configuration of parallel rails 1375 and 1380 in combination with their respective attached pillow blocks provide a non-rotatable and vertically stable horizontal platform for attached first support plate 1430, and the double rail configuration of parallel rails 1477 and 1478 in combination with their respective attached pillow blocks provide a non-rotatable and vertically stable horizontal platform for attached second support plate 1486.

Figure 17:
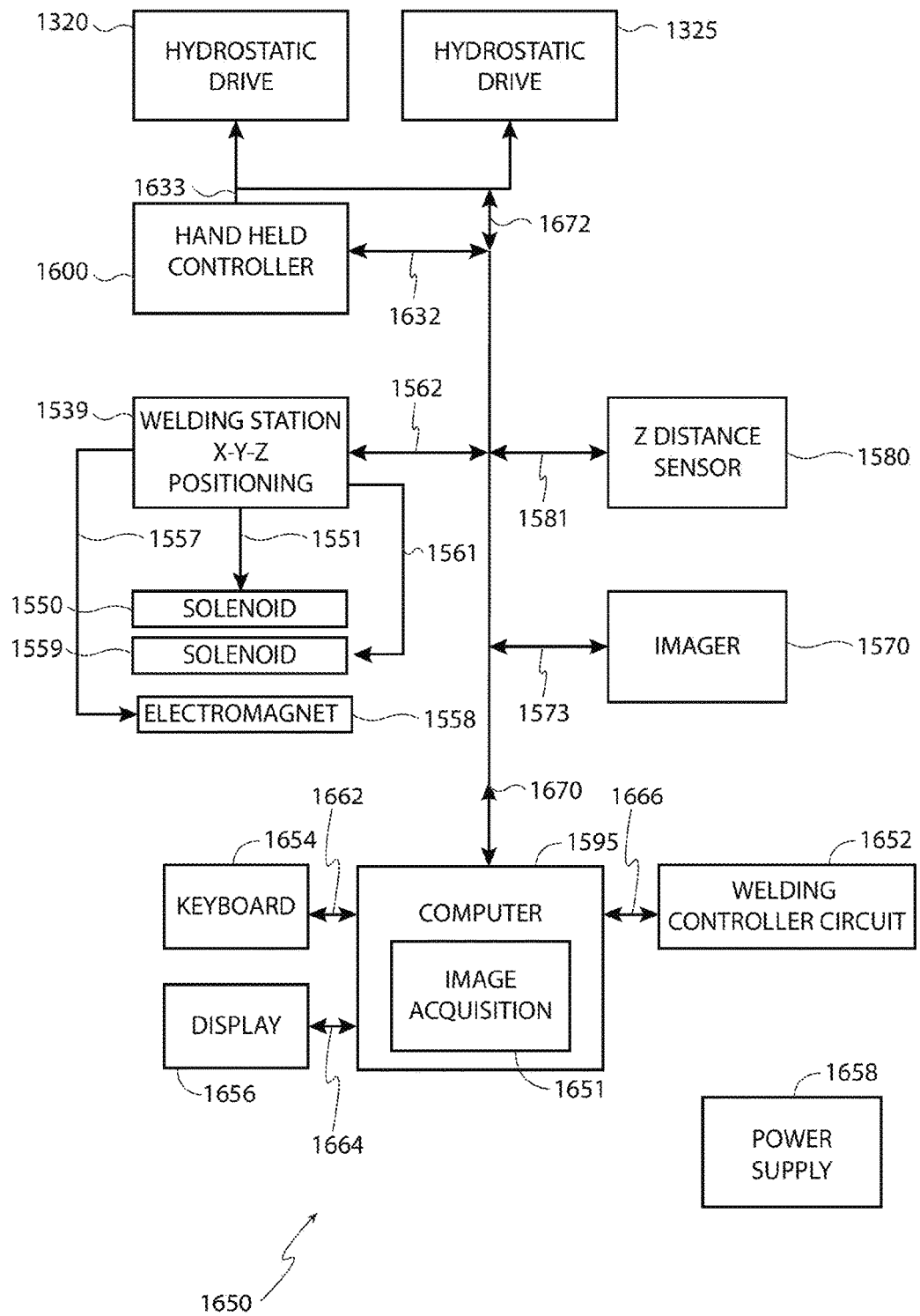
FIG. 17 is a schematic block diagram illustrating components of a preferred embodiment of the apparatus according to the present invention.
Figure 18:
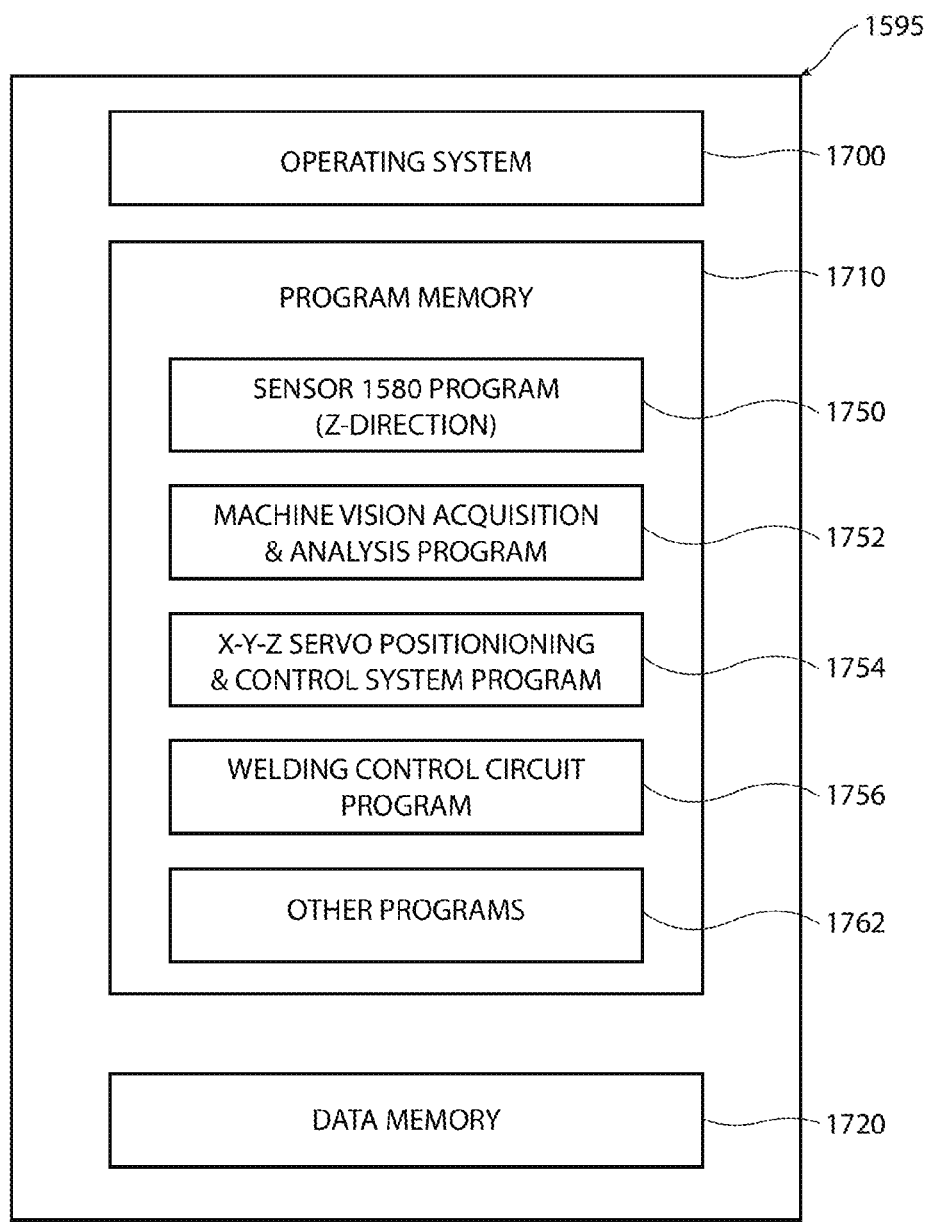
FIG. 18 is a schematic block diagram of the computer thereof, including software blocks.

Computer 1595 is attached to frame member 1353 and is further discussed with respect of FIGS. 17 and 18.

Referring specifically to FIG. 15, affixed on to the top surface of second support plate 1486 is vertical support member 1500 which extends in a positive Z-axis direction of coordinate system 1484. Left and right gusset plates 1505 and 1507 (not shown) further attach and support vertical support member 1500 to second support plate 1486 via machine screws 1506 (six machine screws 1506 are shown holding gusset 1505 to vertical support member 1500).

Further attached to vertical support 1500 is movable support block 1510. Block 1510 is supported on vertical support 1500 by two vertically positioned and co-planar parallel rails 1530 and 1531 (not shown), rail supports 1537 and 1538 (not shown for clarity) and respective pillow blocks 1533 and 1534 for rail 1530 and pillow blocks 1535 and 1536 (not shown) for rail 1531) in a similar fashion in which first support plate 1430 is supported. The combination of rails 1530 and 1531, rail supports 1537 and 1538, and pillow blocks 1533, 1534, 1535 and 1536 allows block 1510 to freely move in vertical direction 1512 which is parallel with the Z-axis of coordinate system 1484 (the Z-axis points upward from welding system 1300).

The double rail configuration of parallel rails 1530 and 1531 in combination with their respective attached pillow blocks provide a non-rotatable and stable vertical platform for attached block 1510.

Attached to block 1510 is welding collet support rod 1515. On the distal end of collet support rod 1515 is affixed stud collet 1517 for engaging head portion 265 of stud 270 (referred to and shown in FIG. 3). Stud 270 has been usually previously axially aligned with collet 1517 and, if a ceramic ferrule 330 is required to be placed over welding site 1306 along with stud 270, stud shank 266 has been inserted into and is axially aligned with ceramic ferrule 330.

Conventional techniques for feeding and aligning both studs and ferrules into collets have been previously discussed herein with reference to U.S. Pat. No. 5,130,510, which has also been incorporated by reference herein.

Outwardly attached to support rod 1515 is bracket 1540. As previously discussed in reference to FIGS. 4 and 5, bracket 1540 supports non-electrically conducting arm 1542 via pin 1544. Arm 1542 is constructed from electrically insulating material so that electrical welding current flows only through rod 1515 and collet 1517 to stud 270. Arm 1542 is further rotatable about pin 1544 in counter clockwise direction 1546 and clockwise direction 1547. An adjustable stop 1548 limits arm 1542 rotation in the 1547 direction.

Compression spring 1549 is affixed to support rod 1515 above collet 1517 and engages arm 1542. Spring 1549 biases arm 1542 in direction 1546. Further attached to 1515 above compression spring 1549 location but below bracket 1540 is solenoid 1550 energized via cable 1551 (not shown in FIG. 15) and having plunger 1552. The extended portion of plunger 1552 is movably affixed to bracket 1540. Plunger 1552 also limits arm 1542 rotation in the 1546 direction. Arm 1542 has further an extended stud alignment arm 1554 having an electro-magnet 1558, and an extended ferrule holding arm 1556, all not shown in FIG. 15, but similar to those respective components shown in FIG. 5. Electromagnet 1558 when energized via cable 1557 (not shown in FIG. 15) forcibly creates an attractive magnetic field which pulls and aligns shank 266 of stud 270 into a co-axially aligned position with collet 1517 (and ferrule 330 if previously loaded along with stud 270).

Additionally attached to ferrule holding arm 1556 is solenoid 1559 having pointed plunger 1560 (both not shown). Plunger 1560 is laterally directed at ferrule 330. When solenoid 1559 is energized via cable 1561, plunger 1560 is forcibly extended out of solenoid 1559 having its pointed end forcibly engaging and subsequently splitting and fracturing ferrule 330.

The stud alignment and engaging system comprising rod 1515, bracket 1540, arm 1542, collet 1517, pin 1544, adjustable stop 1548, compression spring 1549, solenoid 1550, stud alignment arm 1554, electromagnet 1558, ferrule holding arm 1556, solenoid 1559 and other associated elements (including cables for the solenoids and electromagnet) is structurally and operationally identical to the described stud alignment and engaging system previously disclosed in reference to FIGS. 4 and 5.

Thus during the welding process support rod 1515 aligns and supports stud 270 (which may include ferrule 330) in a vertical position and after the welding process is completed may further fracture ferrule 330 for subsequent removal from welding site 1306.

To precisely position the stud or stud-ferrule combination within X-Y-Z coordinate system 1484 (within the positional constraints of the actual rail systems) and to control the engaging and disengaging of the stud or stud-ferrule combination, a conventional computer controlled X-Y-Z servo positioning and control system 1539 comprising a dedicated computer, motors, drive systems, positional feedback sensors, electronic circuits etc. is provided which in combination, accurately moves and positions first support plate 1430, second support plate 1486 and block 1510 along their movement axes relative to coordinate system 1484 and further controls solenoids 1550 and 1559 and electromagnet 1558 in response to commands received from computer 1595.

For example, computer controlled X-Y-Z servo positioning and control system 1539 may comprise a first electric motor 1460 mounted on frame member 1353 to controllably position first support plate 1430. The drive system for first support plate 1430 comprises a conventional first ball and screw drive having first ball screw 1462 and first ball nut 1464. The shaft of motor 1460 (not shown) and ball screw 1462 are coaxially aligned and are parallel to the rails 1375 and 1380. The rearward end of ball screw 1462 is attached to the shaft of motor 1460 and the forward end of ball screw 1462 is supported by bushing 1466. Bushing 1466 is further attached to frame member 1354 and allows ball screw 1462 to freely rotate in response to motor 1460 shaft rotation. Ball nut 1464 is attached underneath first support plate 1430 (not shown in FIG. 15 for clarity). The ball and screw drive therefore transforms the shaft rotation of motor 1460 into linear motion for first support plate 1430. Thus it is understood that first support plate 1430 can be controllably moved in the forward direction 1435 and rearward direction 1440 with respect to welding system 1300 by controlling the shaft position (and rotation) of motor 1460 via computer controlled X-Y-Z servo positioning and control system 1539.

Motor 1460 may be a conventional stepper motor, servo motor or brushless motor having, for example, a shaft encoder for determining the angular position of the shaft of motor 1460. Further, the shaft of motor 1460 may be attached to the input shaft of a conventional gearbox, the output shaft of the gearbox being attached to the motor end of ball screw 1462. Power and signal data are communicated to motor 1460 via cable 1461.

Computer controlled X-Y-Z servo positioning and control system 1539 may further comprise electric motor 1488 which is attached to and longitudinally centered on first support plate 1430. The shaft of motor 1488 is further attached to a second conventional ball and screw drive comprising second ball screw 1490 and second ball nut 1491. The far end of ball screw 1490 is supported by bushing 1492, which is further attached to top 1472 of first support plate 1430. Ball nut 1491 is attached to the underside of second support plate 1486. The shaft of motor 1488 is coaxially aligned with ball screw 1490.

Rotation of the shaft of motor 1488 along with the action of the second ball and screw drive moves second support plate 1486 in transverse directions 1493 or 1494 depending upon the direction of shaft rotation. Thus it is understood that second support plate 1486 may be controllably moved in a transverse direction by controlling the rotation of the shaft of motor 1488 via computer controlled X-Y-Z servo positioning and control system 1539.

Motor 1488 may be a conventional stepper motor, servo motor or brushless motor having a shaft encoder for determining the angular position of the shaft of motor 1488. Further, the shaft of motor 1488 may be attached to the input shaft of a conventional gearbox, the output shaft of the gearbox being attached to the motor end of second ball screw 1490. Power and signal data are communicated to motor 1488 via cable 1489.

Computer controlled X-Y-Z servo positioning and control system 1539 may further comprise third electric motor 1520 attached to vertical support 1500 having its shaft vertically aligned with and engaging a vertically positioned conventional third ball and screw drive comprising third ball screw 1526 and third ball nut 1527, all of which are not shown. Ball nut 1527 is further attached to support block 1510.

Rotation of the shaft of motor 1520 along with the action of the third ball and screw drive moves support block 1510 in the plus and minus Z (vertical) axes direction 1512 depending upon the direction of shaft rotation.

Motor 1520 may be a conventional stepper motor, servo motor or brushless motor having a shaft encoder for determining the angular position of the shaft of motor 1520. Further, the shaft of motor 1520 may be attached to the input shaft of a conventional gearbox, the output shaft of the gearbox being attached to the motor end of ball screw 1526. Power and signal data are communicated to motor 1520 via cable 1521.

Thus it is understood that the vertical position (Z-axis position) of block 1510, and therefore collet support rod 1515, collet 1517 along with its collet inserted stud 270 (or stud-ferrule combination) can be precisely controlled via computer controlled X-Y-Z servo positioning and control system 1539.

In summary, it is therefore understood that the above described computer controlled X-Y-Z servo positioning and control system 1539 enables first support plate 1430 to be independently and controllably moved in the X-direction of coordinate system 1484 with respect to frame 1350, and further enables second support plate 1486 to be independently and controllably moved in the Y-direction of coordinate system 1484 with respect to frame 1350, and yet further enables block 1510, and therefore collet support rod 1515 and collet 1517 along with its collet inserted stud 270 (or stud-ferrule combination) to be independently and controllably moved in the Z-direction of coordinate system 1484 with respect to frame 1350. The relative X-axis position of first support plate 1430 with respect to origin of coordinate system 1484, the relative Y-axis position of second support plate 1486 with respect to the origin of coordinate system 1484, the relative Z-axis position of block 1510 with respect to the origin of coordinate system 1484 may be determined from motors 1460, 1488 and 1520 shaft encoder signals, or other conventional techniques for measuring linear position which may be used by computer controlled X-Y-Z servo positioning and control system 1539.

Further attached in the middle of rear frame member 1353 is vertically aligned imager mounting stand 1443 having integral left and right imager mounting brackets 1445 and 1450 respectively. Imager 1570 is mounted between brackets 1445 and 1450 and is movably held in place via coaxially aligned left and right conventional tightening pins 1446 and 1451 respectively. Tightening pins 1446 and 1451 allows imager 1570 to be rotated about axis 1447 in clock wise direction 1571 or counter clock wise direction 1572 enabling imager 1570 to image area 1455 and which includes a portion of top surface 1304 of beam 1302 and a group of welding sites 1317. Imager 1570 is then locked into the desired position by tightening pins 1446 and 1451. Imager 1570 further has lens element 1575 and is equipped with an electronic shutter (not shown). Power and signal data is communicated to imager 1570 via bus 1573.

Additionally attached underneath of frame member 1354 is Z-axis downwardly pointing non-contacting conventional distance measuring sensor 1580 (shown in FIGS. 14 and 15). Sensor 1580 measures the vertical distance from welding system 1300 to the top surface 1304 of beam 1302 and is similar to sensor 65 described above. Sensor 1580 communicates with computer 1595 via cable 1581.

Figure 16:
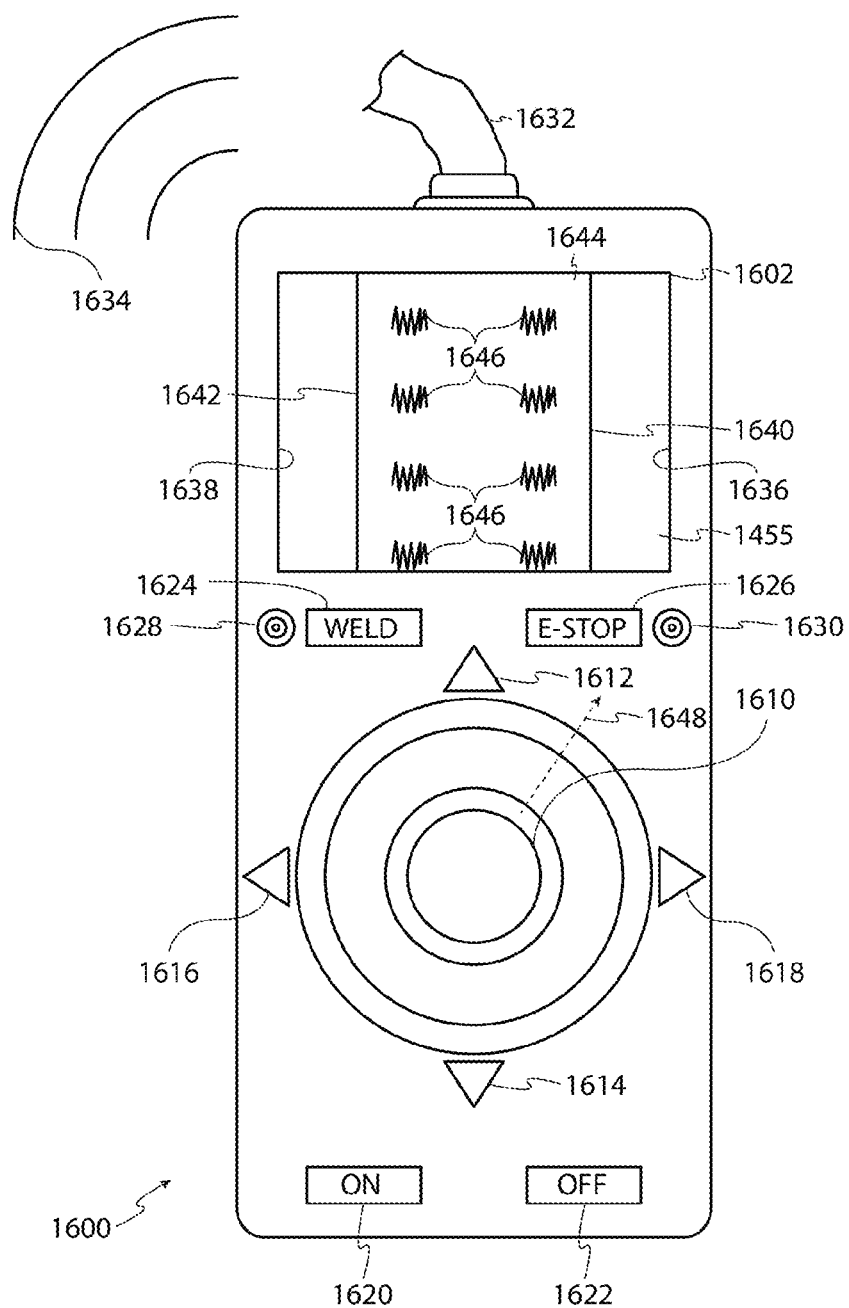
FIG. 16 is a frontal view of a controller for controlling movement of the tractor system thereof.

Referring now additionally to FIG. 16, handheld remote control system 1600 is shown having liquid crystal display (LCD) 1602, conventional joystick control 1610, fine forward control 1612, fine rearward control 1614, fine left control 1616, fine right control 1618, ON button 1620, OFF button 1622, WELD button 1624, red colored light emitting diode (LED) 1628, E-STOP button 1626 and green LED 1630.

Remote control system 1600 is in electrical communication with computer 1595 via cable 1632, or alternately may be in communication with computer 1595 via wireless signals 1634. Further, computer 1595 may directly control hydrostatic drives 1320 and 1325 via bi directional bus 1672 (shown in FIG. 17) and may disable the hydrostatic drive control function of control system 1600. Alternately, bus 1672 may be a conventional wireless bi-directional communication link. Additionally, control system 1600 may be directly mounted on to system 1300.

LCD 1602 projects an image of image area 1455 received from imager 1570. Thus an operator may view the alignment of welding system 1300 with respect to beam 1302 using the displayed image within LCD 1602, and more importantly may determine if images 1640 and 1642 of longitudinal beam edges 1604 and 1606 respectively are generally parallel to the right 1636 and left 1638 image edges of image area 1455, and if image 1644 of top surface 1304 having images 1646 of the group of welding sites 1317 are clearly visible within image area 1455.

The movement of welding system 1300 is controlled by the operator via joystick control 1610, fine forward control 1612, fine rearward control 1614, fine left control 1616, and fine right control 1618. Both low and high velocity movements (for example, 2 miles per hour or greater may be considered a high velocity movement) of welding system 1300 are controlled by joystick control 1610. For example, to initially and quickly place welding system 1300 over beam 1302 the operator would use joystick control 1610. Steering welding system 1300 using the joystick control 1610 requires the operator to slowly position the joystick control 1610 in the general direction of the desired welding system 1300 movement, for example, in the direction indicated by arrow 1648. A small off center displacement of joy stick 1610 in direction of arrow 1648 slowly moves welding system 1300 in that direction. Moving joystick 1610 further in the direction of the arrow 1648 increases the speed of welding system 1300 in that particular direction. Joystick control 1610 is usually used to quickly position welding system over the beginning of beam 1302 before beginning the welding process.

During the welding process, the operator moves welding system 1300 using the fine forward control 1612, fine rearward control 1614, fine left control 1616, and fine right control 1618. These controls move welding system 1300 slowly (for example, a few inches per second) in directions indicated by the respective fine control arrows and enables the operator to continually align welding system 1300 over surface 1303 and a group of welding sites 1317 as welding system 1300 proceeds in longitudinal direction 1419.

Movement control signals are sent directly to conventional hydrostatic drives 1320 and 1325 via cable 1633 (not shown), or alternately via wireless signals 1634 (these signals are in addition to the signals communicated to and from computer 1595). Cable 1633 may be part of cable 1632 or a completely separate cable.

To begin moving welding system 1300, the operator depresses ON button 1620 which starts hydrostatic drives 1320 and 1325. To turn off hydrostatic drives 1320 and 1325, the operator depresses OFF button 1622. The operator then uses handheld remote control system 1600 (in particular joystick 1610) to correctly position welding system 1300 over top surface 1304 by viewing the image displayed on LCD 1602 and aligning the images 1640 with 1642 with image edge lines 1636 and 1638 respectively, generally keeping the image of beam top surface 1304 centered laterally within the view.

Having properly aligned and positioned welding system 1300 over top surface 1304, the operator depresses the WELD button 1624 to initiate a welding cycle. Depressing the WELD button locks hydrostatic drives 1320 and 1325 and prevents movement of welding system 1300, and begins the welding process (described later). Additionally, red LED 1628 is illuminated. An emergency E-STOP button 1626 is provided to cease all welding system 1300 operations including any in progress welding processes or welding system 1300 movement. When the welding process is completed, LED 1628 is turned off (not illuminated) and green LED 1630 is turned on (illuminated) indicating that welding system 1300 may be moved to another welding site to initiate another welding process.

Referring now to FIG. 17, a schematic block diagram 1650 of welding system 1300 is shown and comprises computer 1595, keyboard 1654, display 1656, right hydrostatic drive 1320, left hydrostatic drive 1325, handheld remote control system 1600, Z distance sensor 1580, imager 1570, welding controller circuit 1652, power supply 1658, and computer controlled X-Y-Z servo positioning and control system 1539 having solenoids 1550 and 1559 and electromagnet 1558. Additionally all components of computer controlled X-Y-Z servo positioning and control system 1539 may communicate with computer 1595 via bus 1562. Computer 1595 has further image acquisition system 1651.

Keyboard 1654, display 1656, Z-distance sensor 1580, imager 1570, welding controller circuit 1652, conventional computer controlled X-Y-Z servo positioning and control system 1539, image acquisition system 1651, and power supply 1658 are identical in all respects to keyboard 420, display 425, Z-distance sensor 65, imager 90, welding station control circuit 410, conventional computer controlled servo positioning system 400, image acquisition system 475 and power supply 121, respectively.

Computer 1595 communicates with imager 1570, handheld remote control system 1600, and Z-distance sensor 1580 via dedicated local buses 1573, 1632 and 1581 respectively. All local buses 1573, 1632, 1562 and 1581 are grouped and become part of bus 1670, and all components connected to main communication bus 1670 are in bi-directional communication with each other.

Additionally keyboard 1654, LCD display 1656 and welding control circuit 1652 communicate with computer 1595 via bi-directional buses 1662, 1664 and 1666. Power supply 1658 supplies electrical power to all components shown in FIG. 17.

Computer 1595 is further a conventional computer having communication ports which allow the attachment of computer peripherals. These communication ports include, for example, USB ports, wireless connections such as WiFi, and internet connectivity.

Referring now additionally to FIG. 18, computer 1595 further comprises operating system program 1700, program memory 1710, and data memory 1720.

Operating system (OS) program 1700 is similar to operating system program 500 and is a conventional real time operating system (RTOS) or may be a Windows based operating system, or other available operating systems such as LINUX. OS program 1700 is able to execute programs contained in program memory 1710 by conventional means.

Program memory 1710 further comprises Z-direction sensor 1580 data acquisition program 1750 and is identical to program 530.

Machine vision acquisition and analysis program 1752 is similar to machine vision acquisition and analysis program 550 except that no X' position data is acquired. For example, machine vision acquisition and analysis program 1752 controls image acquisition system 1651, and therefore the acquisition of images from imager 1570. Control signals are sent to imager 1570 through system 1651 by program 1752 and include image trigger signal (i.e., when to acquire a raw image) and an electronic shutter signal (i.e., how long should the image be acquired).

Program 1752 also includes the camera calibration algorithm which corrects the raw image data input from imager 1570 for lens distortion and other non-ideal camera and image parameters. When an image is triggered, program 1752 then stores the calibrated image data to data memory 1720.

Program 1752 also analyzes the stored image captured by imager 1570 and includes identifying each welding site within the image using conventional image segmentation algorithms. Such algorithms include image thresholding algorithms where welding sites are identified using the difference in grayscale values between the bright reflective welding site and the dull non-reflecting beam surface, and is well known in the art of image processing and analysis.

Program 1752 further identifies the center of each welding site (which may include the center of a manually placed ferrule 330), calculates the convention (u-v) pixel coordinates of the center of each non-repeated identified welding site, calculates the X-Y positions of the center of each non-repeated welding site, identifies the line images of edges 1640 and 1642 of beam 1302, determines the respective u coordinates for the line images of beam edges 1640 and 1642, determines the number of pixels between the line images of beam edges 1604 and 1606 using the line image u coordinates, and calculates the image pixel distance to object distance ratio from the beam edges 1604 and 1606 using beam width input data in addition to other image analysis and processing functions. Data including the (u,v) pixel coordinates of the center of every identified welding site and the X-Y coordinates for each welding site, along with the calculated pixel to object distance ratio is stored in data memory 1720, in addition to other data. Program 1752 also computes, using the camera calibration algorithm, the camera calibration parameters which are used to correct the raw image for lens distortion and stores these parameters in data memory 1720.

Program 1752 further identifies the images of the top edges 1604 and 1606 and determines their respective image u coordinate values and stores the u-coordinates data into data memory 1720, and may also identify the images of beginning 71 and ending 72 beam edges (shown in FIG. 1) respectively and determine their respective image u-v coordinate value.

Program 1754 X-Y-Z positioning and control system program is similar to program 540 for controlling the position of stud (or stud ferrule) collet 1517 via welding station control system 1539.

Once studs have been welded onto top surface 1304, concrete 1309 or other material is then lastly poured over the corrugations of structure 1308 and the top 1304 of I-beam 1302 having previously welded studs, providing a strong and smooth concrete-steel composite structure. The welded studs provide lateral structural support for the hardened concrete.

Referring now generally to FIGS. 19-29, a third embodiment of a welding system 2010 in accordance with the present invention will now be described in detail. In this embodiment, the welding system 2010 is designed to ride alongside an I-beam 2001 to which studs are to be welded, as opposed to directly above the I-beam 2001 as shown in the embodiment of FIGS. 14-18. In this embodiment, the welding system 2010 comprises a tractor 2012 having a frame 2014 and a pair of tracks 2016a,2016b, each of which comprises a respective track shoe 2018a,2018b. The tracks 2016a,2016b are each operated by a respective one of a pair of hydraulic wheel motor 2017a,2017b (see FIGS. 19, 27, and 29). In this embodiment, the hydraulic wheel motors 2017a,2017b are Model No. PHK-1B hydraulic motors produced by Nachi America, Inc. of Greenwood, Ind., U.S.A., although other hydraulic motors would be suitable in alternate embodiments of the present invention. As shown in the embodiment of FIGS. 14 and 15, during use the tracks 2016a,2016b of the tractor 2012 move along corrugated support structure panels (e.g., metal panels) or planar planking (e.g., plywood sheets) that have been installed on the work surface adjacent to the I-beam 2001 and between pairs of I-beams, as is traditional in the art. Corrugated metal panels are shown in the embodiment of FIGS. 14-18 (see reference numeral 1308), but for convenience are not depicted in FIGS. 19-28. The tracks 2016a,2016b will generally move transverse to the corrugations in the panels. A top splash plate 2020 is attached to the frame 2014 and prevents water and debris from splashing up and contacting those portions of the welding system 2010 located above the frame 2014. In this embodiment, the top splash plate 2020 is transparent.

Figure 19:
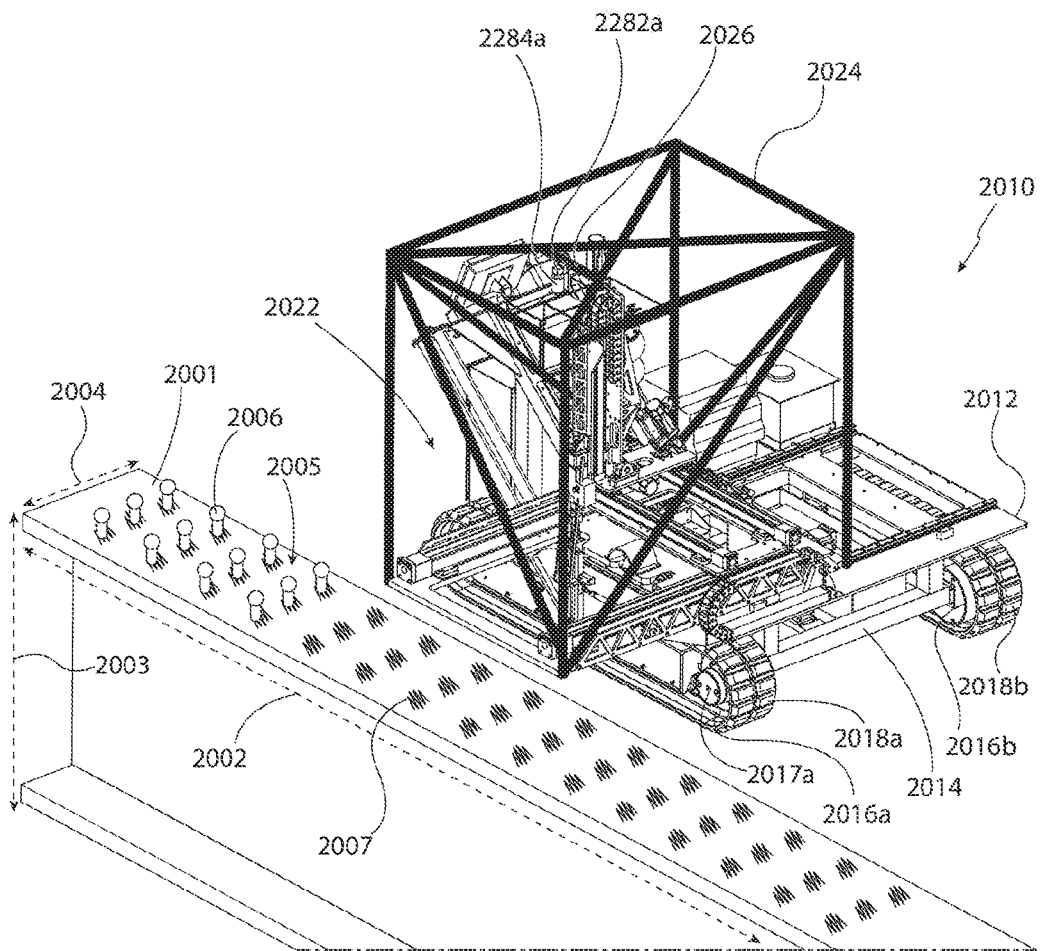
FIG. 19 is a elevated front perspective view of a third embodiment of a robotic welding system according to the present invention positioned alongside an I-beam having a plurality of defined welding sites.
Figure 20:
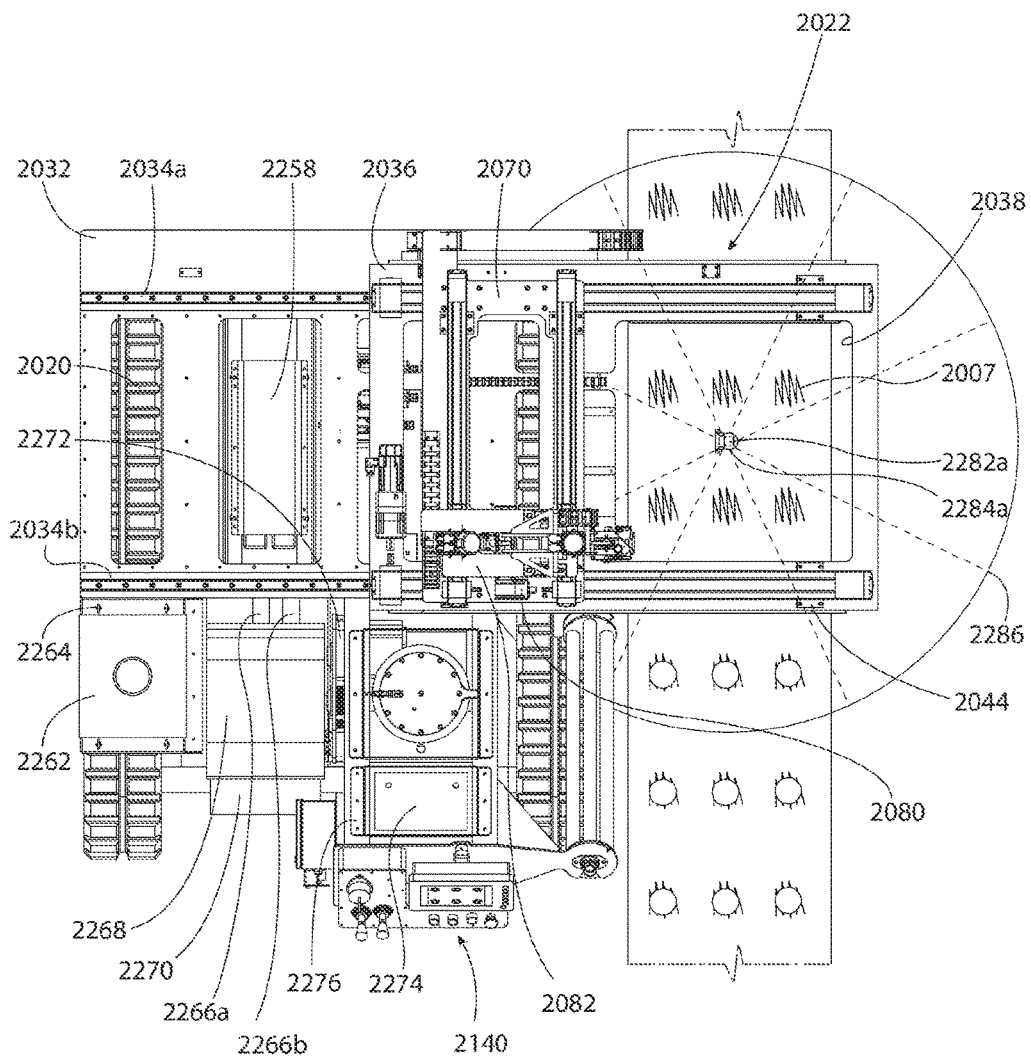
FIG. 20 is a top view thereof.

As shown in FIGS. 19 and 20, I-beam 2001 has a longitudinal axis 2002, a vertical height 2003, and a top surface 2005 having a width 2004. As best seen in FIG. 19, on the top surface 2005 a number of ground welding sites 2007 have been produced, and welded studs 2006 have already been welded to some of the ground welding sites 2007. It should be understood that ferrules will be used on top of the ground welding sites 2007 in order to encapsulate the molten weld pools during the arc welding process, but that these ferrules are omitted from view in FIGS. 19 and 20 for convenience.

As noted above, during operation the welding system 2010 of this embodiment moves alongside and parallel to the longitudinal axis 2002 of the I-beam 2001. In this embodiment, a positionable carriage 2022 comprising a Y-axis movement system 2033, an X-axis movement system 2069, and a Z-axis movement system 2081 is used to physically locate the stud placement and welding assembly 2170 above the top surface 2005 of the I-beam 2001 so that studs (e.g., studs 2030a,2030b, see FIG. 23) can be individually welded to respective ground welding sites 2007. In order to protect the components of the positionable carriage 2022 while on a job site and to reduce ambient light from interfering with the determination of the location of the ground welding sites 2007, an enclosure 2024 comprising a plurality of support beams (shown but not individually labeled in FIG. 19) and a plurality of panels (hidden from view in FIG. 19 in order to illustrate the components of the positionable carriage 2022) is used. In this embodiment, the panels are planar and removably attach to the respective one or more support beams via known fasteners. An imager support bracket 2026 forms a portion of the roof portion of the enclosure 2024. Imager support bracket 2026 supports imager 2282a from the top of the enclosure 2024. The imager 2282a will be discussed in greater detail below.

Figure 26:
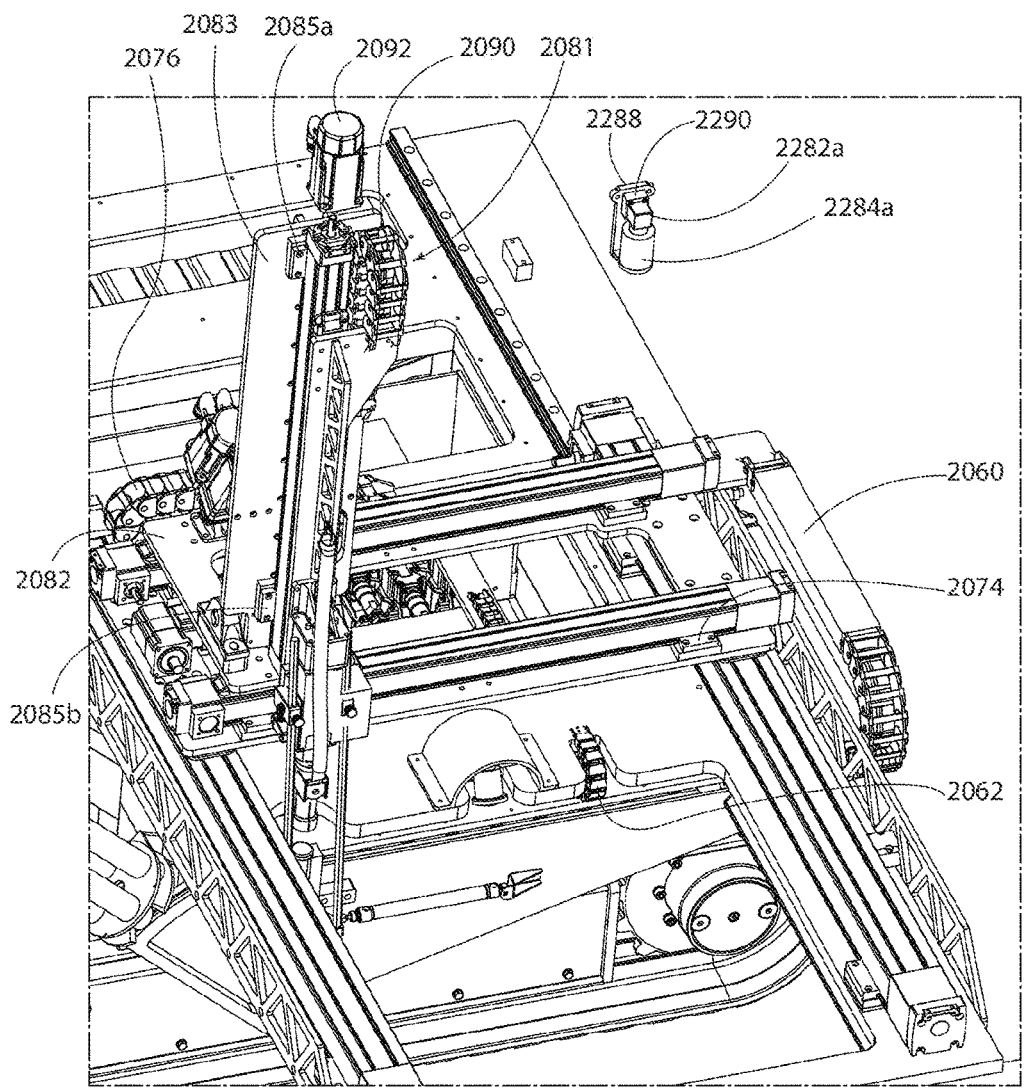
FIG. 26 is an elevated perspective view of a portion of the robotic welding system of FIG. 19.

FIG. 20 is a top view of the welding system 2010. In FIGS. 20-28, all components of the enclosure 2024 have been hidden from view for convenience. As shown in FIG. 26, the imager 2282a further comprises a lens 2284a attached thereto for enhancing the field of view 2286 of the imager 2282a. The field of view 2286 of the imager 2282a has a centerline. The imager 2282a is attached to the imager support bracket 2026 of the enclosure 2024 via an imager mount plate 2288 and an imager spacer plate 2290 that spaces the imager 2282a and lens 2284a away from the imager mount plate 2288 (see FIGS. 19 and 26). As seen in FIGS. 23 and 26, the welding system 2010 may also comprise a second imager 2282b that is mounted to a sliding base plate 2036 of the Y-axis movement system 2033 via an imager mount 2292. Attached to the imager 2282b is a lens 2284b that enhances the field of view (not shown) of the imager 2282b. In this embodiment, a cover 2294 is provided over the imager 2282b and lens 2284b to protect these components. In this embodiment, the imagers 2282a,2282b are Model No. UI-3370CP imagers produced by IDS Imaging Development Systems GmbH of Obersulm, Germany, and the lenses 2284a,2284b are Model No. CF12.5HA-1 lenses produced by FUJIFILM Holdings Corporation of Tokyo, Japan, although other imagers and lenses would be suitable in alternate embodiments of the present invention.

The relevant portion of the field of view 2286 of the imager 2282a encompasses all of that portion of the top surface 2005 of the I-beam 2001 that is located below and within the perimeter of a rectangular-shaped opening 2038 in the sliding base plate 2036. Although the field of view 2286 of the imager 2282a is larger than this area, the remainder of the image captured by the imager 2282a is cropped before being used to calculate the locations of the ground welding sites 2007. In this embodiment, the rectangular-shaped opening 2038 is sized such that it is wider than the width 2004 of the I-beam 2001, and such that at least the side edges of the I-beam 2001 and a two-by-three grid of ground welding sites 2007 (or ground welding sites 2007 and ferrules, for example) is visible to the imager 2282a within the rectangular-shaped opening 2038 at one time. The imager 2282a is located directly above the center of the area of the rectangular-shaped opening 2038. Therefore, during operation, when the positionable carriage 2022 is moved such that the imager 2282a is approximately centered about the width 2004 of the I-beam 2001, the rectangular-shaped opening 2038 is likewise centered about the width 2004 of the I-beam, with the entire width 2004 of the I-beam 2001 visible to the imager 2282a within the rectangular-shaped opening 2038. It should be understood that, in alternate embodiments, the opening in the sliding base plate may have different shapes, for example square, circular, or oval, or may be sized such that a greater or lesser number of ground welding sites 2007 are typically visible to the imager 2282a within the opening provided in the sliding base plate.

Figure 21:
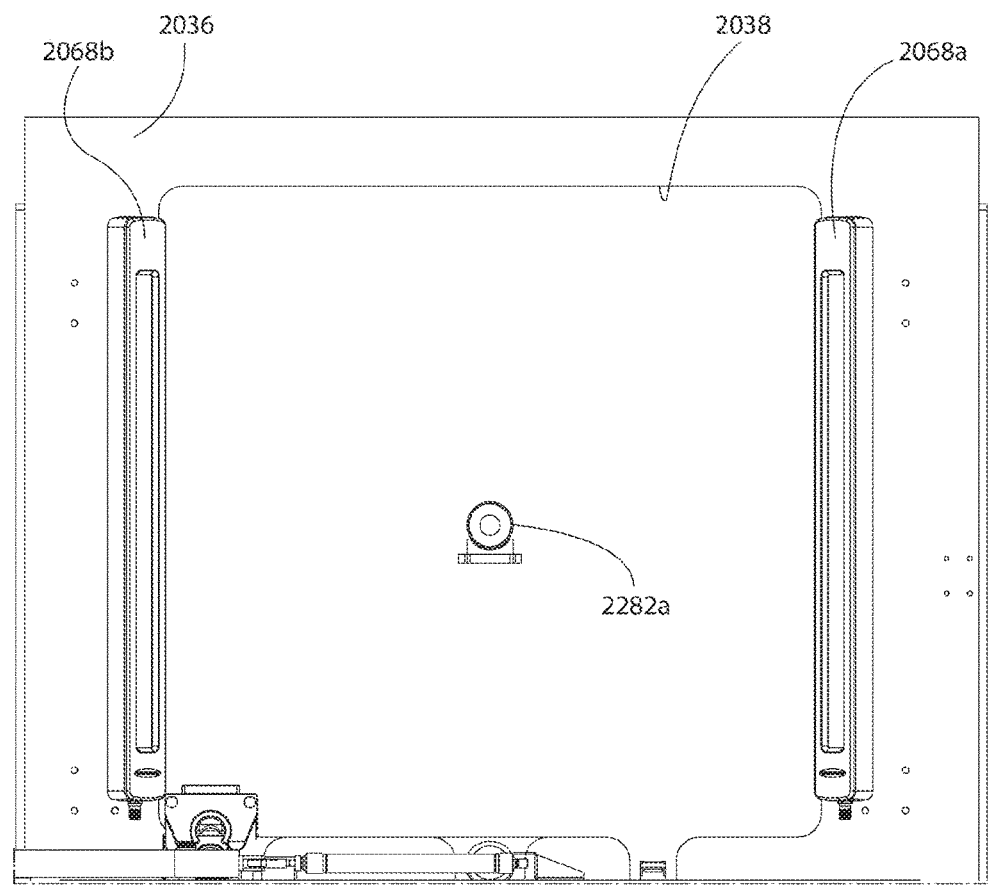
FIG. 21 is a bottom view of a portion thereof.

FIG. 21 is a bottom view of the rectangular-shaped opening 2038, with the imager 2282a clearly visible centered above the rectangular-shaped opening 2038. In this embodiment, a pair of light sources 2068a,2068b are attached to the underside of the sliding base plate 2036 and are angled such that their light illuminates the top surface 2005 of the I-beam 2001 located within the rectangular-shaped opening 2038. The light provided by the light sources 2068a,2068b will increase the amount of light being reflected from the ground welding sites 2007, thereby enhancing the ability of the imager 2282a to recognize the locations of the ground welding sites 2007. In alternate embodiments, zero, one, or more than two light sources could be provided. In this embodiment, the light sources 2068a,2068b are Model No. WLC60 light bars produced by Banner Engineering Corporation of Minneapolis, Minn., U.S.A., although other light sources would be suitable in alternate embodiments of the present invention.

For those ground welding sites 2007 on which a ferrule has been located, the inventors discovered that providing one or more oblique lighting sources, for example light sources 2068a,2068b, which are oriented at an angle that is not orthogonal to the top surface 2005 of the I-beam 2001, enhanced the image of the ferrule that was collected by the imager 2282a because the quantity of light being reflected directly back into the lens 2284a off of the shiny, ground metal surface of the I-beam at the ground welding site 2007 was minimized. This permitted the imager 2282a to more accurately locate the perimeter of the ground welding site 2007 and center of mass thereof. Therefore, preferably, at least one oblique lighting source is provided to the top surface 2005 of the I-beam 2001. Most preferably, at least two oblique lighting sources are provided to the top surface 2005 of the I-beam 2001.

With reference particularly to FIGS. 20 and 25-27, details of the Y-axis movement system 2033, X-axis movement system 2069, and Z-axis movement system 2081 will now be described in detail. The Y-axis movement system 2033 comprises a main slide mounting plate 2032 that is mounted to the frame 2014 of the tractor 2012, a pair of linear rail guides 2034a,2034b that are mounted to the main slide mounting plate 2032, the sliding base plate 2036, a pair of linear motion systems 2042a,2042b that are each mounted to the sliding base plate 2036 via a pair of mounting plates 2044, and an X-axis base plate 2070 that is connected to the top sides of the linear motion systems 2042a,2042b. The sliding base plate 2036 is attached to the linear rail guides 2034a,2034b and movable with respect to the main slide mounting plate 2032 in order to partially provide the necessary Y-axis positionability of the positionable carriage 2022. The sliding base plate 2036 is provided with a pair of side trusses 2040a,2040b for structural integrity. The linear motion systems 2042a,2042b are each operably connected to a motor 2064 and a gear assembly 2066, and act to provide linear motion to the X-axis base plate 2070, thereby providing the remainder of the Y-axis positionability of the positionable carriage 2022. In this embodiment, the linear motion systems 2042a,2042b are belt-driven Model No. MF07C linear motion systems produced by Thomson, a division of Danaher Motion of Radford, Va., U.S.A., although other linear motion systems are suitable in alternate embodiments of the present invention. The motor 2064 and gear assembly 2066 are connected together via a known type of belt housing, which is omitted from view in the figures for convenience. In this embodiment, the gear assembly 2066 is a Model No. AKM31 gear assembly produced by Danaher Motion of Radford, Va., U.S.A., although other gear assemblies would be suitable in alternate embodiments of the present invention. A movable stop block 2046 is attached to the underside of the side truss 2040b of the sliding base plate 2036 and stationary stop blocks 2047a,2047b are attached to the upper surface of the main slide mounting plate 2032 in linear alignment with the movable stock block 2046. The stop blocks 2046,2047a,2047b collectively limit the range of motion of the sliding base plate 2036, and therefore of the positionable carriage 2022. Pin block 2050 is used to connect the sliding base plate 2036 to the main slide mounting plate 2032. A cable carrier 2060, which is attached between the main slide mounting plate 2032 and the X-axis base plate 2070, is used to support and provide protection to the power and control cables for the motor 2064 and the welding wire 2188, which are routed therethrough. In this embodiment, the cable carrier 2060 is a Model No. Z16 cable carrier produced by igus Inc. of East Providence, R.I., U.S.A., although other cable carriers would be suitable in alternate embodiments of the present invention. A cable carrier 2062, which is attached between the main slide mounting plate 2032 and the sliding base plate 2036, is used to support and provide protection to the power and control cables for the imager 2282b, which are routed therethrough. In this embodiment, the cable carrier 2062 is a Model No. Z06 cable carrier produced by igus Inc. of East Providence, R.I., U.S.A., although other cable carriers would be suitable in alternate embodiments of the present invention.

The X-axis movement system 2069 comprises the X-axis base plate 2070, a pair of linear motion systems 2072a, 2072b that are each mounted to the X-axis base plate 2070 via a pair of mounting plates 2074, and a Z-axis base plate 2082 that is connected to the top sides of the linear motion systems 2072a,2072b. The linear motion systems 2072a, 2072b are each operably connected to a motor 2078 and a gear assembly 2080, and act to provide linear motion to the Z-axis base plate 2082, thereby providing the full range of X-axis positionability of the positionable carriage 2022. In this embodiment, the linear motion systems 2072a,2072b are belt-driven Model No. MF07C linear motion systems produced by Thomson, a division of Danaher Motion of Radford, Va., U.S.A., although other linear motion systems are suitable in alternate embodiments of the present invention. The motor 2078 and gear assembly 2080 are connected together via a known type of belt housing, which is omitted from view in the figures for convenience. In this embodiment, the gear assembly 2080 is a Model No. AKM31 gear assembly produced by Danaher Motion of Radford, Va., U.S.A., although other gear assemblies would be suitable in alternate embodiments of the present invention. The range of motion of the Z-axis base plate 2082 is dictated by the lengths of the linear motion systems 2072a,2072b. A cable carrier 2076, which is attached between the X-axis base plate 2070 and the Z-axis base plate 2082, is used to support and provide protection to the power and control cables for the motor 2078 and the welding wire 2188, which are routed therethrough. In this embodiment, the cable carrier 2076 is a Model No. Z16 cable carrier produced by igus Inc. of East Providence, R.I., U.S.A., although other cable carriers would be suitable in alternate embodiments of the present invention.

The Z-axis movement system 2081 comprises the Z-axis base plate 2082, a Z-axis vertical plate 2083 that is mounted orthogonally to the Z-axis base plate 2082, a linear motion system 2084 that is mounted to the Z-axis vertical plate 2083 via a pair of mounting plates 2085a,2085b, and a welding head mounting arm 2094 that is attached to the opposing side of the linear motion system 2084. Z-axis gussets 2086a,2086b and gusset support plates 2088a,2088b provide structural integrity to the Z-axis movement system 2081. The Z-axis gussets 2086a,2086b are attached to a leveling assembly 2230 (see FIG. 28), as will be described in further detail below. A welding arm support truss 2096 is attached orthogonally to the welding head mounting arm 2094, and provides structural integrity thereto.

The linear motion system 2084 is operably connected to the motor 2092 and acts to provide linear motion to the welding head mounting arm 2094, thereby providing the full range of Z-axis positionability of the positionable carriage 2022. In this embodiment, the linear motion system 2084 is a ball screw-driven Model No. TF06C linear motion system produced by Thomson, a division of Danaher Motion of Radford, Va., U.S.A., although other linear motion systems are suitable in alternate embodiments of the present invention. The motor 2092 is attached to the top end of the linear motion system 2084 by a known type of belt housing, which is omitted from view in the figures for convenience. A cable carrier 2090, which is attached between the Z-axis vertical plate 2083 and the welding head mounting arm 2094, is used to support and provide protection to the power and control cables for the motor 2092 and the welding wire 2188, which are routed therethrough. In this embodiment, the cable carrier 2090 is a Model No. Z16 cable carrier produced by igus Inc. of East Providence, R.I., U.S.A., although other cable carriers would be suitable in alternate embodiments of the present invention.

It should be understood that all of the principles detailed above with respect to the other embodiments of the present invention are applicable, mutatis mutandis, to the present embodiment of the welding system 2010, and that a person having ordinary skill in the art—having read the present disclosure—would be capable of understanding how the present embodiment of the welding system 2010 functions. In this embodiment, once the imager 2282a has determined where the ground welding sites 2007 (or ferrules) are located on the top surface 2005 of the I-beam 2001, this information is used to communicate to a stud placement and welding assembly 2170 precisely where studs should be welded onto the I-beam 2001. In this embodiment, a stud feeding assembly 2100 is used to feed studs to the stud placement and welding assembly 2170 so that the studs may be welded onto the I-beam 2001. Employing the principles discussed above in detail, the location of the stud placement and welding assembly 2170 within the positionable carriage 2022 with respect to the frame 2114 and the I-beam 2001 will be stored in one or more data stores of a computer 2154, and this information will be utilized to make the appropriate calculations and communicate to motor controllers 2160a-2160c how the stud placement and welding assembly 2170 is to be moved, via control of the Y-axis movement system 2033, X-axis movement system 2069, and Z-axis movement system 2081, in order to bring the stud placement and welding assembly 2170 and studs (e.g., stud 2030a) into the correct location on the top surface 2005 of the I-beam 2001 for welding.

Figure 22:
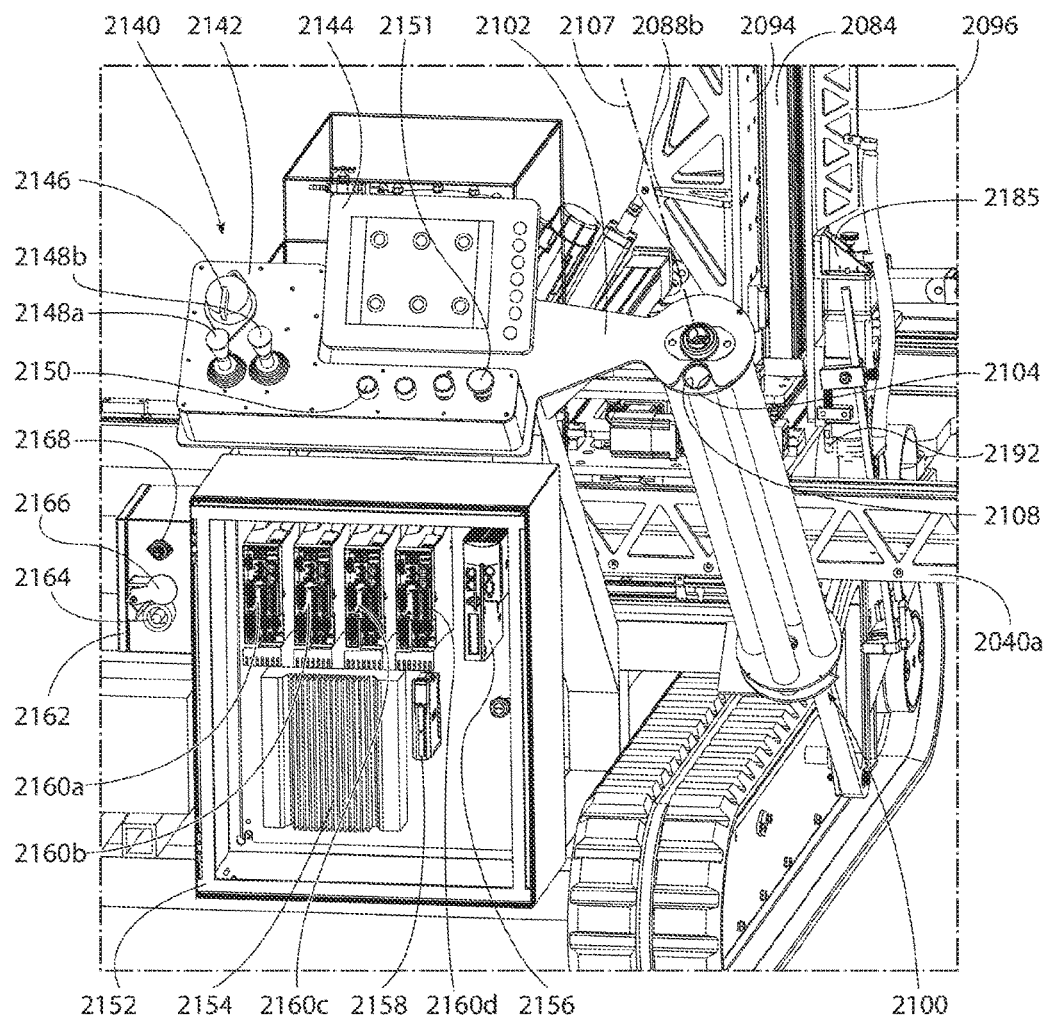
FIG. 22 is an elevated rear perspective view of a portion of the robotic welding system of FIG. 19.
Figure 23:
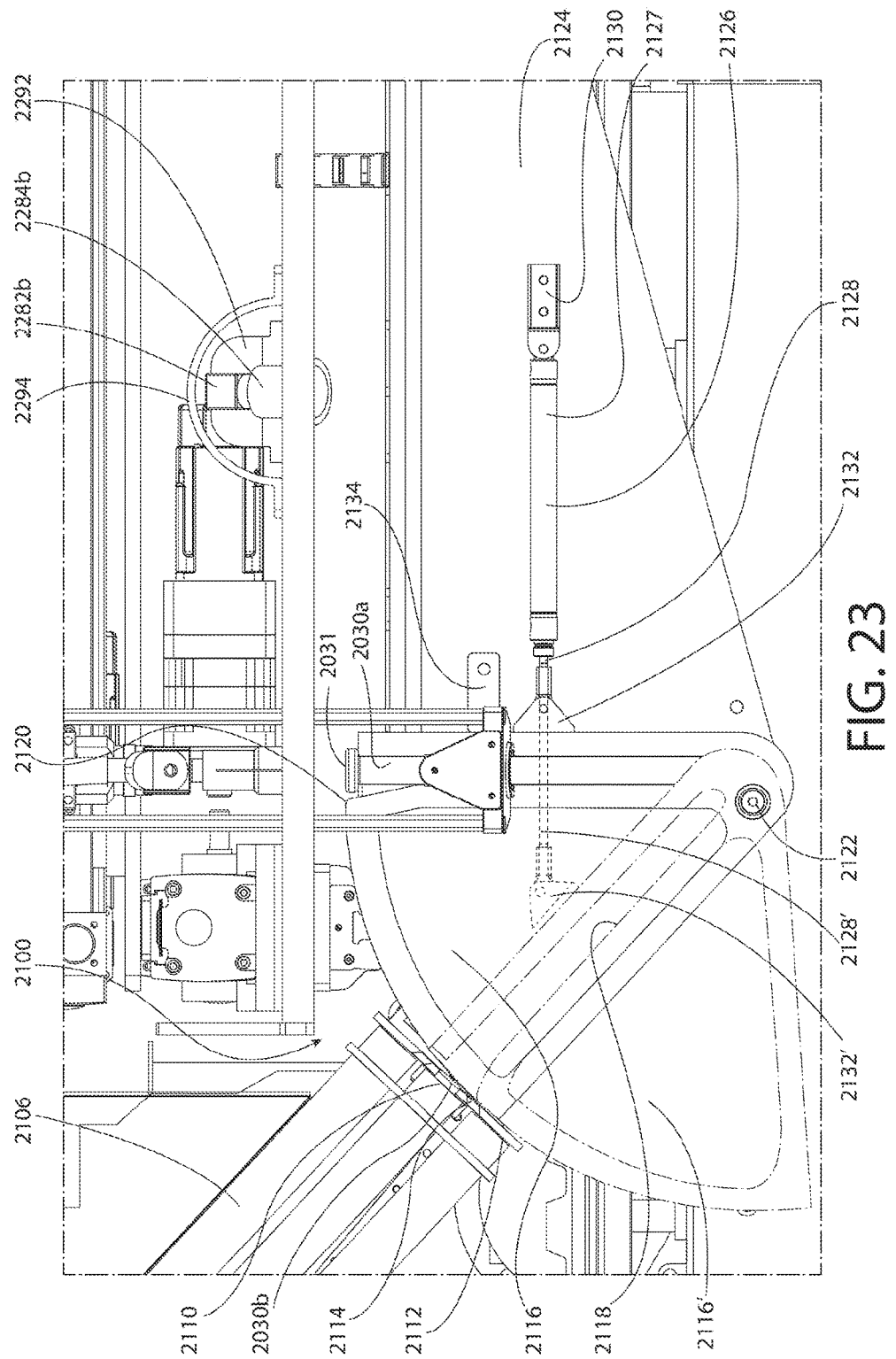
FIG. 23 is a side view of a portion of the robotic welding system of FIG. 19.

With particular reference to FIG. 22, a control station assembly 2140 and the electronics systems of the welding system 2010 will now be described in detail. In this embodiment, the control station assembly 2140 comprises a control case 2142, a display screen 2144 that displays the image being captured by the imagers 2282a,2282b and permits the operator to control other features of the welding system 2010 through a visual interface, a battery disconnect switch 2146, a pair of movement controls 2148a,2148b that are used to change the position of the tractor 2012, three input buttons 2150 which may be used to control welding operations and other features of the welding system 2010, and an emergency shutoff switch 2151 that will shut down the welding system 2010 in the case of a failure or emergency. In this embodiment, the display screen 2144 is a Model No. VT104XA4 display screen produced by Vartech Systems Inc. of Clemmons, N.C., U.S.A., although other display screens would be suitable in alternate embodiments of the present invention. As can be seen in FIG. 22, six ground welding sites 2007 and accompanying ferrules are visible on the display screen 2144, representing the portion of the field of view 2286 of the imager 2282a within the rectangular-shaped opening 2038.

In this embodiment, an enclosure 2152 is attached to the frame 2014 below the control station assembly 2140. For purposes of convenience, a front cover of the enclosure 2152 is rendered transparent in FIG. 22. The enclosure 2152 contains the computer 2154, a motion controller 2156, an input/output module 2158, and four motor controllers 2160a-2160d. Motor controller 2160a controls the Y-axis movement system 2033, motor controller 2160b controls the X-axis movement system 2069, motor controller 2160c controls the Z-axis movement system 2081, and motor controller 2160d controls the hydraulic piston 2126 of the stud feeding assembly 2100. In this embodiment, the computer 2154 is a Model No. MXE-5300 computer produced by Adlink Technology, Inc., of New Taipei City, Taiwan, although other computers would be suitable in alternate embodiments of the present invention. In this embodiment, the motion controller 2156 is a Model No. MC464 motion controller produced by Trio Motion Technology Limited of Gloucestershire, United Kingdom, although other motion controllers would be suitable in alternate embodiments of the present invention. In this embodiment, the motor controllers 2160a-2160d are Model No. AKD-P00606 motor controllers produced by Kollmorgen of Radford, Va., U.S.A., although other motor controllers would be suitable in alternate embodiments of the present invention.

An enclosure 2162 is attached to enclosure 2152 and comprises a welding cable connector 2164, a pivotable welding cable connector block-off 2166 for blocking off the welding cable connector 2164 when it is not in use, and a socket 2168. The welding wire 2188 is connected between the welding cable connector 2164 and the stud gun 2172. A solenoid power and control wire (not shown) is attached at one end to the socket 2168 and at the opposite end to the solenoid housing 2186. The solenoid power and control wire is used to provide power to the solenoid and to trigger the stud gun 2172 to automatically perform a welding operation based on a command received from the computer 2154 after a suitable ground welding site 2007 has been located. The solenoid power and control wire is, like the welding wire 2188, routed through the cable carriers 2060,2076,2090.

With particular reference to FIGS. 22 and 23, in this embodiment the stud feeding assembly 2100 comprises a plurality of stud tubes 2106 that are arranged in a circumferential relationship, such that the plurality of stud tubes 2106 are arranged and can be rotated about a central axis 2107 that runs through the center of the stud feeding assembly 2100. The frame 2014 of the welding system 2010 comprises a stud rotator support plate 2102 that supports the top ends of the plurality of stud tubes 2106. The stud rotator support plate 2102 has a stud feed cutout 2104 through which studs can be fed into the stud tube top opening 2108 of the one of the plurality of stud tubes 2106 that is aligned with the stud feed cutout 2104 at that time. Each of the plurality of stud tubes 2106 has a stud tube bottom opening 2110 through which studs (e.g., stud 2030b) can be fed to the stud placement and welding assembly 2170. The bottom ends of the plurality of stud tubes 2106 are supported by a stud feed bottom plate 2112 having a stud feed cutout 2114. The stud feed cutout 2114 corresponds in size with a single stud tube bottom opening 2110. A single stud may exit the stud feeding assembly 2100 through the stud feed cutout 2114 at a time, according to which of the plurality of stud tubes 2106 is aligned with the stud feed cutout 2114 at that time. The plurality of stud tubes 2106 are arranged parallel to each other and are oriented at an oblique angle (i.e., less than 90 degrees) with respect to the top surface 2005 of the I-beam 2001. This oblique relationship permits for studs to be fed to the stud placement and welding assembly 2170 without obstructing the movement of the stud placement and welding assembly 2170. In this embodiment, the stud feeding assembly 2100 is manually rotated. In alternate embodiments, the stud feeding assembly 2100 may be electronically controlled to complete a partial rotation, such that an adjacent stud feed tube 2106 may be brought into alignment with the stud feed cutout 2114, so that studs may then be fed out of said stud feed tube 2106.

The stud feeding assembly 2100 further comprises a V-plate 2116 having a stud slot 2118 having a top opening 2120 therein that accommodates the insertion of a stud (e.g., stud 2030a) into the stud slot 2118. The V-plate 2116 is attached to a loading mechanism support plate 2124—which is a portion of the frame 2014 of the welding system 2010—via a pivot joint 2122. An extension and retraction device, which in this embodiment is a hydraulic piston 2126 having a main body 2127 and an extendable shaft 2128, is attached at one end to the loading mechanism support plate 2124 via a mounting bracket 2130 and at the other end to the V-plate 2116 via a clevis mount 2132. Extension and retraction of the hydraulic piston 2126 causes the V-plate 2116 to move between two terminal positions: a stud loading position (see alternate positions 2116', 2128', and 2132' of the V-plate 2116, extendable shaft 2128, and clevis mount 2132, respectively) in which the stud slot 2118 is located adjacent to the stud tube bottom opening 2110 of one of the plurality of stub tubes 2106 and aligned with said one of the plurality of stud tubes 2106; and a stud unloading position in which the stud slot is not aligned with said one of the plurality of stud tubes 2106. In the stud unloading position, the stud 2030a is oriented orthogonally to the top surface 2005 of the I-beam 2001, and is ready to be engaged by the stud placement and welding assembly 2170. A rotation stop block 2134, which is attached to the loading mechanism support plate 2124, limits the range of motion of the V-plate 2116 in the retracted position of the hydraulic piston 2126. In this embodiment, extension and retraction of the hydraulic piston 2126 is controlled by a hydraulic valve (see FIG. 29) which is electronically controlled by one of the four motor controllers 2160d (see FIG. 22).

Figure 24:
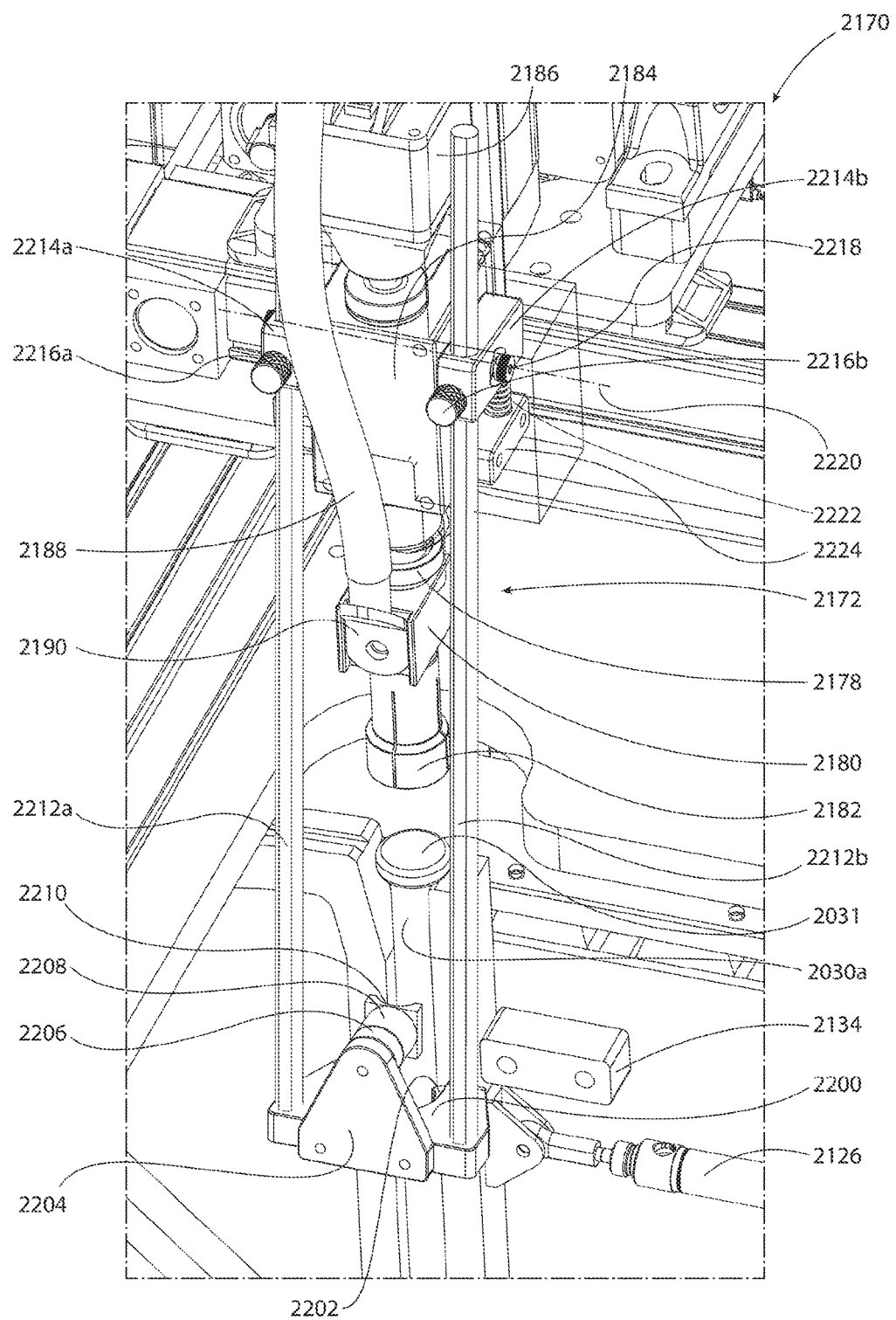
FIG. 24 is a perspective view of a portion of the robotic welding system of FIG. 19.
Figure 25:
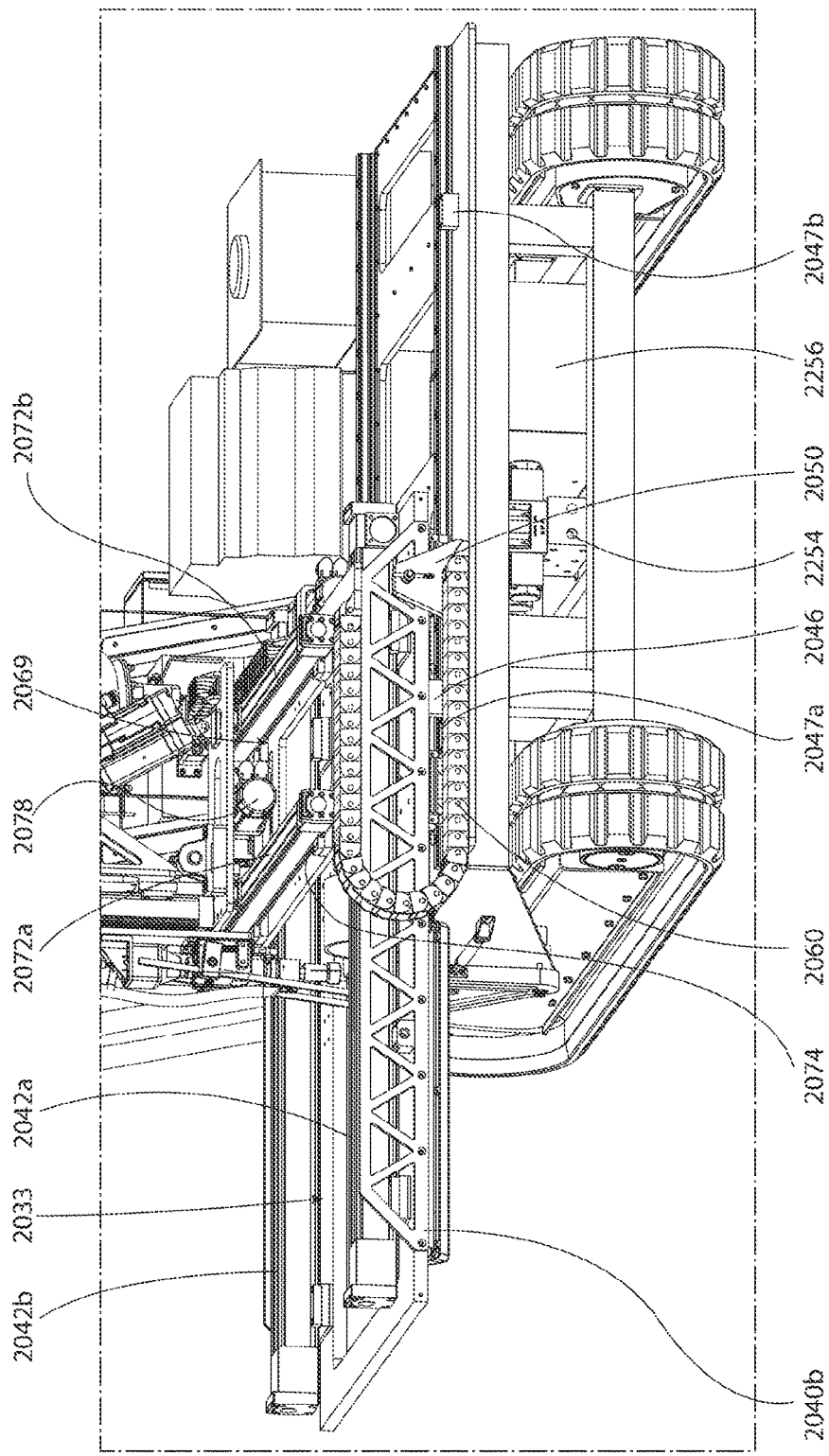
FIG. 25 is a front perspective view of a portion of the robotic welding system of FIG. 19.

With particular reference to FIG. 24, the stud placement and welding assembly 2170 according to the present invention will now be described in detail. A solenoid mount 2185, which supports a solenoid housing 2186, is mounted to the welding head mounting arm 2094. A guide block 2184 is attached to the lower end of the solenoid housing 2186. Attached below the guide block 2184 is a stud gun 2172, which comprises a stop washer 2178, a collet bushing 2180 that is attached to a first end of the welding wire 2188 via a welding wire lug 2190, and a stud collet 2182 that mates with a head 2031 of the stud 2030a that is to be welded. Both signal and sufficient power is transferred to the stud gun 2172 via the welding wire 2188, and the stud gun 2172 acts to weld the studs to the I-beam 2001 through a drawn arc welding process, as will be understood by one having ordinary skill in the art. As noted above, the welding wire 2188 is routed through each of the cable carriers 2090, 2076, 2060, and as noted below connects between the welding cable connector 2164 and the stud gun 2172. A shock absorber 2192 (see FIG. 22) is attached to a lower end of the welding head mounting arm 2094, and is used to reduce the speed of movement of the stud placement and welding assembly 2170 as it engages a stud 2030a with the top surface 2005 of the I-beam 2001, in order that the molten weld pool within the ferrule is not splashed or displaced outside of the ferrule.

Referring back to FIG. 24, the stud placement and welding assembly 2170 further comprises a stud and ferrule holder 2200 having a ferrule adapter 2202, which is used to hold a ferrule in place on top of a ground welding site 2007 on the top surface 2005 of the I-beam 2001. The general use of ferrules in stud welding applications is discussed above in detail, and is known in the relevant art. The ferrule adapter 2202 is sized and shaped to accommodate the placement of a ferrule at least partially therein. A pair of guide rods 2212a, 2212b are each attached to a respective guide rod attachment block 2214a, 2214b via a respective knurled-end bolt 2216a, 2216b. The guide rod attachment blocks 2214a, 2214b are connected through the guide block 2184 (the cover of which has been rendered transparent in FIG. 24 for convenience) via a ferrule holder shaft 2218, which is free to rotate about a rotation axis 2220.

Attached to the stud and ferrule holder 2200 is an electromagnet assembly comprising an electromagnet support plate 2204. The electromagnet support plate 2204 supports an electromagnet support ring 2206, an electromagnet 2208, and an electromagnetic insulator 2210 having a concave, half-tubular profile that corresponds to, supports, and vertically aligns the cylindrical profile of the shaft portion of the stud 2030a. Since the stud 2030a is made of a ferrous metal (e.g., steel), once the electromagnet 2208 is energized, the stud 2030a is magnetically drawn to the electromagnet 2208 and when the electromagnet 2208 is brought in sufficient proximity to the stud 2030a, the stud 2030a will be magnetically drawn out of the stud slot 2118 in the V-plate 2116 and held by the electromagnet 2208 against electromagnetic insulator 2210. In this embodiment, a block 2224 is attached to a side of the guide block 2184, and a spring 2222 is connected to the top side of the block 2224. The top end of the spring 2222 engages the bottom side of the guide rod attachment block 2214b and the spring 2222 is partially compressed when the electromagnetic insulator 2210 is brought into contact with the stud 2030a. Due to the inherent restorative force in the spring 2222, it will attempt to uncompress, thereby forcing the guide rod attachment block 2214b away from the spring 2222, which consequently rotates the ferrule holder shaft 2218 about its rotation axis 2220 so that the stud and ferrule holder 2200 moves away from the V-plate 2116 with the picked-up stud 2030a attached to the electromagnet 2208 via electromagnetic insulator 2210. In alternate embodiments, the ferrule holder could be rotated away from the V-plate 2216 electronically using an attached solenoid. The stud placement and welding assembly 2170 of the present invention thus uses the electromagnet 2208 and rotatable stud and ferrule holder 2200 to move the studs 2030a, 2030b out of the stud feeding assembly 2100 and into position to be welded in contact with the top surface 2005 of the I-beam 2001, while ensuring that the shaft of the stud 2030a is aligned orthogonally with the top surface 2005 of the I-beam 2001. In alternate embodiments, a solenoid-driven plunger apparatus—for example the apparatus shown in FIG. 5—that automatically plunges into and fractures the ferrule after the weld process has been completed could be provided as part of the stud placement and welding assembly 2170.

Figure 28:
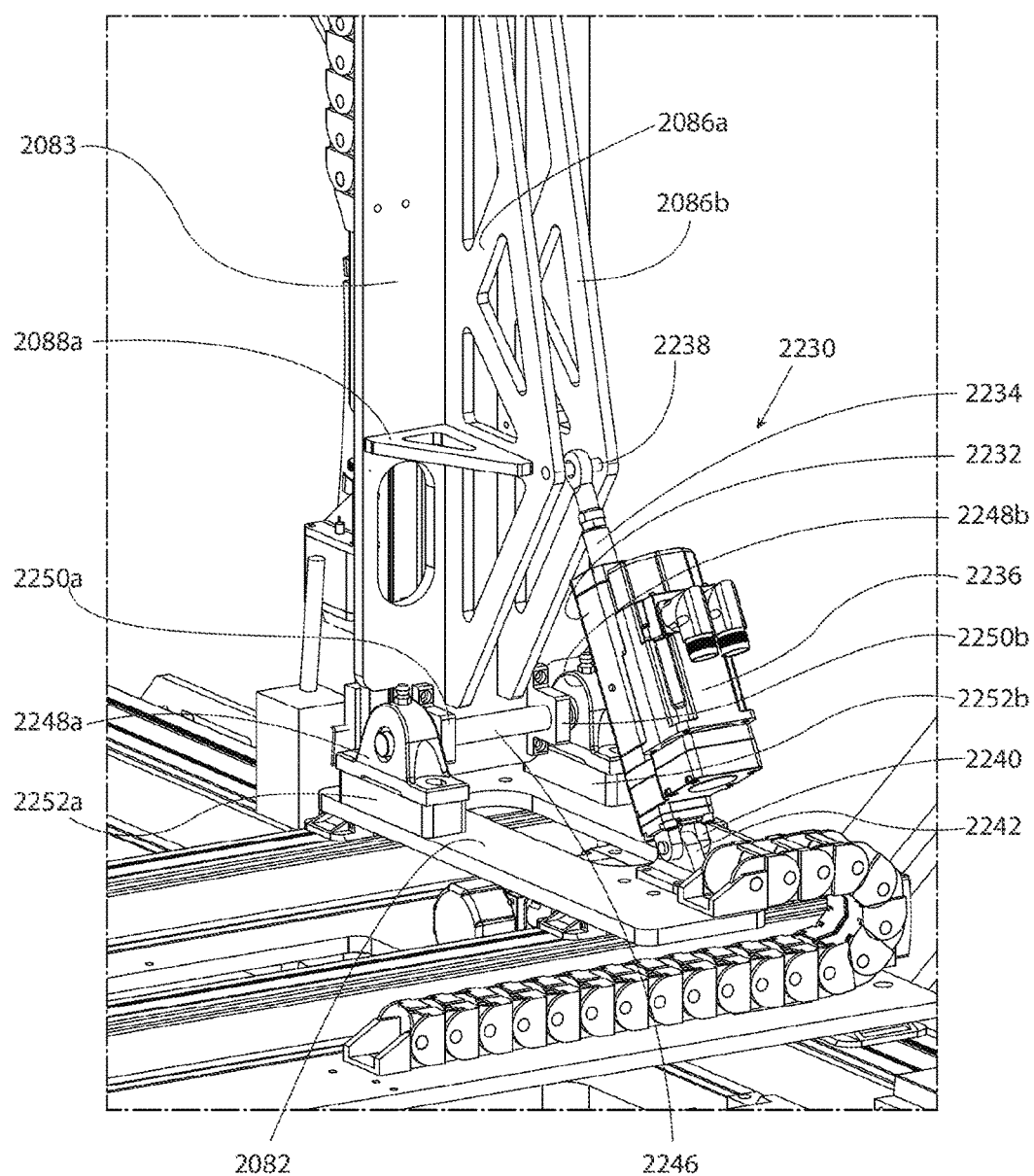
FIG. 28 is a perspective view of a portion of the robotic welding system of FIG. 19.

With particular reference to FIG. 28, a leveling assembly 2230 of the present embodiment of the welding system 2010 will now be described in detail. In some welding applications, the adjacent corrugated panels may be angled with respect to the plane of the top surface 2005 of the I-beam 2001 to which the studs 2030a,2030b are to be welded, such that the frame 2014 and positionable carriage 2022 of the welding system 2001 lie in a second plane that is not parallel to the plane of the top surface 2005 of the I-beam 2001. In some building applications, the angle of the plane of the corrugated panels relative to the plane of the top surface 2005 of the I-beam may be as large as 10 degrees. More commonly, this angle is between 0 and 6.5 degrees. In order to account for this potential difference in angles so that the studs 2030a,2030b may be consistently brought into orthogonal placement with the top surface 2005 of the I-beam 2001, the welding system 2010 includes the leveling assembly 2230, which changes the angle of the Z-axis vertical plate 2083 and the attached stud placement and welding assembly 2170 in relation to the Z-axis base plate 2082 about a pivot shaft 2246. In a home position, the Z-axis vertical plate 2083 is oriented perpendicularly to the Z-axis base plate 2082.

In this embodiment, the leveling assembly 2230 comprises a motor 2236 attached to a linear actuator 2232. The linear actuator 2232 has an extendable rod 2234 which can extend and retract based on a signal received from the attached motor 2236. One end of the linear actuator 2232 is rotatably connected to the Z-axis gussets 2086a,2086b via a joint, and the other end of the linear actuator 2232 is rotatably connected to the Z-axis base plate 2082 via a base clevis 2240 that engages a base mount 2242. Pivot mounts 2248a,2248b are each connected to the Z-axis base plate 2082 via respective bearing spacer plates 2252a,2252b. The pivot mounts 2248a,2248b rotatably engage the pivot shaft 2246. Pivot shaft blocks 2250a,2250b are attached to the Z-axis vertical plate 2083 and also rotatably engage the pivot shaft 2246. When the second plane is not parallel to the plane of the top surface 2005 of the I-beam 2001, the leveling assembly 2230 acts to change the angle between the Z-axis vertical plate 2083 and the Z-axis base plate 2082 so that the attached stud placement and welding assembly 2170 is placed in an orthogonal relationship to the plane of the top surface 2005 of the I-beam 2001. In this embodiment, this leveling function is manually performed by the operator of the welding system 2010. In alternate embodiments, a level sensor could be provided with the welding system 2010 that automatically determines the difference in angle between the second plane and the plane of the top surface 2005 of the adjacent I-beam 2001, and automatically signals the leveling assembly to make the necessary angular correction.

Figure 27:
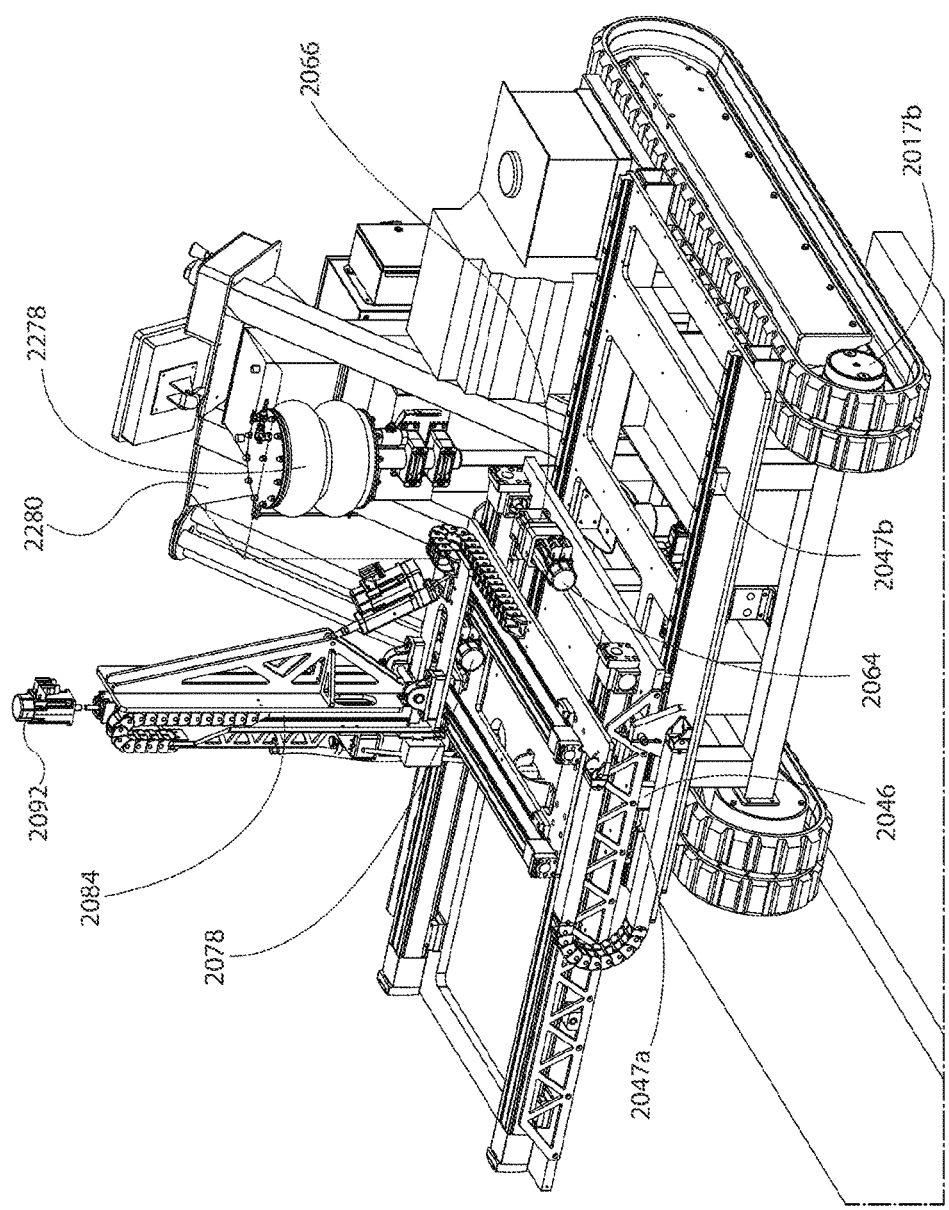
FIG. 27 is an elevated front perspective view of the robotic welding system of FIG. 19.
Figure 29:
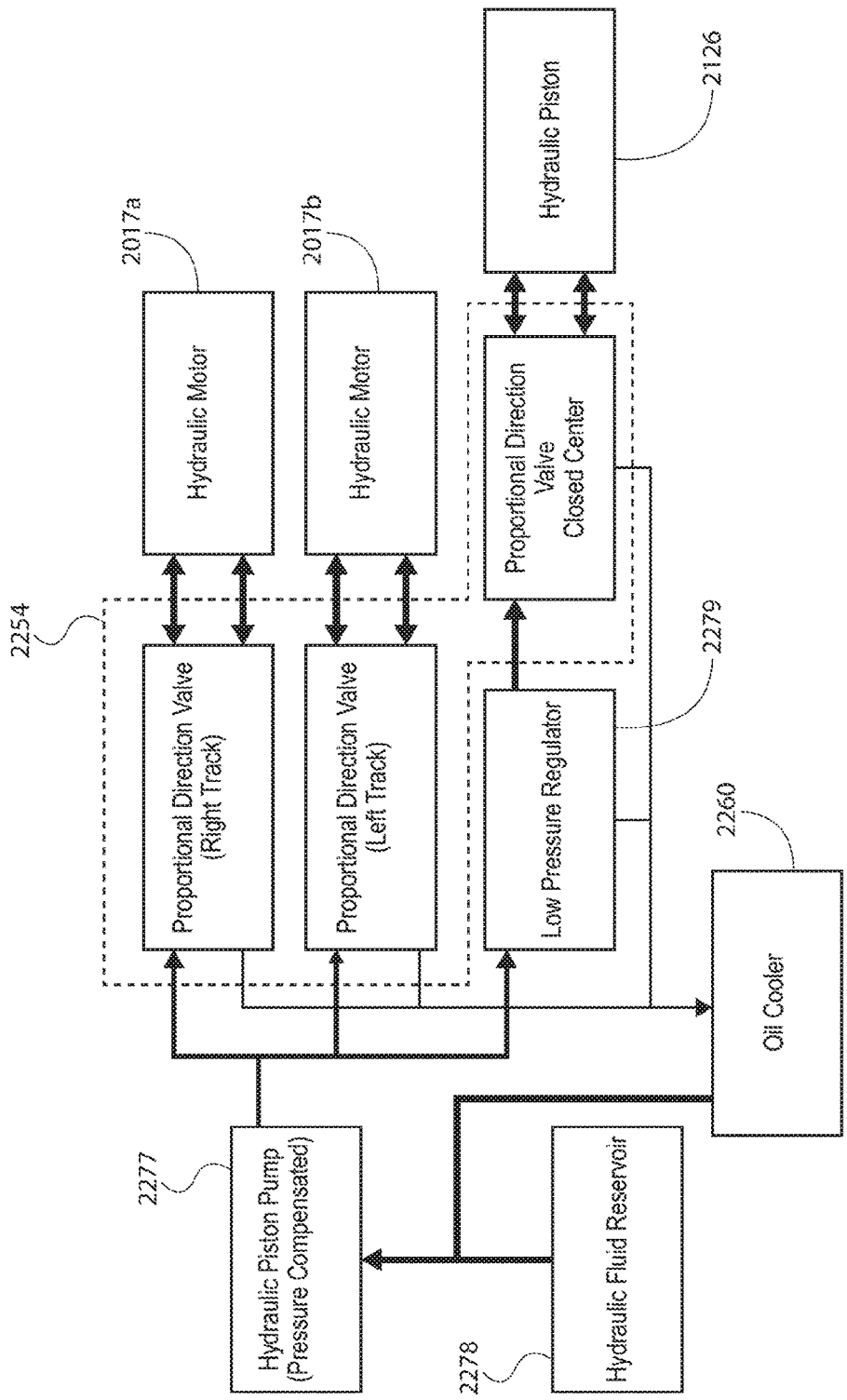
FIG. 29 is a schematic diagram showing the connections of the hydraulic components of the welding system of FIG. 19.

A schematic diagram showing the connections of the hydraulic systems of the welding system 2010 according to the present embodiment is provided in FIG. 29. For convenience, filters of the hydraulic systems are omitted from FIG. 29 and are not labeled in the remaining figures, though it would be understood by one having ordinary skill in the art that appropriate fluid filters are preferably used. The hydraulic systems include a hydraulic valve assembly 2254 which comprises an individual proportional directional valve for operating each of the two hydraulic wheel motors 2017a,2017b and a third proportional directional valve for operating the hydraulic piston 2126 (see FIG. 29). The three proportional directional valves are each in two-way fluid-flow communication with the respective component discussed above. In this embodiment, the proportional directional valves are each Model No. KBDG4V5 valves produced by Eaton Corporation plc of Cleveland, Ohio, U.S.A., although other valves would be suitable in alternate embodiments of the present invention. In this embodiment, a pressure-compensated hydraulic piston pump 2277 is in fluid flow communication with a hydraulic fluid reservoir 2278 and an oil cooler 2260. In this embodiment, the hydraulic piston pump 2277 is a Model No. 70422 hydraulic piston pump produced by Eaton Corporation plc of Cleveland, Ohio, U.S.A., although other hydraulic piston pumps would be suitable in alternate embodiments of the present invention. In this embodiment, the hydraulic fluid reservoir 2278 is a Model No. VVR-400 hydraulic fluid reservoir produced by Smart Reservoir Inc. of Quebec City, Canada, although other hydraulic fluid reservoirs would be suitable in alternate embodiments of the present invention. In this embodiment, the hydraulic piston pump 2277 is operably connected to the two proportional directional valves for the hydraulic wheel motors 2017a,2017b and to a low pressure regulator 2279. The low pressure regulator 2279 is operably connected to the proportional directional valve for operating the hydraulic piston 2126. Each of the three proportional directional valves of the hydraulic valve assembly 2254 and the low pressure regulator 2279 is in fluid flow communication with the oil cooler 2260. As best seen in FIGS. 22 and 27, the hydraulic fluid reservoir 2278 is encased within a protective cover 2280, which has been rendered transparent in the figures for convenience.

Additional components of the welding system 2010 according to the present embodiment include an engine 2268, which is supported on the frame 2014 by a pair of engine mounts 2266a,2266b, a fuel tank 2262 which is supported from the frame 2014 by a fuel tank support plate 2264, a muffler 2270, a belt drive 2272, and a battery 2274 which is encased within a battery cover 2276. The battery cover 2276 has been rendered transparent in the figures for convenience. In this embodiment, the engine 2268 is a Model No. PCH740 engine produced by Kohler Company of Kohler, Wis., U.S.A., although other engines would be suitable in alternate embodiments of the present invention. In this embodiment, the fuel tank 2262 is a Model No. 271-004-NF fuel tank produced by Jaz Products Inc. of Santa Paula, Calif., U.S.A., although other fuel tanks would be suitable in alternate embodiments of the present invention. In this embodiment, the battery 2274 is a DieHard Platinum Group Size 34M battery produced by Sears Brands, LLC of Hoffman Estates, Ill., U.S.A., although other batteries would be suitable in alternate embodiments of the present invention.

A power inverter 2258 is encased within a protective inverter box 2256, which has also been rendered transparent in the figures for convenience. The power inverter 2258 is connected to the battery 2274 and converts the direct current (DC) voltage provided by the battery 2274 into alternating current (AC) for use by the welding system 2010. In this embodiment, the power inverter 2258 is a Model No. PV2000FC inverter produced by TrippLite of Chicago, Ill., U.S.A., although other inverters would be suitable in alternate embodiments of the present invention. Because the top splash plate 2020 is transparent in this embodiment, the status of the power inverter 2258 can be monitored without removing the top splash plate 2020 from the frame 2014.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What we claim is:

1. A stud feeding assembly for automatically feeding welding studs to a weld area, the stud feeding assembly comprising:
   a top plate;
   a bottom plate opposing the top plate, the bottom plate having a cutout therein; and
   a plurality of stud tubes located between the top plate and the bottom plate, each of the stud tubes having a top opening and a bottom opening and being sized to hold a plurality of welding studs therein;
      wherein the respective bottom end of each of the plurality of stud tubes can be individually moved into alignment with the cutout located in the bottom plate such that a welding stud located in the respective stud tube can pass through the cutout, whereas welding studs located in the other one or more stud tubes of the plurality of stud tubes cannot simultaneously pass through the bottom plate.

2. The stud feeding assembly of claim 1, wherein the plurality of stud tubes comprises at least three stud tubes located in a circumferential arrangement around a centerline of the plurality of stud tubes, wherein the centerline passes through the longitudinal center of the plurality of stud tubes.

3. The stud feeding assembly of claim 1, wherein the plurality of stud tubes is manually adjustable such that the respective bottom end of each of the plurality of stud tubes is individually moveable into alignment with the cutout.

4. The stud feeding assembly of claim 1, wherein the plurality of stud tubes is electronically adjustable such that the respective bottom end of each of the plurality of stud tubes is individually moveable into alignment with the cutout.

5. The apparatus of claim 1, wherein the plurality of stud tubes are longitudinally oriented at a non-orthogonal angle with respect to a planar surface of the weld area.

6. The apparatus of claim 5, further comprising a rotatable plate having a stud slot therein that is sized to accommodate the placement of a stud therein, the rotatable plate being moveable between first and second positions;
   wherein in the first position the stud slot is located adjacent to the respective bottom end of at least one stud tube of the plurality of stud tubes and aligned with the at least one stud tube and;
   wherein in the second position the stud slot is not aligned with the at least one stud tube.

7. The apparatus of claim 6, wherein in the second position the stud slot is oriented at an orthogonal angle with respect to the planar surface of the weld area.

8. The apparatus of claim 6, wherein the rotatable plate is moveable between the first and second positions via extension and retraction of an extension and retraction device that is attached to the rotatable plate.

9. The apparatus of claim 8, wherein the extension and retraction device is extended and retracted automatically via a hydraulic valve.

* * * * *